US010394249B2

(12) United States Patent
Kim et al.

(10) Patent No.: US 10,394,249 B2
(45) Date of Patent: Aug. 27, 2019

(54) CLEANING ROBOT AND CONTROL METHOD THEREOF

(71) Applicant: Samsung Electronics Co., Ltd., Gyeonggi-do (KR)

(72) Inventors: Won Kuk Kim, Seoul (KR); Ji Won Chun, Yongin-si (KR); Shin Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 15/505,574

(22) PCT Filed: Aug. 10, 2015

(86) PCT No.: PCT/KR2015/008353
§ 371 (c)(1),
(2) Date: Feb. 21, 2017

(87) PCT Pub. No.: WO2016/028021
PCT Pub. Date: Feb. 25, 2016

(65) Prior Publication Data
US 2018/0217611 A1 Aug. 2, 2018

(30) Foreign Application Priority Data

Aug. 20, 2014 (KR) .................. 10-2014-0108446
Aug. 7, 2015 (KR) .................. 10-2015-0111429

(51) Int. Cl.
B25J 9/16 (2006.01)
G05D 1/02 (2006.01)
(Continued)

(52) U.S. Cl.
CPC .............. *G05D 1/0274* (2013.01); *A47L 9/28* (2013.01); *A47L 9/2805* (2013.01);
(Continued)

(58) Field of Classification Search
CPC ......... G05D 1/0274; G05D 2201/0215; G05D 1/0238; A47L 2201/04; A47L 2201/06;
(Continued)

(56) References Cited

U.S. PATENT DOCUMENTS 5,696,675 A * 12/1997 Nakamura ........... G05D 1/0219
180/167
2004/0211444 A1* 10/2004 Taylor ................... A47L 9/2805
134/18

(Continued)

FOREIGN PATENT DOCUMENTS

CN 102846273 A 1/2013
EP 2423772 A1 2/2012

(Continued)

OTHER PUBLICATIONS

The International Searching Authority, "International Search Report," International Application No. PCT/KR2015/008353, dated Nov. 27, 2015, 5 pages, publisher The ISA/KR, International Application Division, Korean Intellectual Property Office, Daejeon, Republic of Korea.

(Continued)

Primary Examiner — Dalena Tran

(57) ABSTRACT

A cleaning robot may include a main body, a driver configured to move the main body, a cleaner configured to clean a cleaning space, and a controller configured to set at least one area among a plurality of areas included in the cleaning space as a cleaning area while the main body moves, and clean the cleaning area when the cleaning area is set.

20 Claims, 65 Drawing Sheets

(51) Int. Cl.
*A47L 9/28* (2006.01)
*A47L 11/40* (2006.01)

(52) U.S. Cl.
CPC .......... *A47L 9/2842* (2013.01); *A47L 9/2847* (2013.01); *A47L 9/2852* (2013.01); *A47L 9/2857* (2013.01); *A47L 11/4061* (2013.01); *G05D 1/0263* (2013.01); *A47L 2201/04* (2013.01); *A47L 2201/06* (2013.01); *G05D 2201/0203* (2013.01)

(58) Field of Classification Search
CPC .... A47L 9/2826; Y10S 901/01; Y10S 901/09; B25J 9/1664; B25J 9/0003; B25J 9/1666; B25J 9/1694; E04H 4/1654; G05B 19/4155; G05B 2219/34418; G05B 2219/45098
USPC ................ 700/253, 259, 245; 15/3; 901/47
See application file for complete search history.

(56) References Cited

U.S. PATENT DOCUMENTS

| | | |
|---|---|---|
| 2005/0236021 A1 | 10/2005 | Suzuki |
| 2007/0271003 A1* | 11/2007 | Bang .................... G05D 1/0272 700/245 |
| 2009/0234499 A1* | 9/2009 | Nielsen ................... B25J 9/161 700/250 |
| 2011/0125324 A1 | 5/2011 | Baek et al. |
| 2012/0051595 A1 | 3/2012 | Lee et al. |
| 2013/0000675 A1 | 1/2013 | Hong et al. |
| 2014/0207281 A1* | 7/2014 | Angle ................... H04L 12/282 700/257 |

FOREIGN PATENT DOCUMENTS

| | | |
|---|---|---|
| EP | 2502539 A2 | 9/2012 |
| KR | 10-2009-0062210 A | 6/2009 |
| KR | 10-2011-0010380 A | 2/2011 |
| KR | 10-2011-0092158 A | 8/2011 |
| KR | 10-2012-0021064 A | 3/2012 |
| KR | 10-2013-0002218 A | 1/2013 |

OTHER PUBLICATIONS

Foreign Communication from Related Counterpart Application; Australian Patent Application No. 2015304254; Examination Report No. 1 dated Oct. 19, 2017; 4 pages.
Foreign Communication from Related Counterpart Application; Australian Patent Application No. 2015304254; Examination Report No. 2 dated Feb. 26, 2018; 4 pages.
Foreign Communication from Related Counterpart Application; European Patent Application No. 15833829.3; Extended European Search Report and European Search Opinion dated Mar. 26, 2018; 6 pages.
Notice of acceptance for patent application dated Jul. 4, 2018 in connection with Australian Patent Application No. 2015304254.
Office Action dated Dec. 11, 2018 in connection with Chinese Patent Application No. 201580057197.5, 17 pages.
IP Australia, "Notice of acceptance for patent application," Application No. AU2018250455, dated Mar. 26, 2019, 3 pages.

* cited by examiner

[Fig. 1]
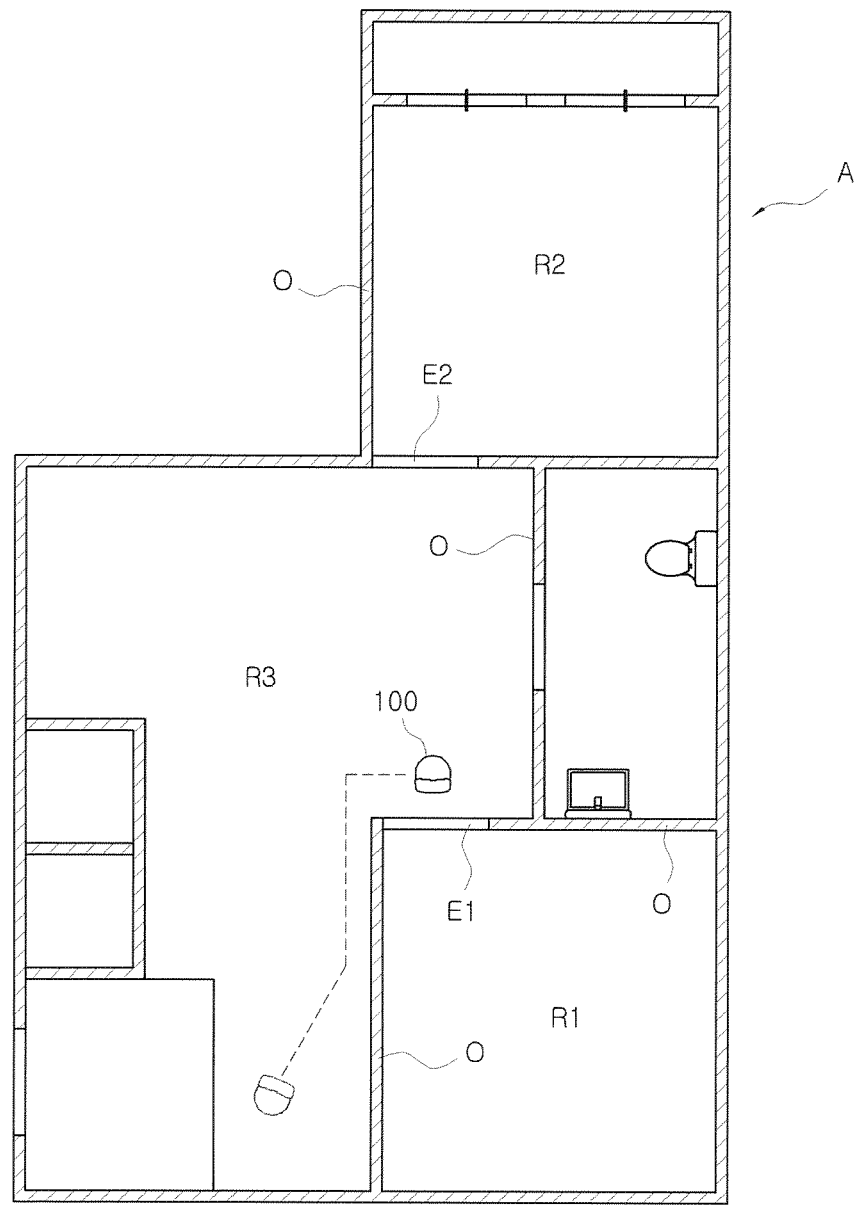

[Fig. 2]
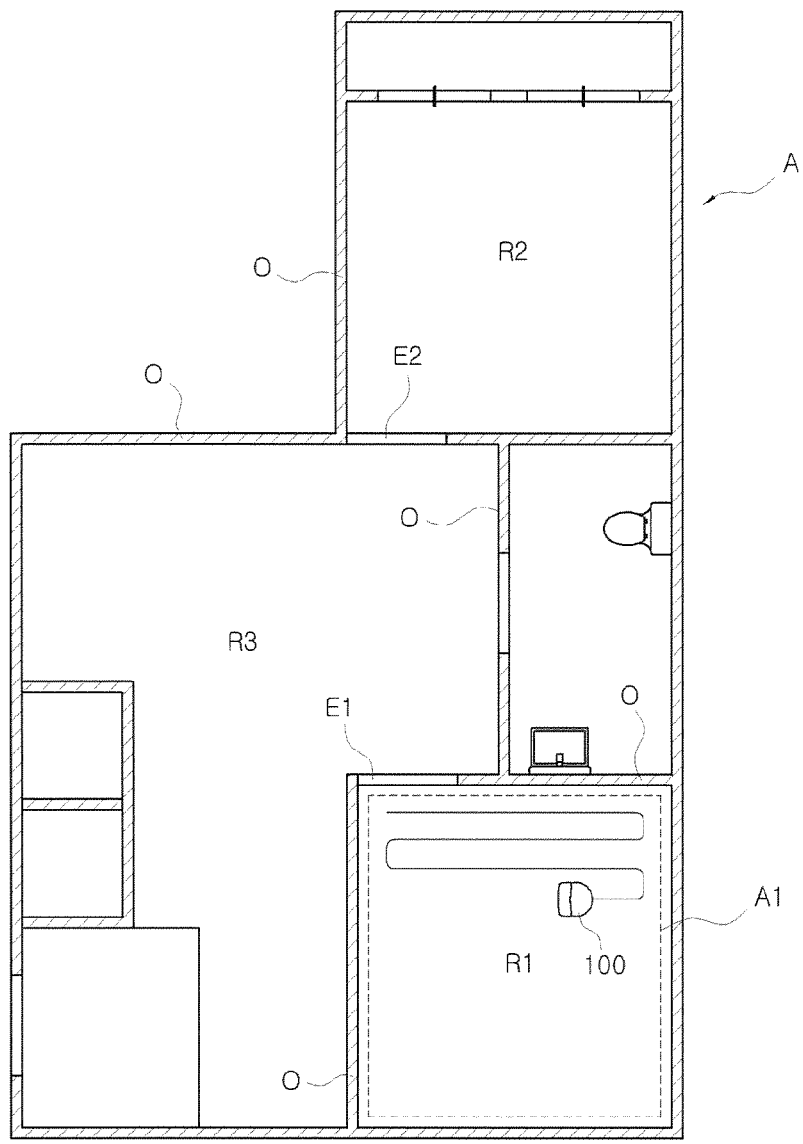

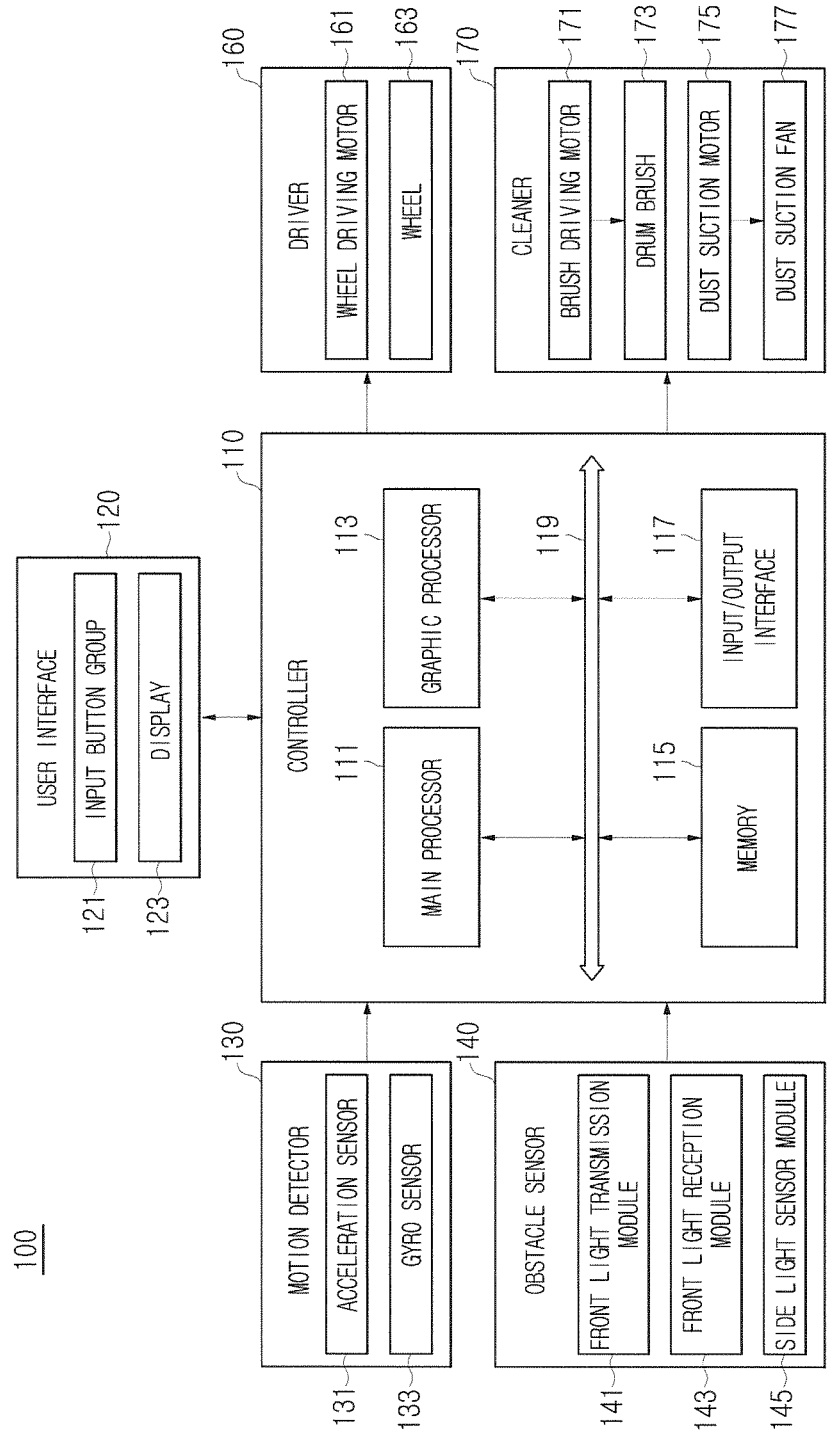
[Fig. 3]

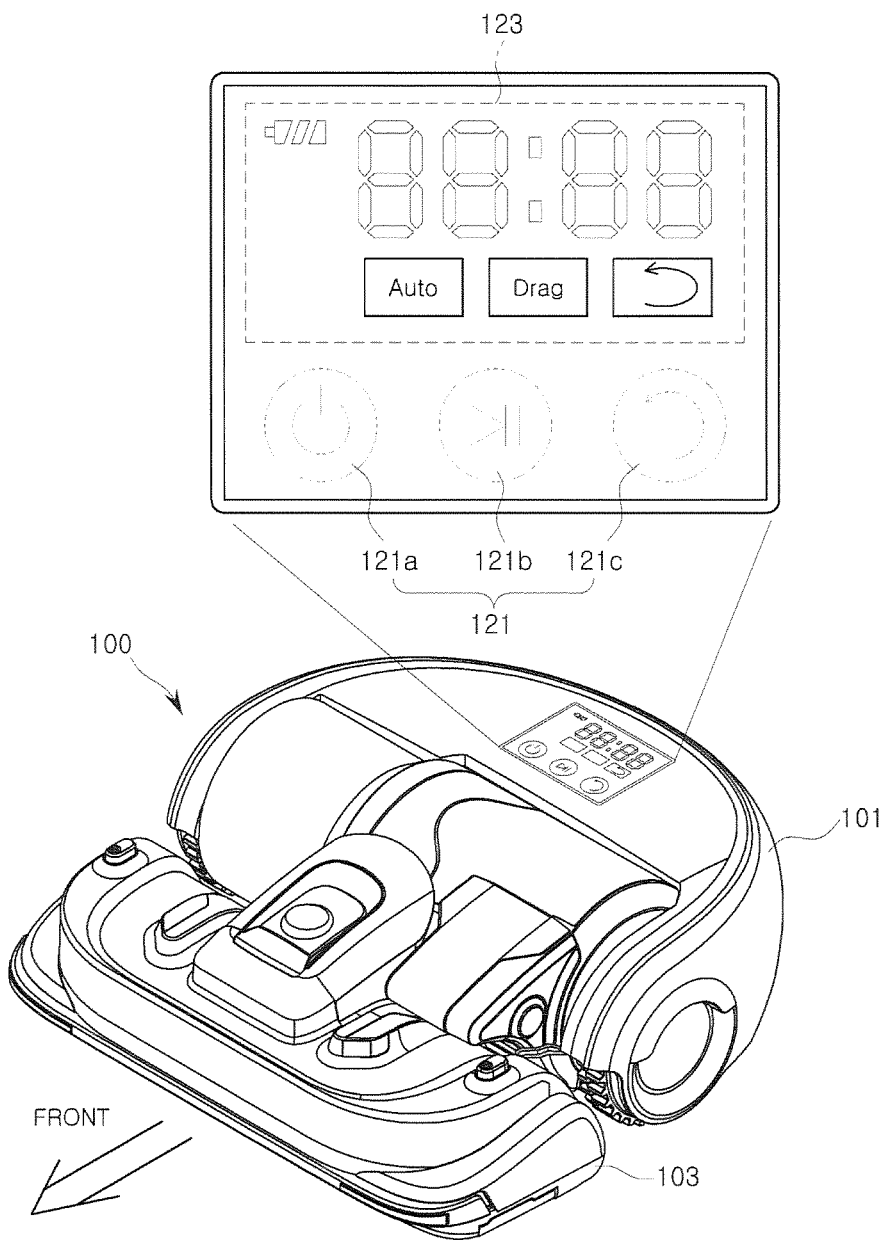
[Fig. 4]

[Fig. 5]
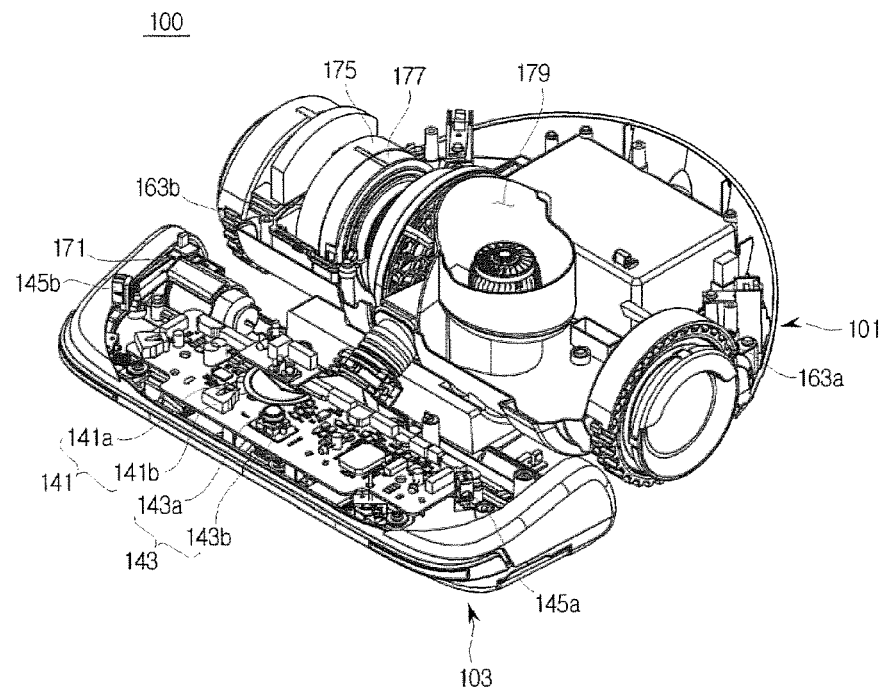
[Fig. 6]
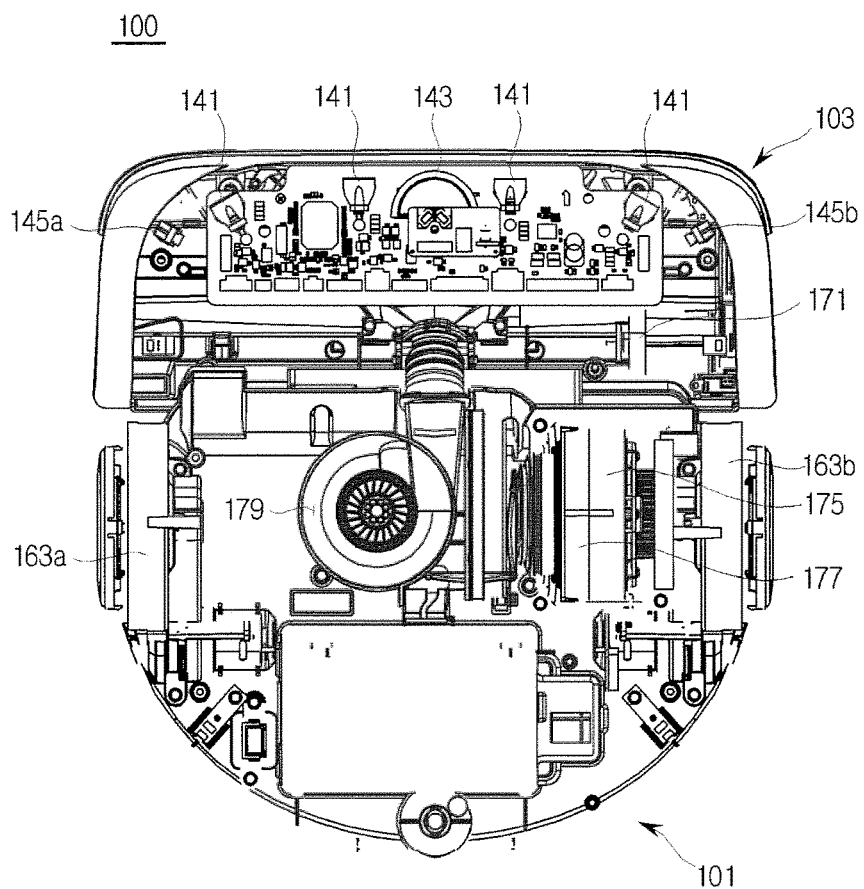

[Fig. 7]
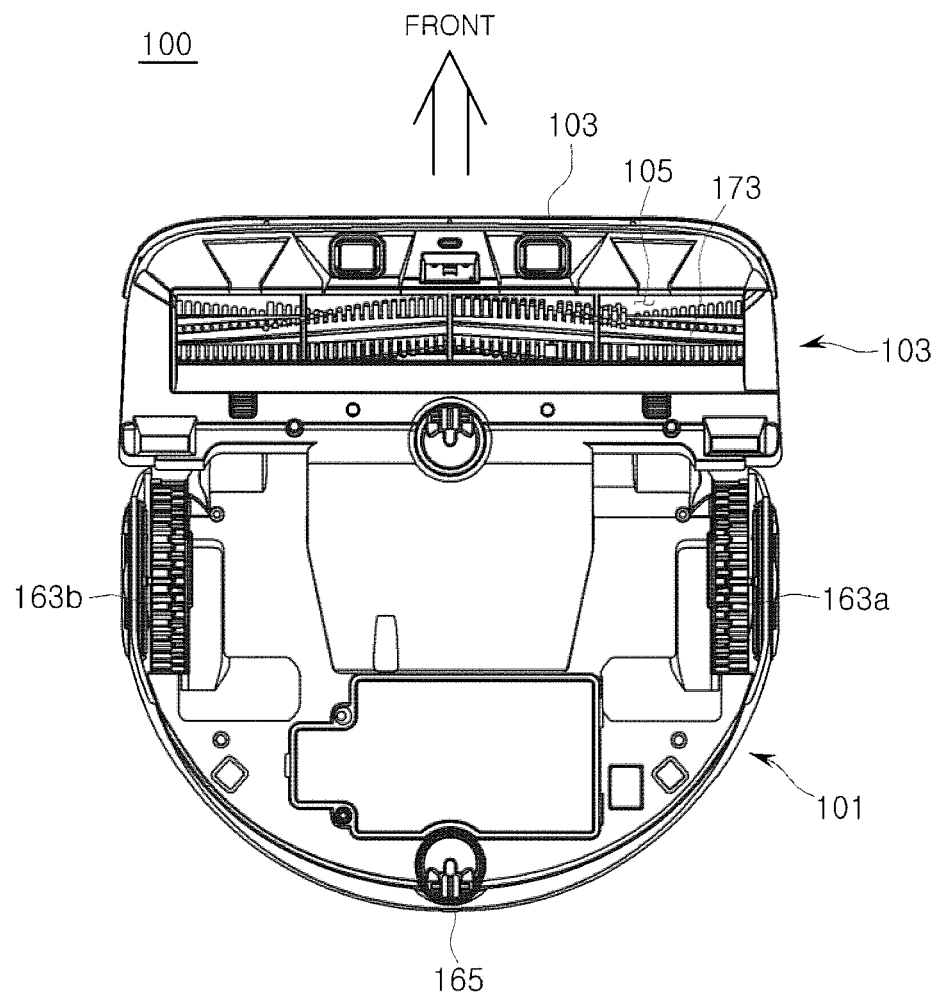

[Fig. 8]
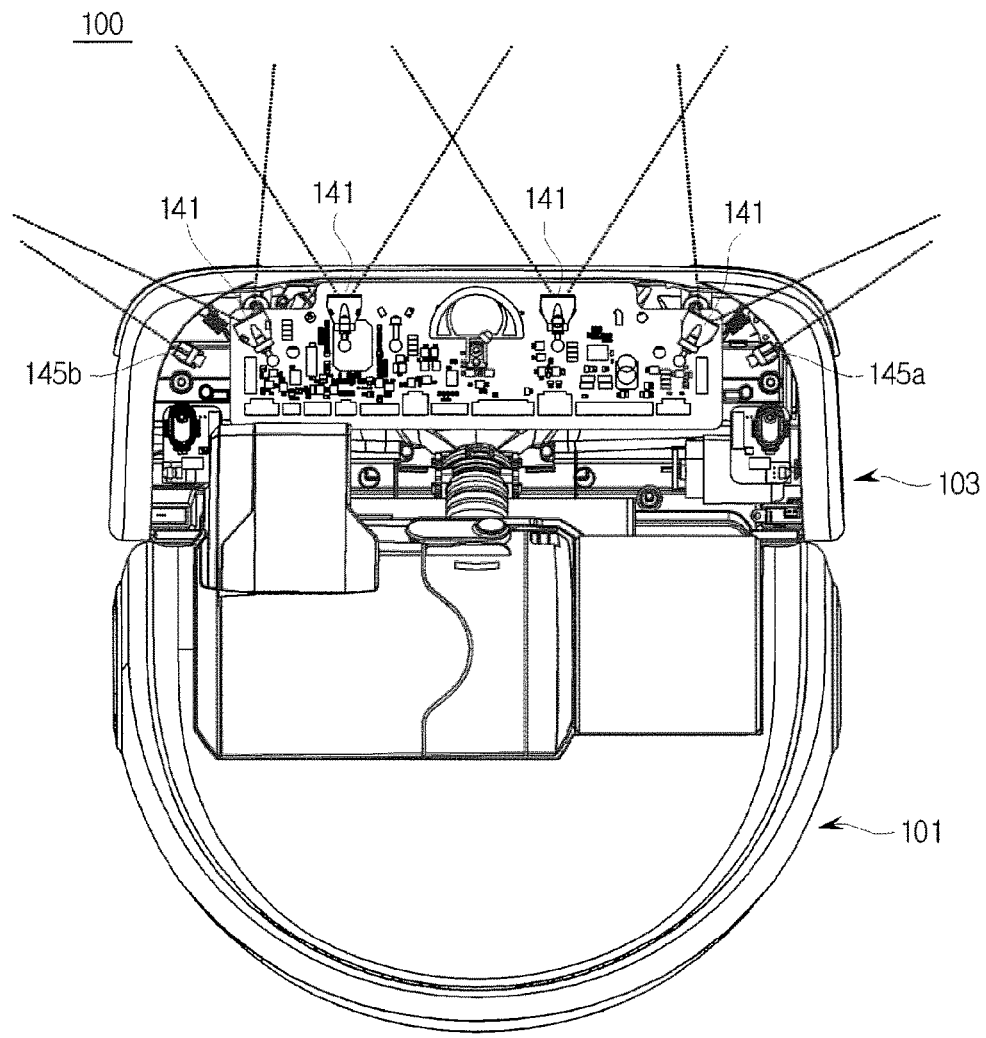
[Fig. 9]
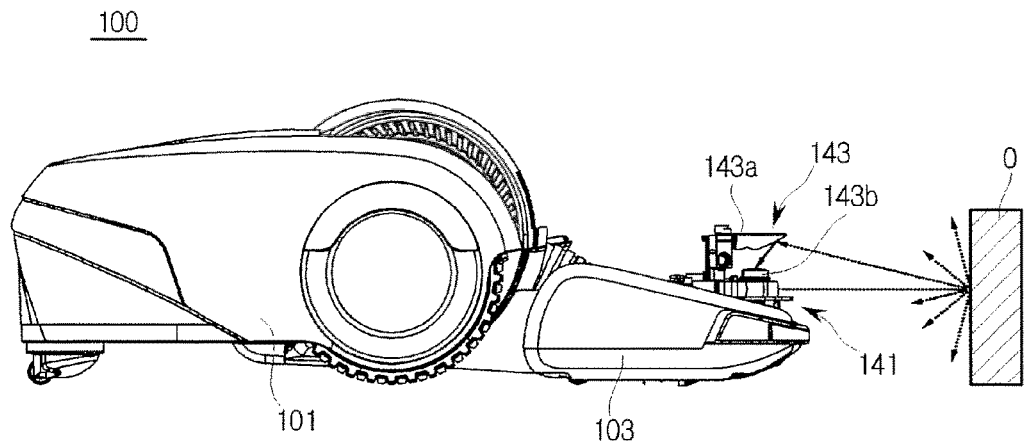

[Fig. 10]
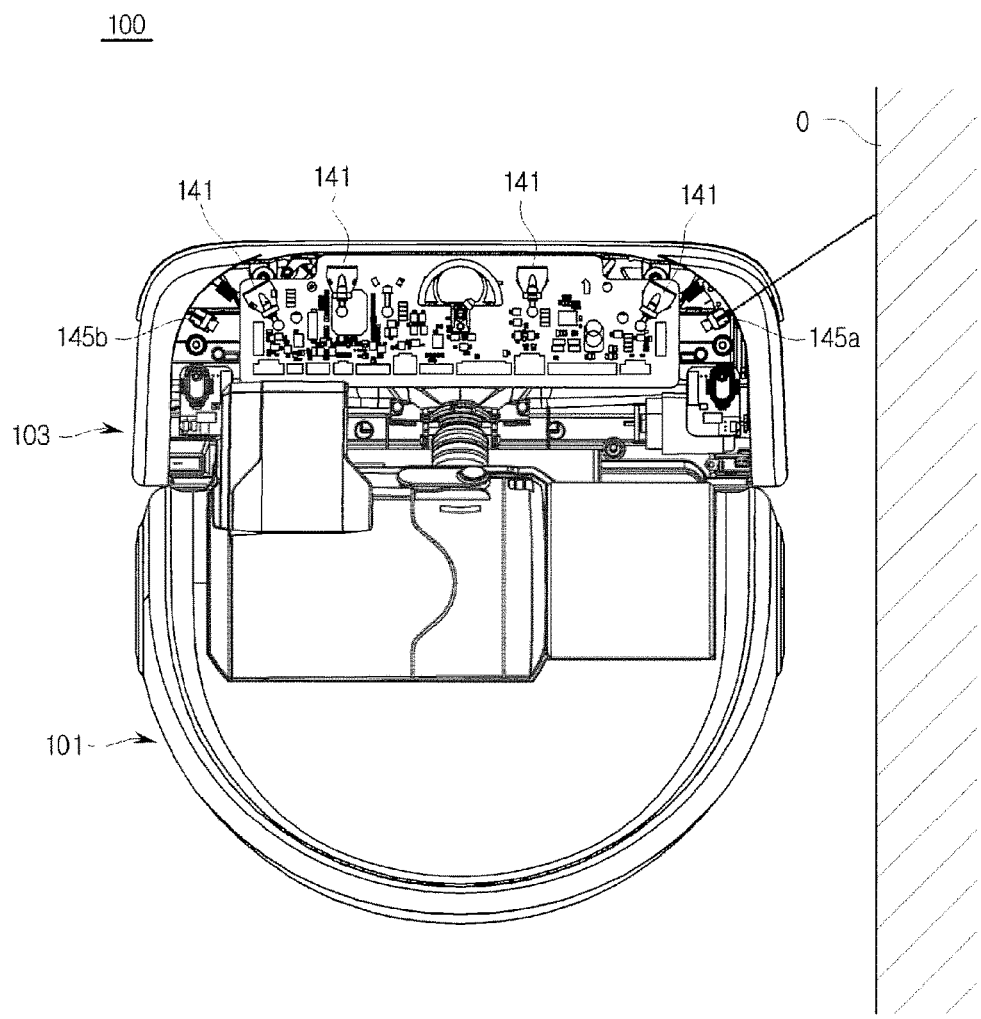

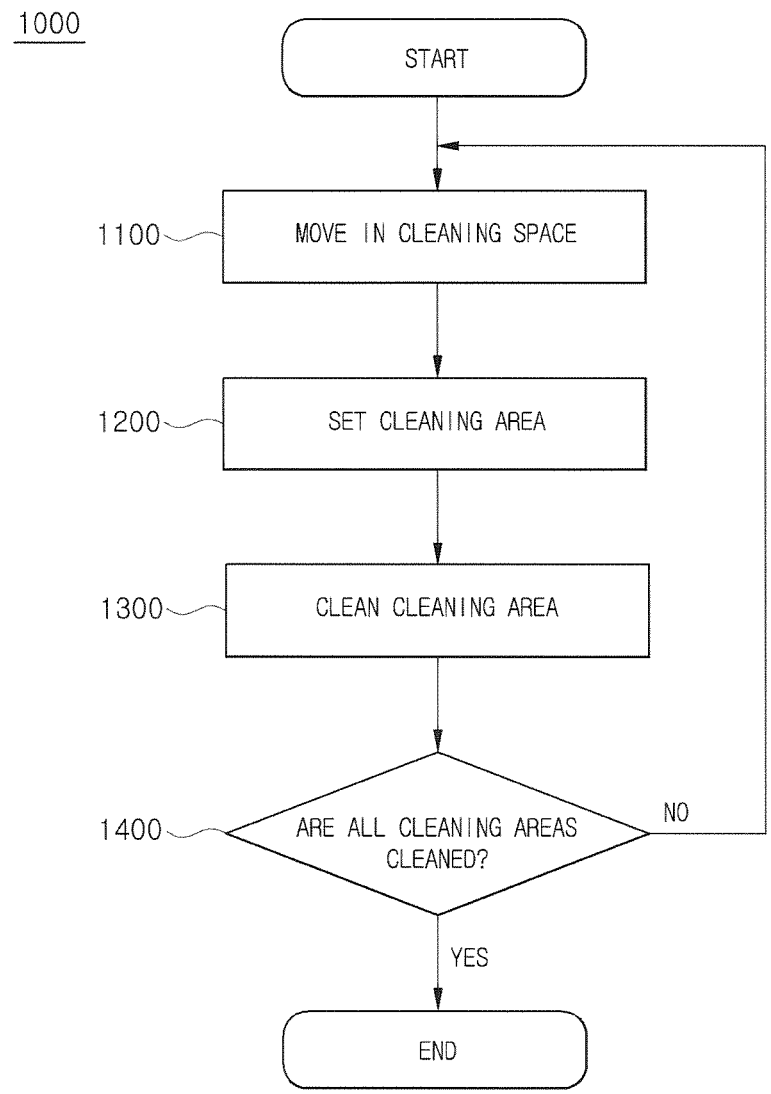
[Fig. 11]

[Fig. 12]
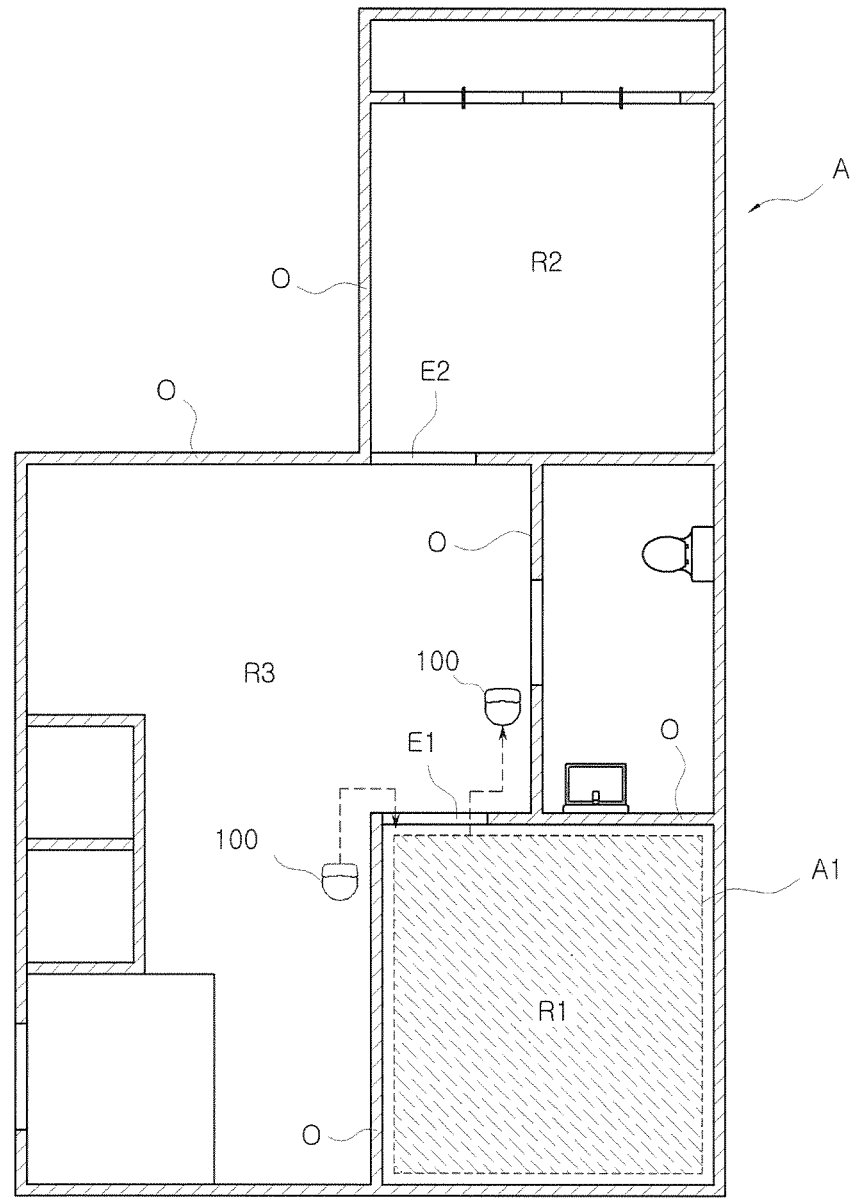

[Fig. 13]
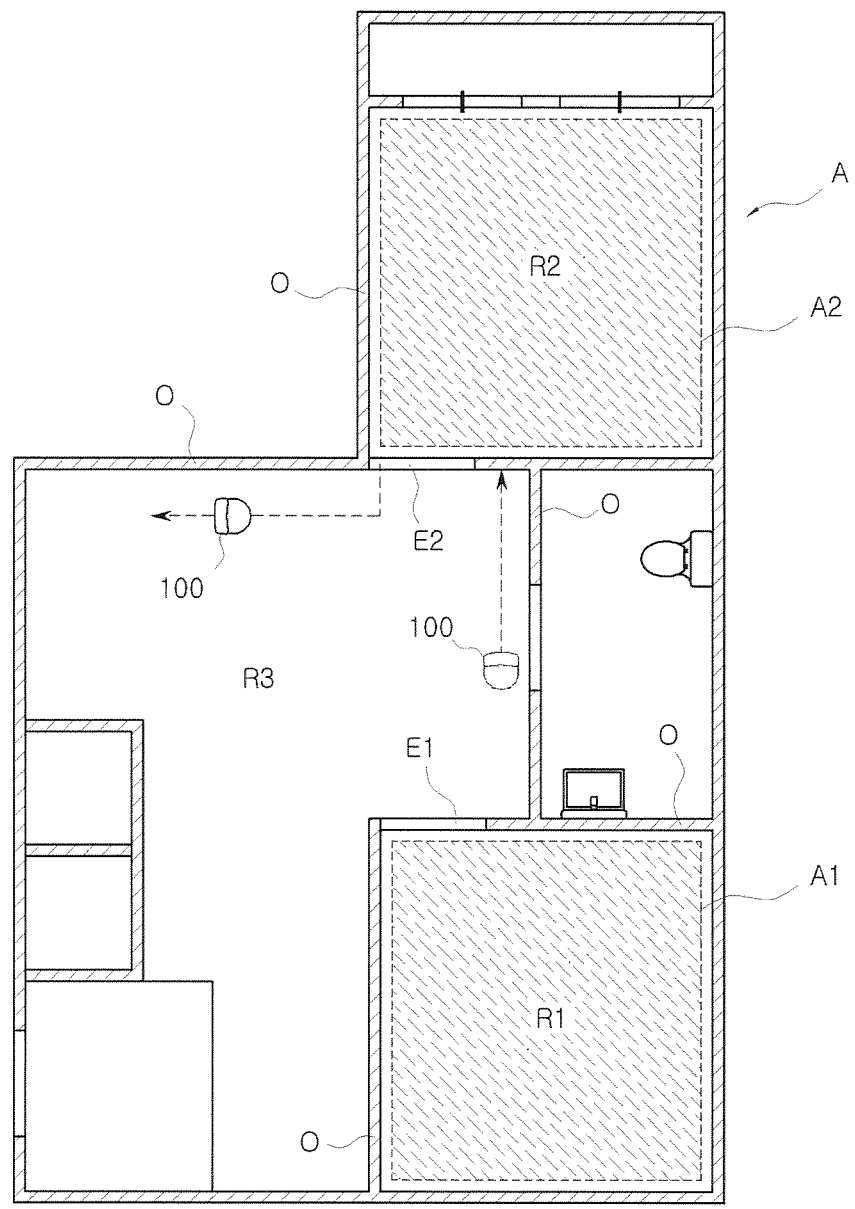

[Fig. 14]
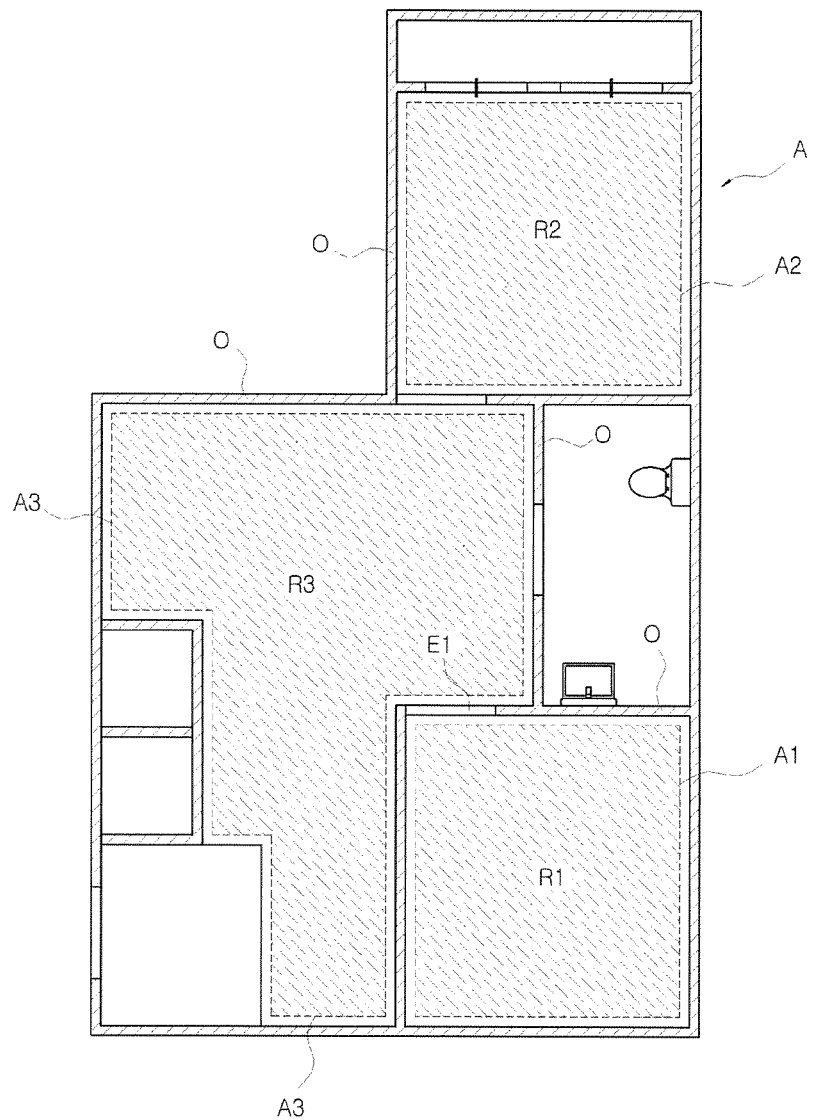

[Fig. 15]
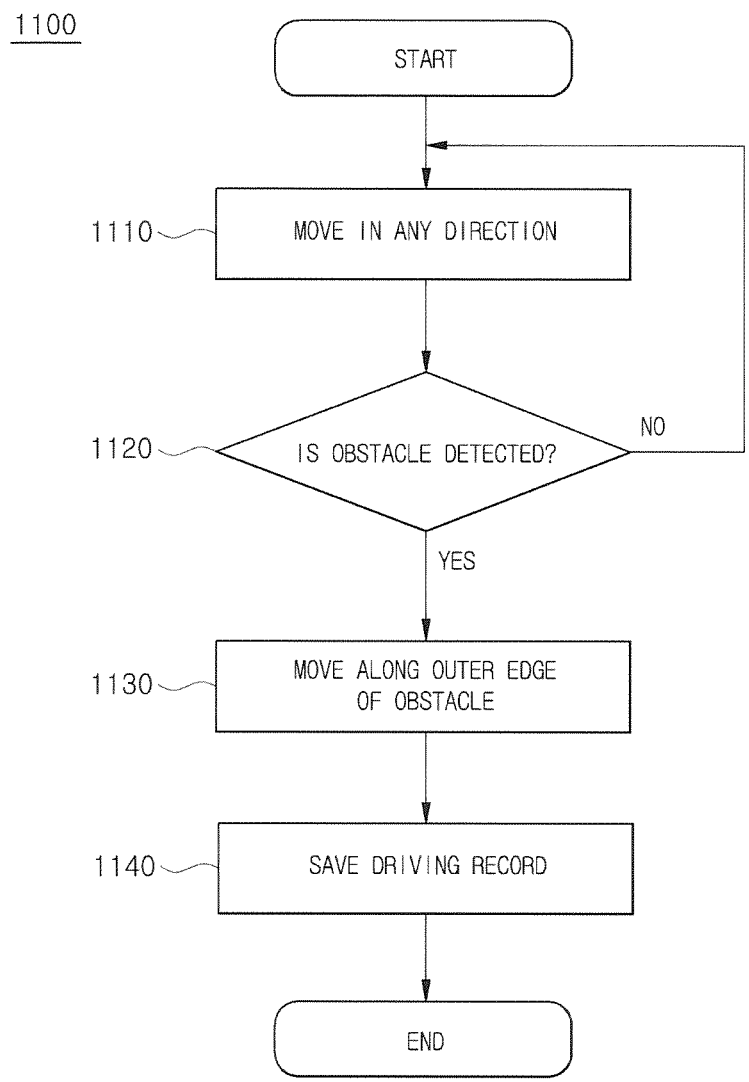

[Fig. 16]
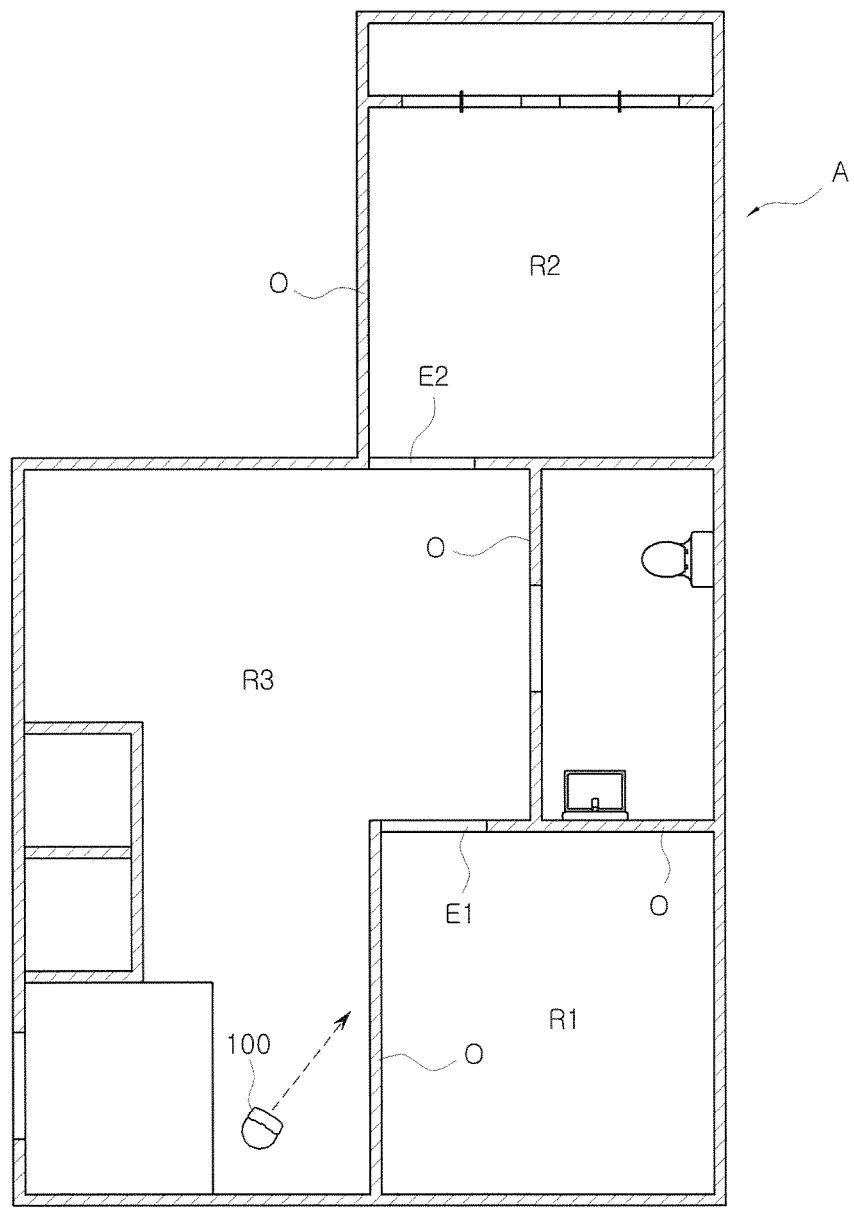

[Fig. 17]
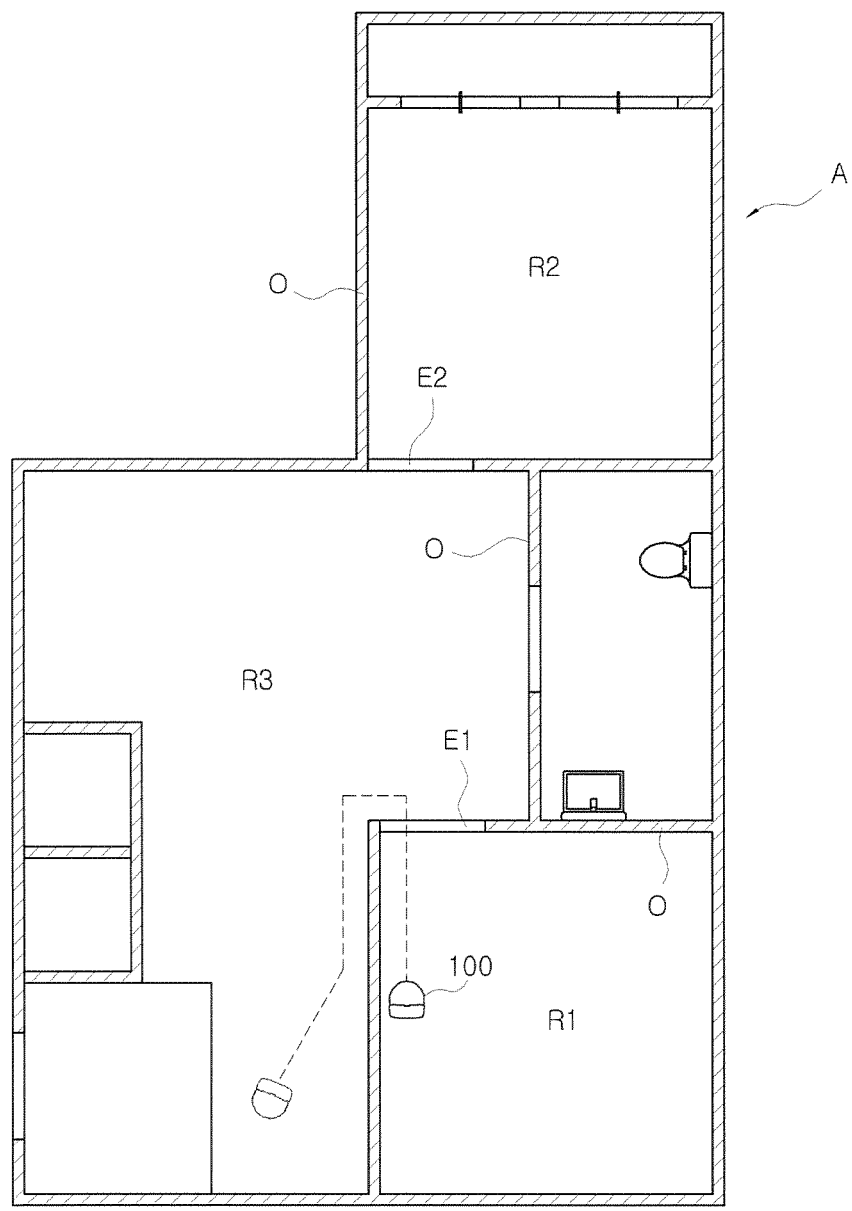

[Fig. 18]
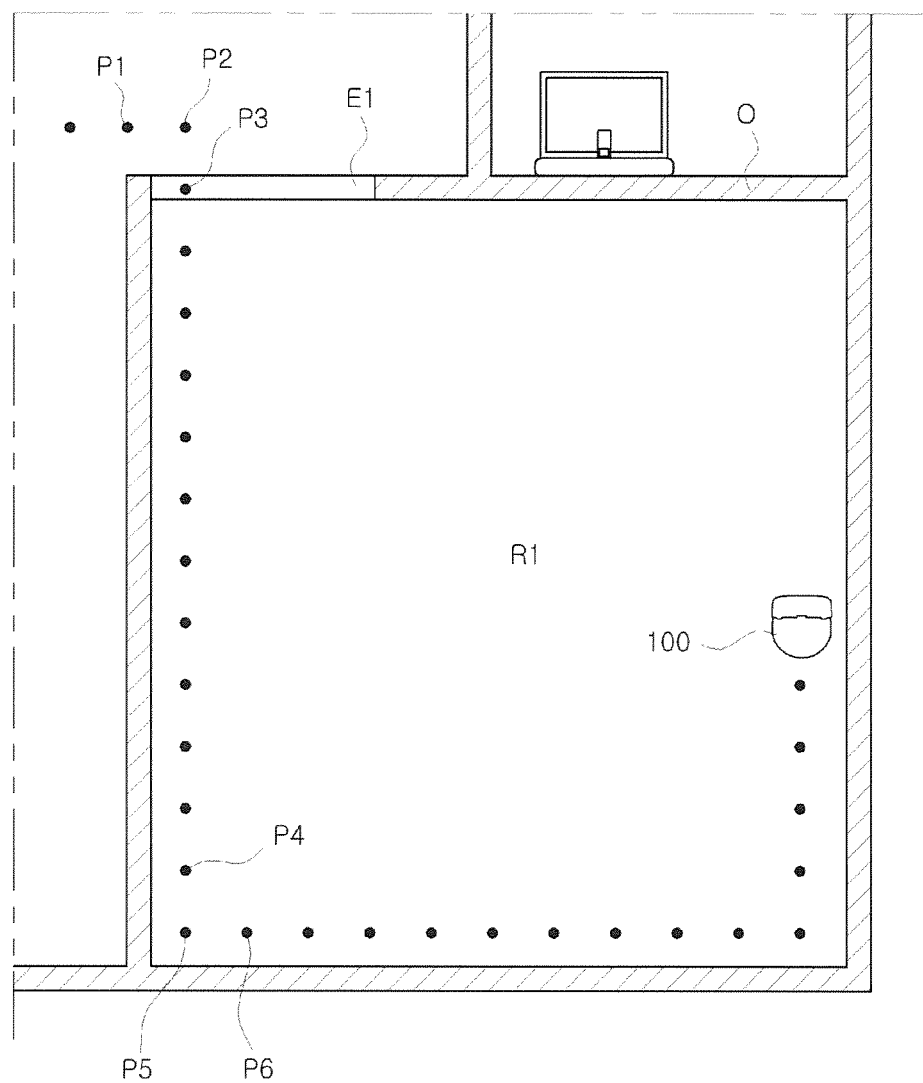

[Fig. 19]
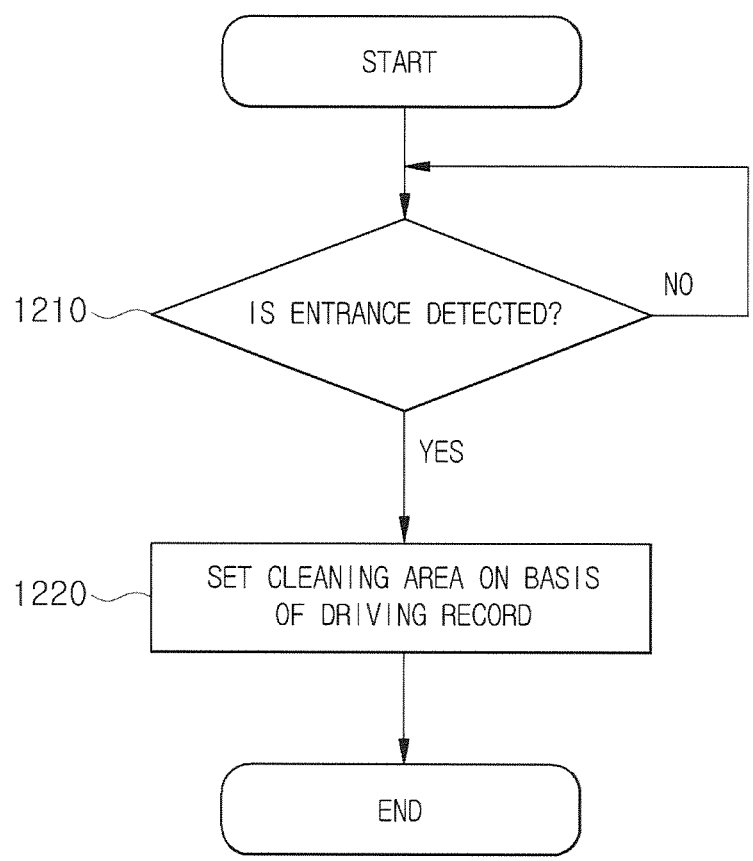

[Fig. 20]
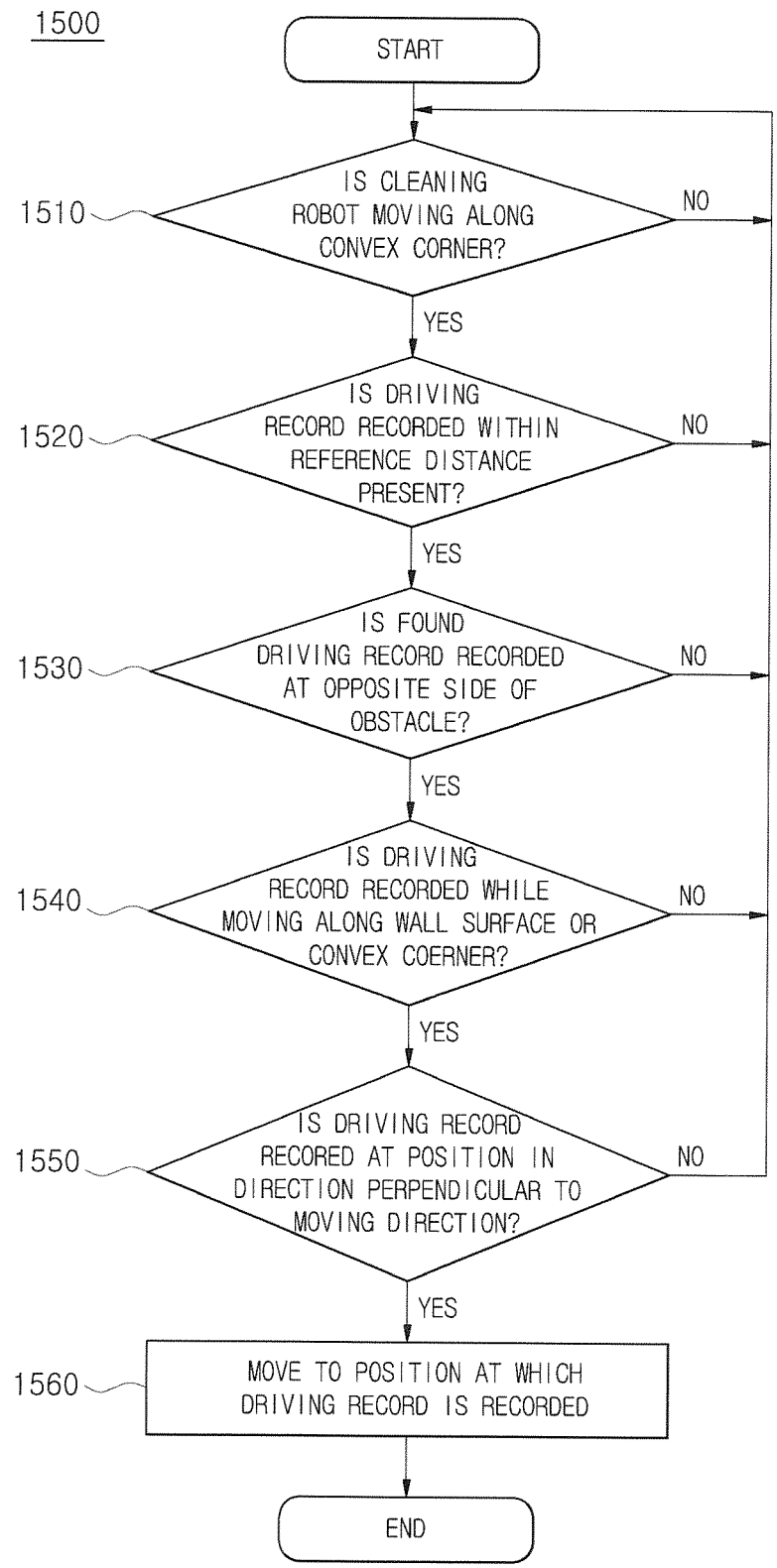

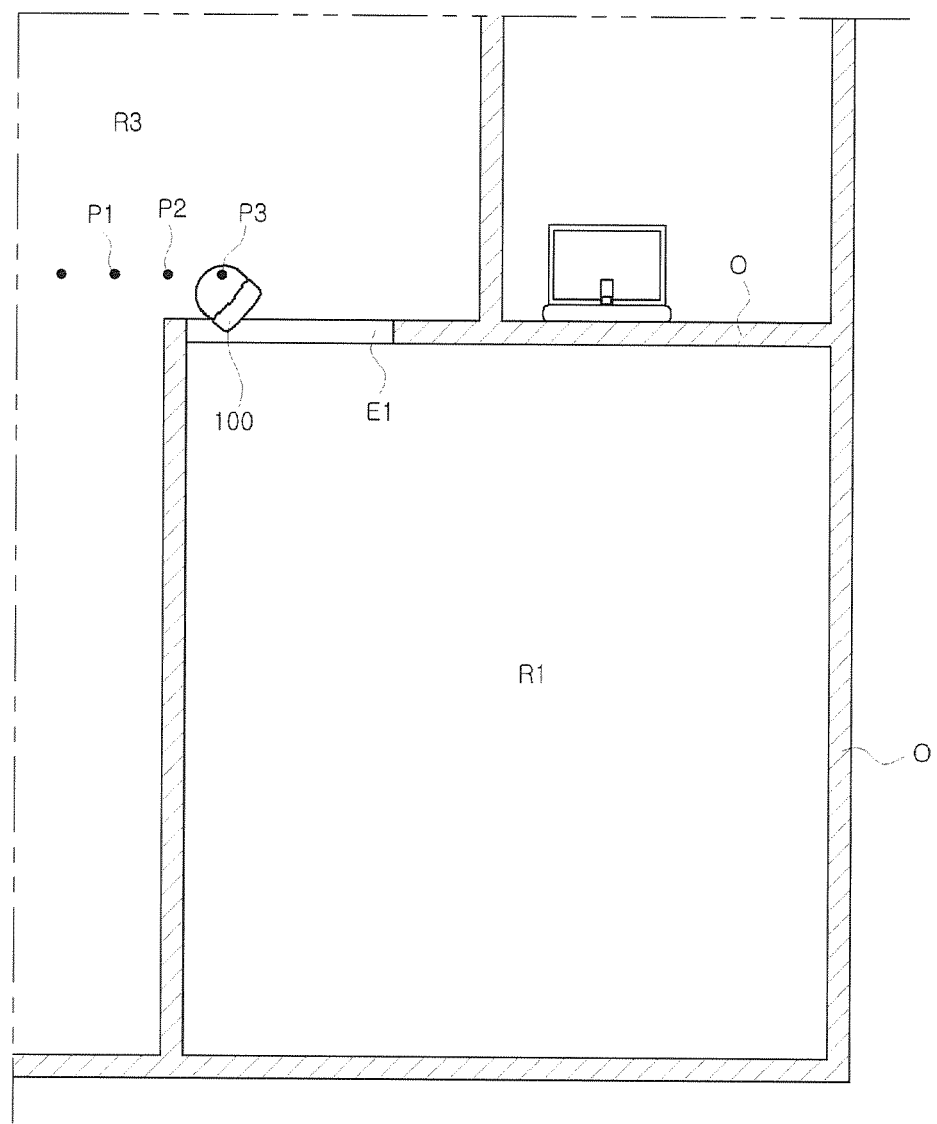
[Fig. 21]

[Fig. 22]
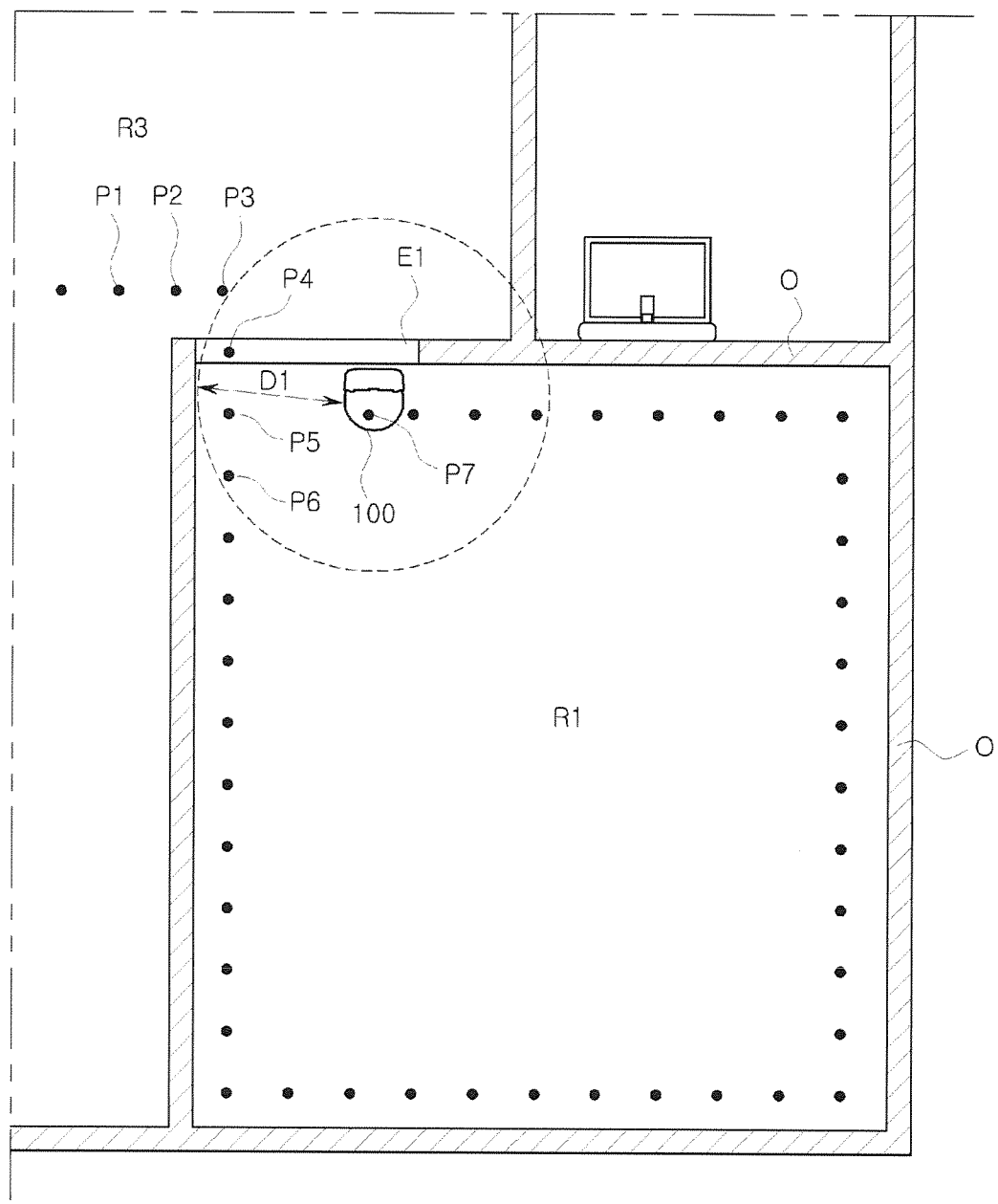

[Fig. 23]
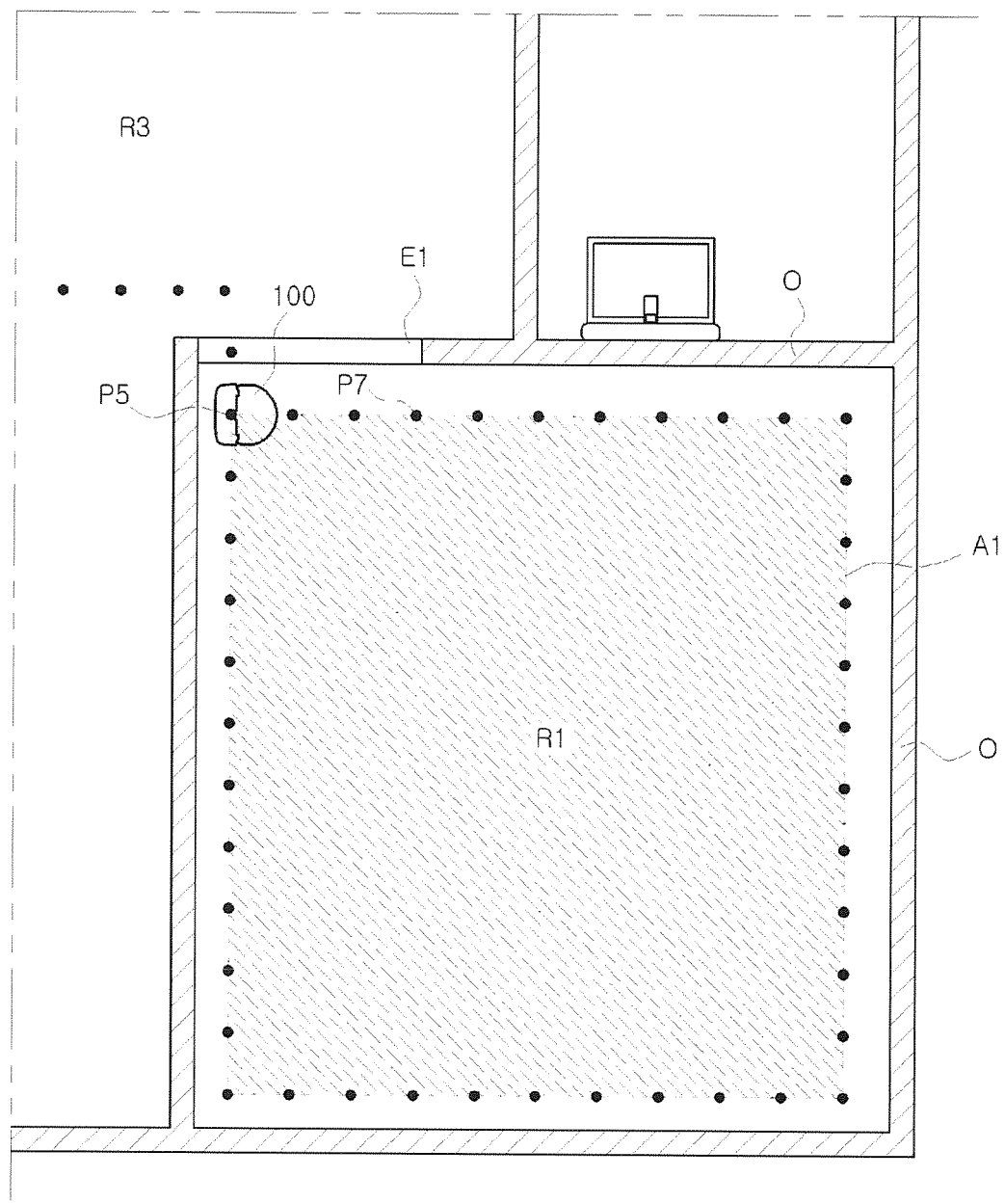

[Fig. 24]
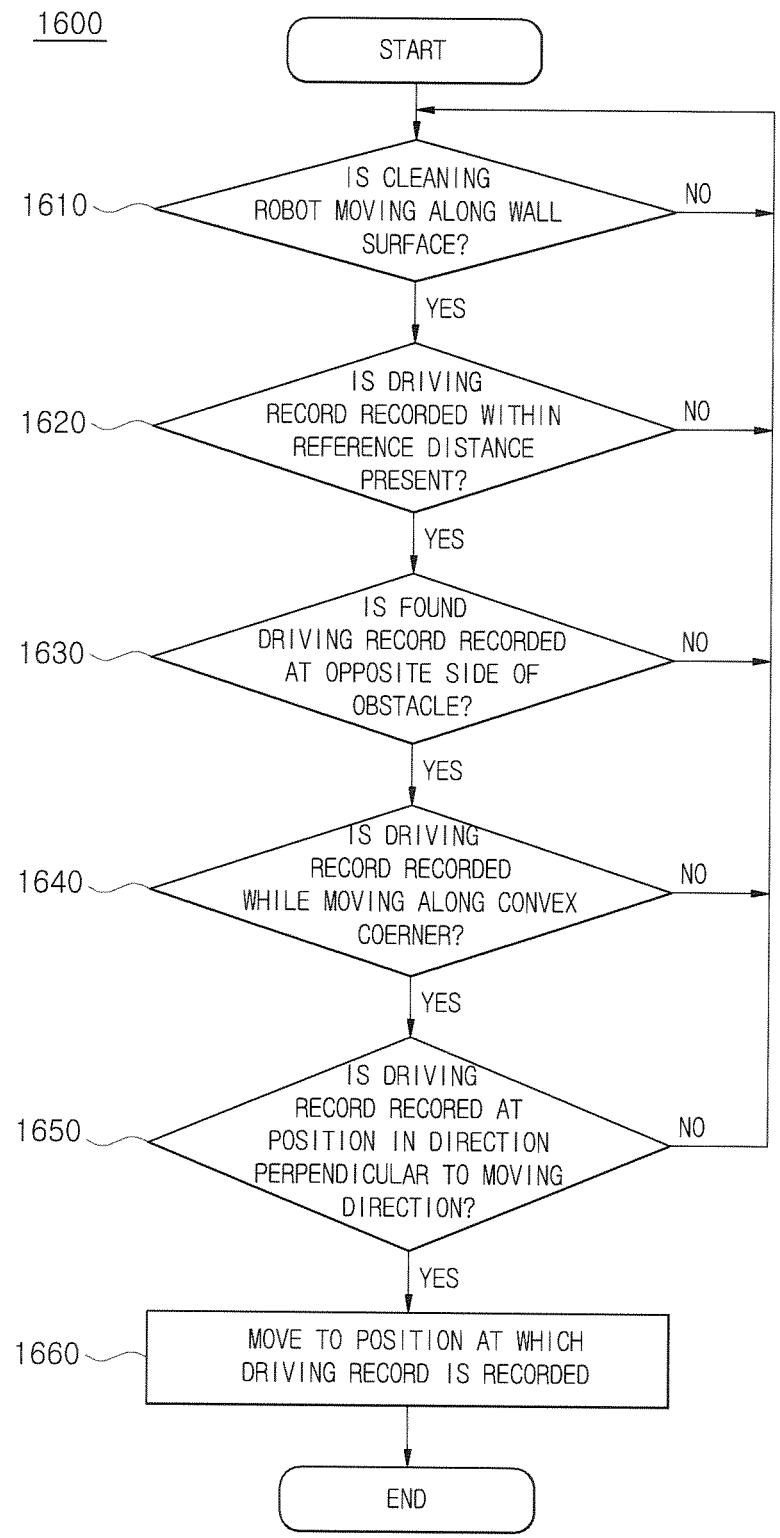

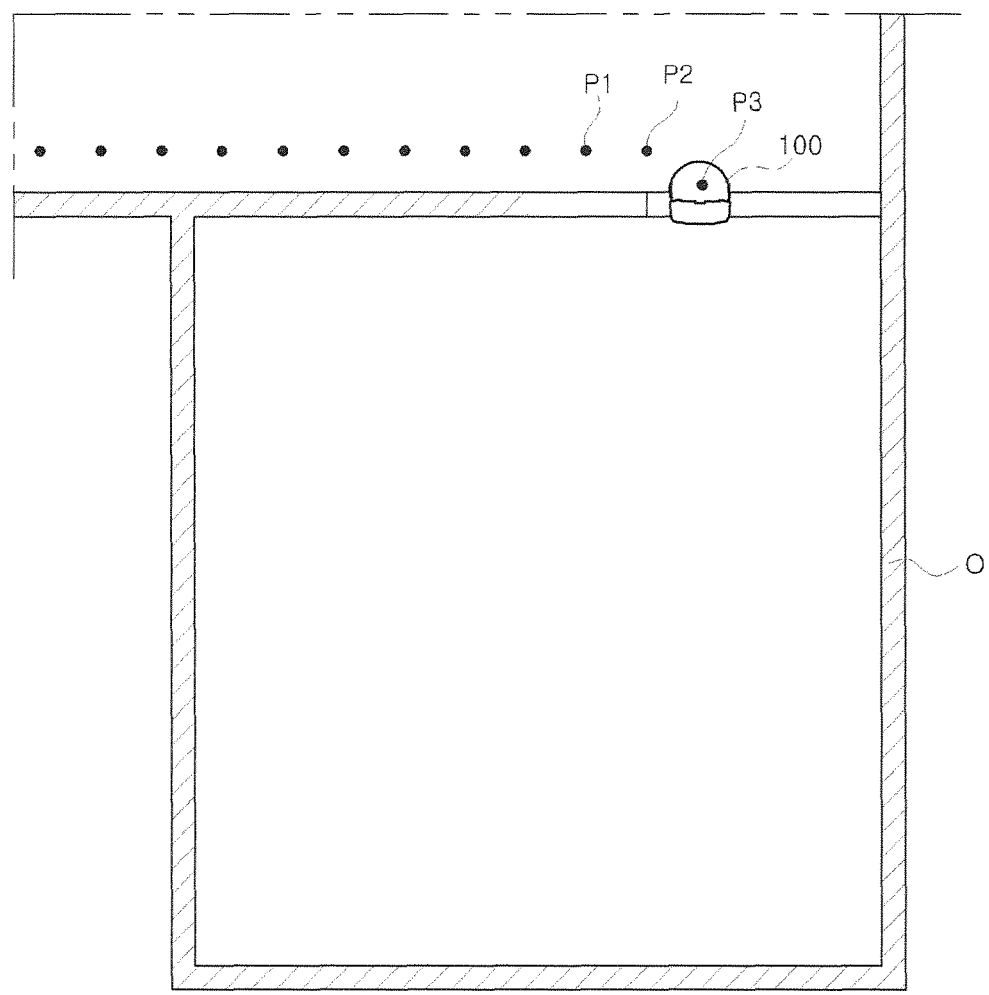
[Fig. 25]

[Fig. 26]
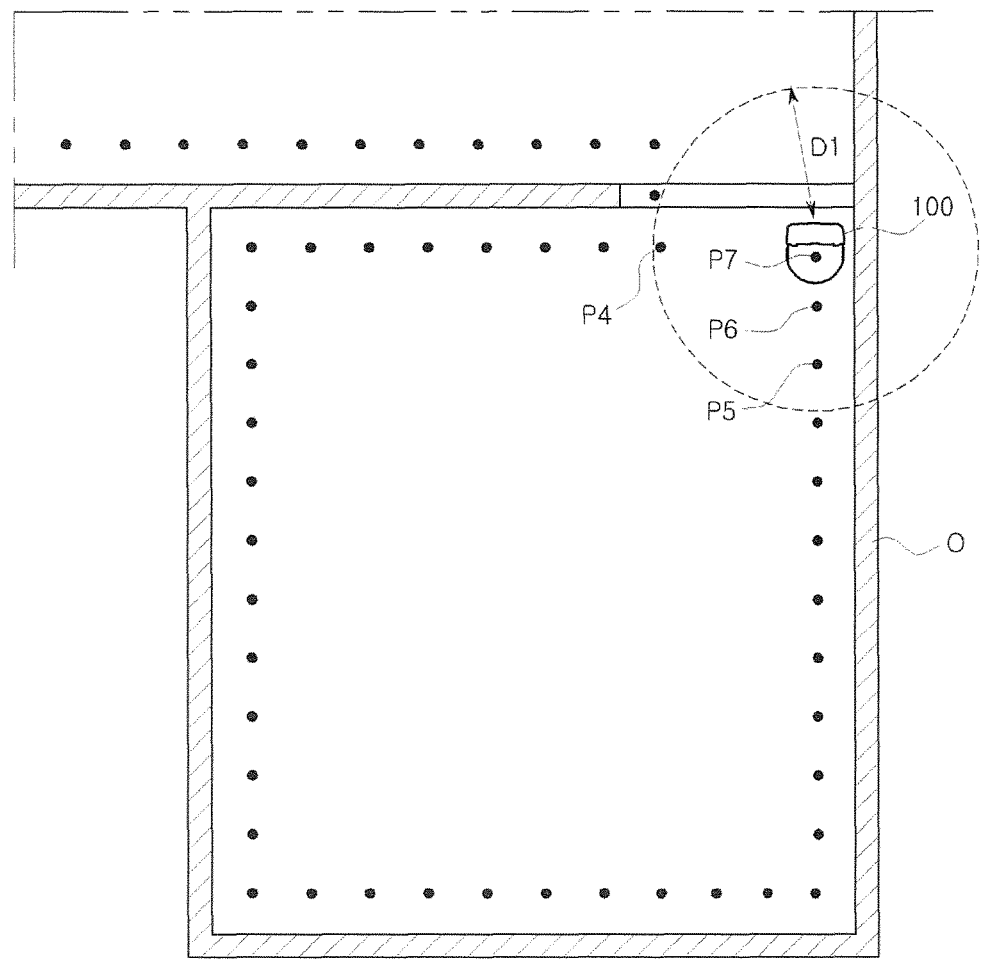

[Fig. 27]
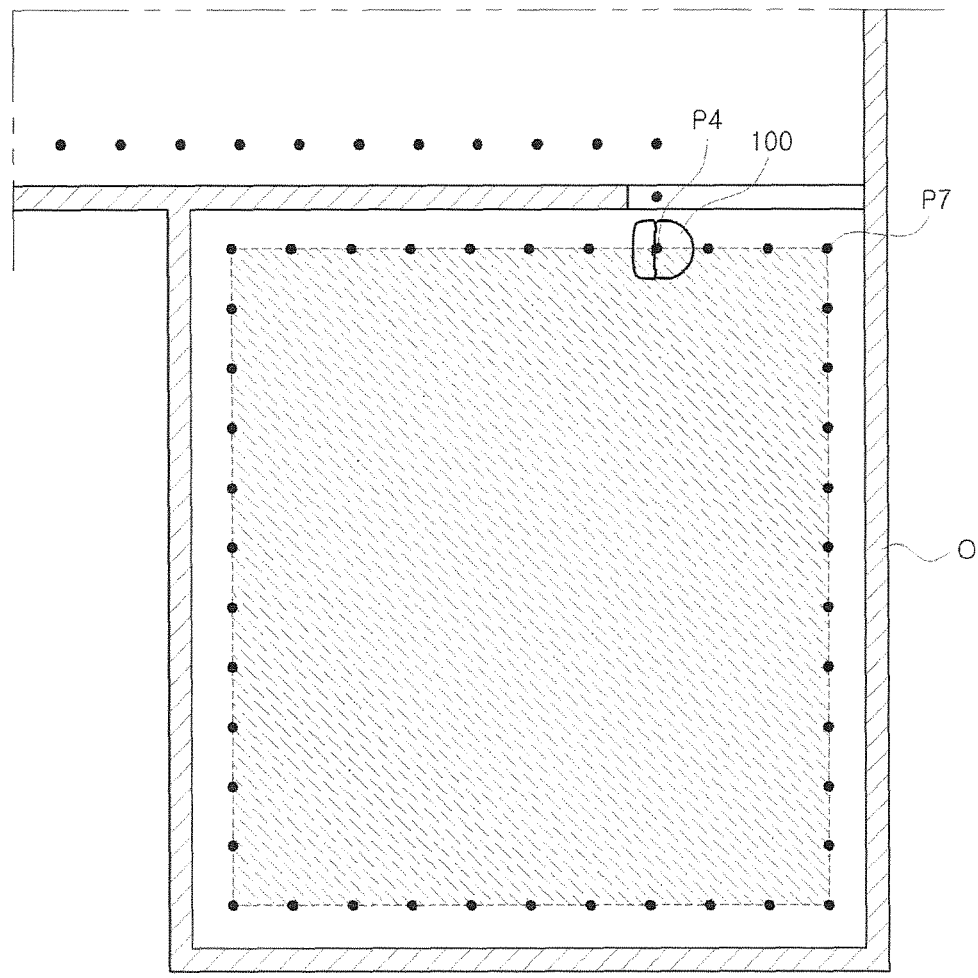

[Fig. 28]
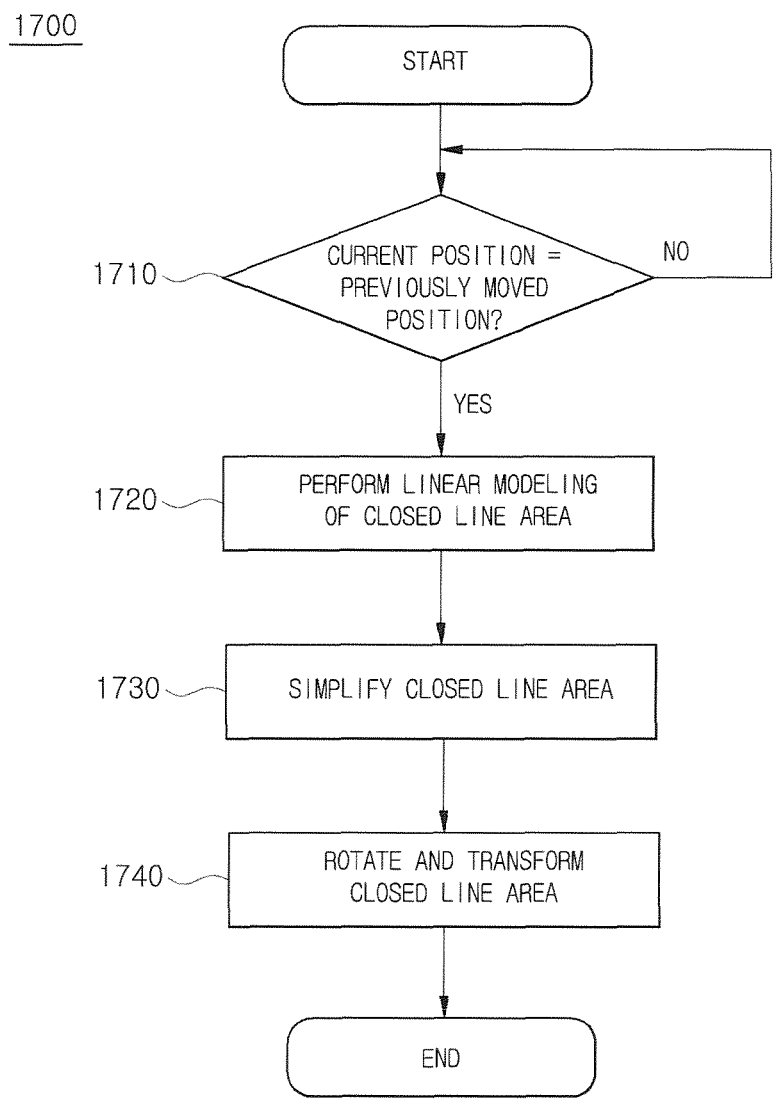

[Fig. 29]
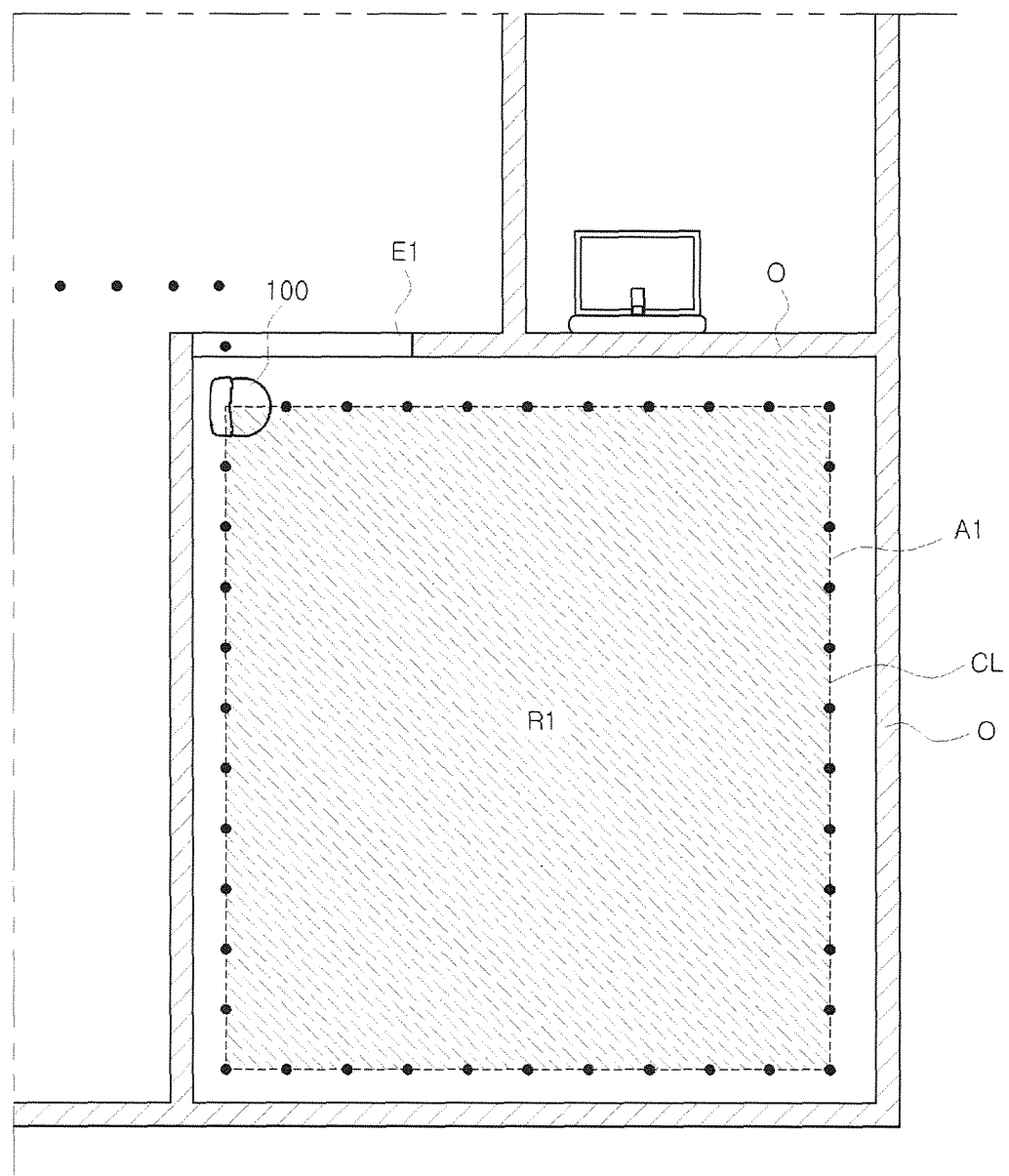

[Fig. 30]
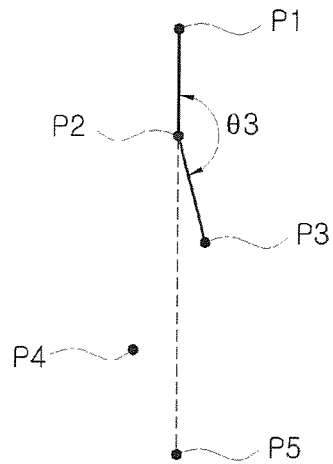
(a)
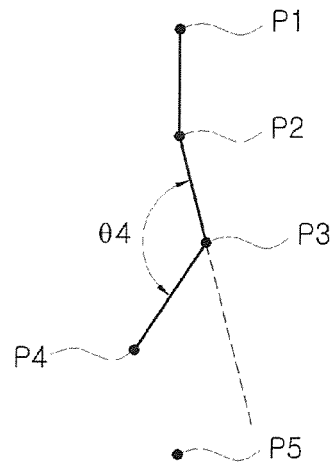
(b)
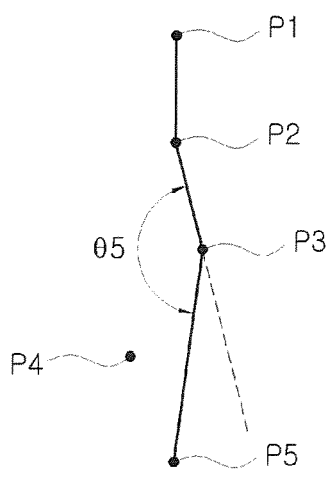
(c)

[Fig. 31]
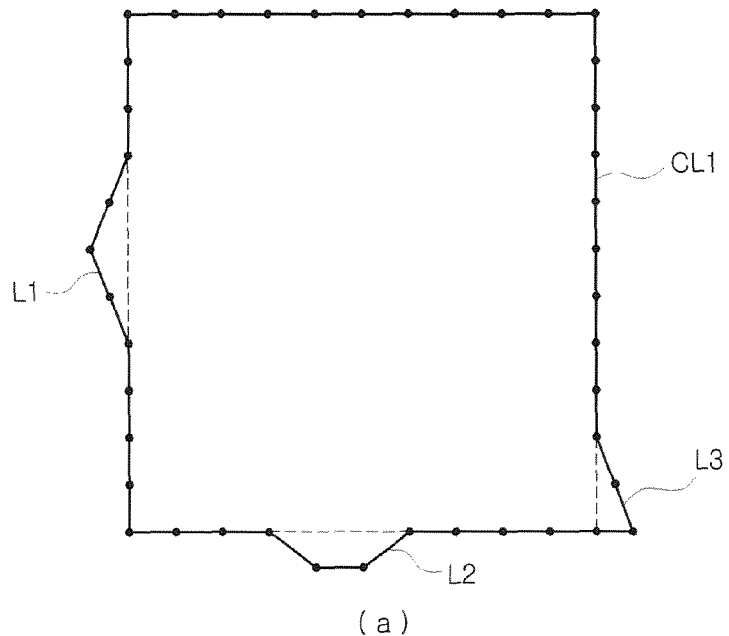
(a)
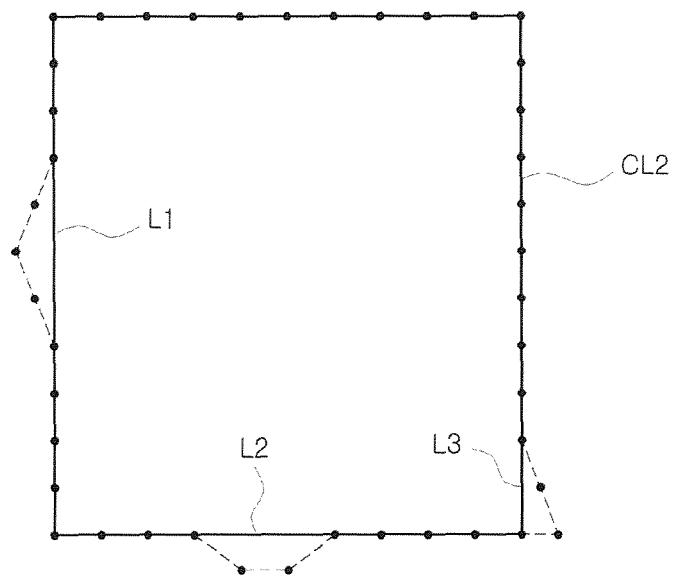
(b)

[Fig. 32]
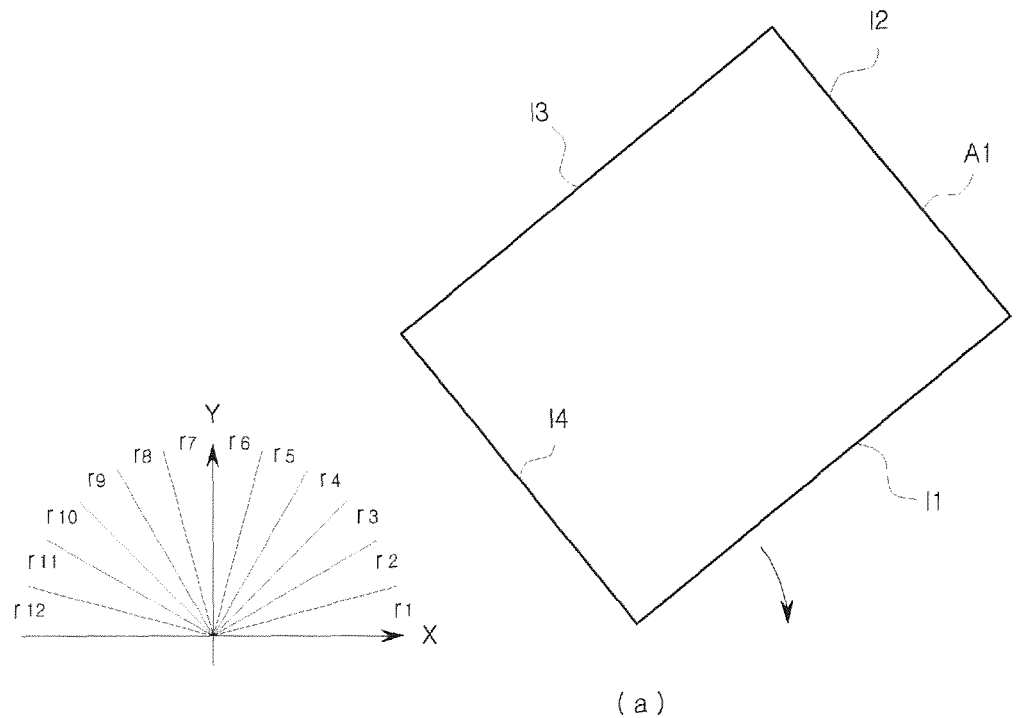
(a)
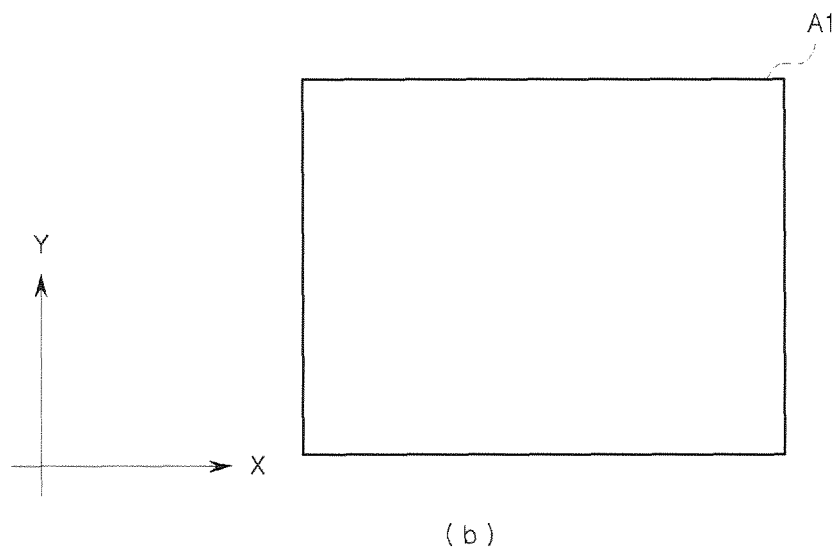
(b)

[Fig. 33]
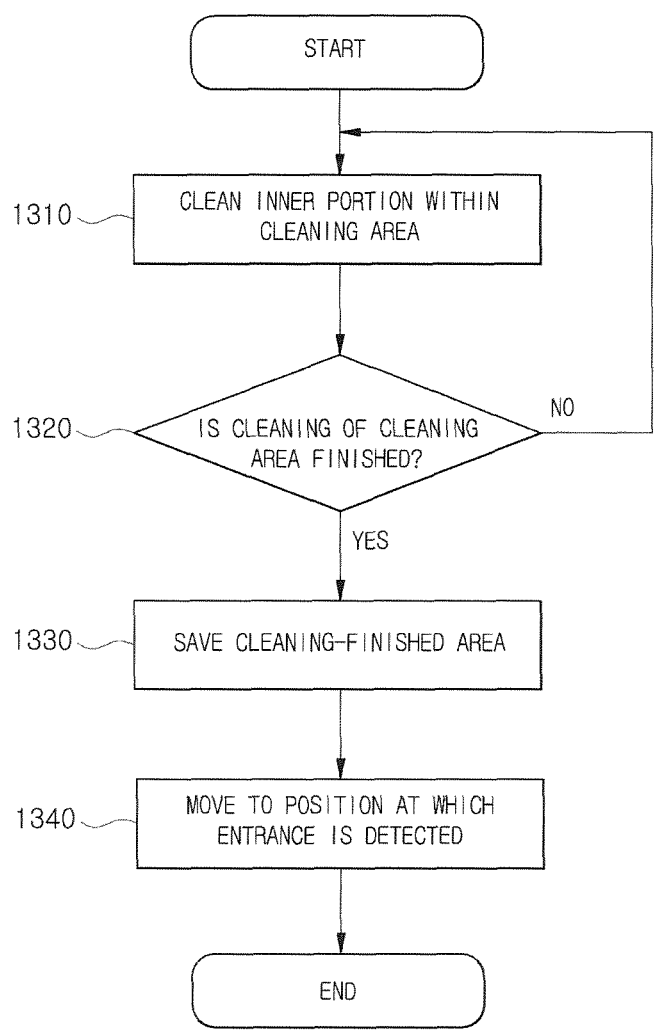

[Fig. 34]
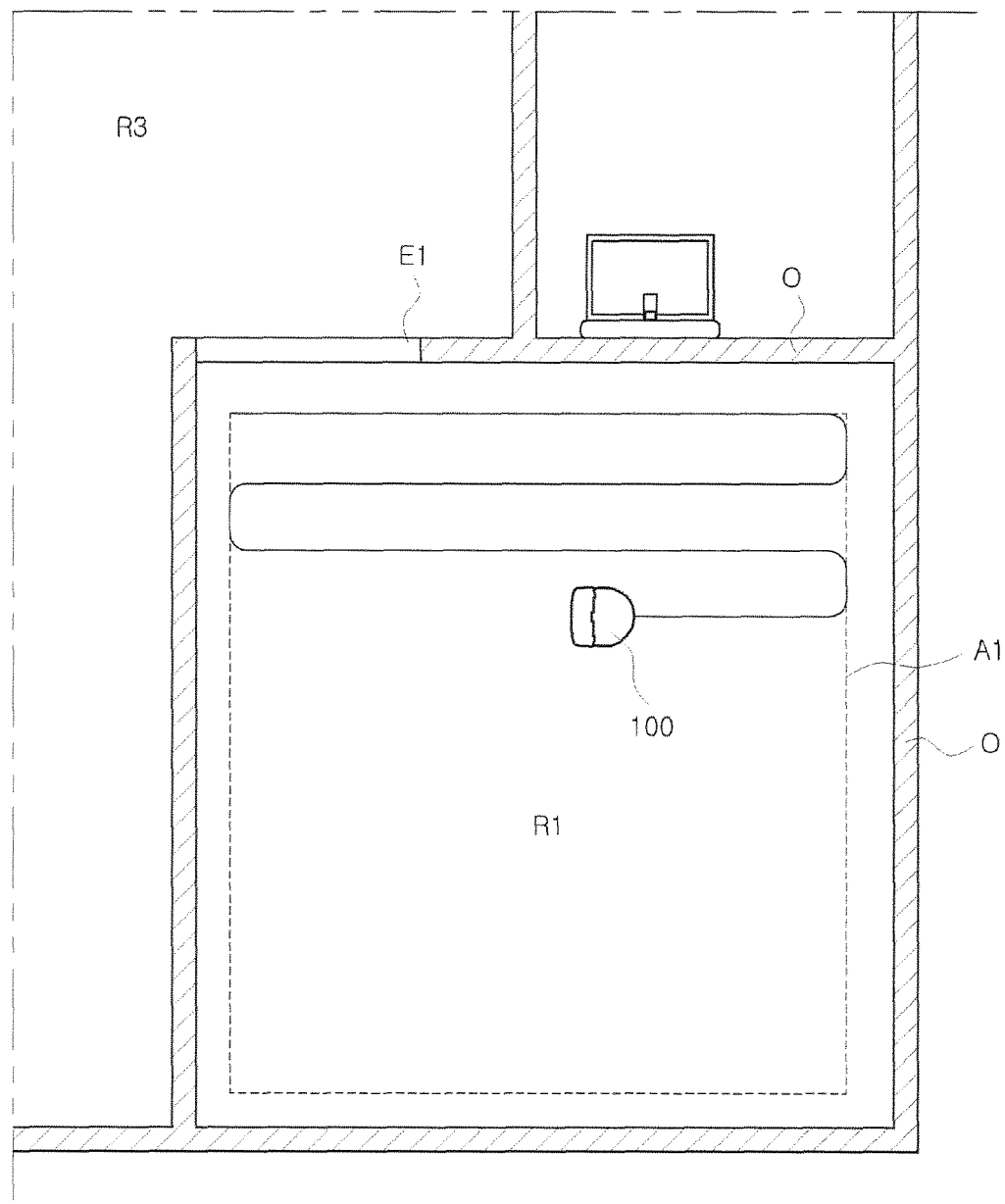

[Fig. 35]
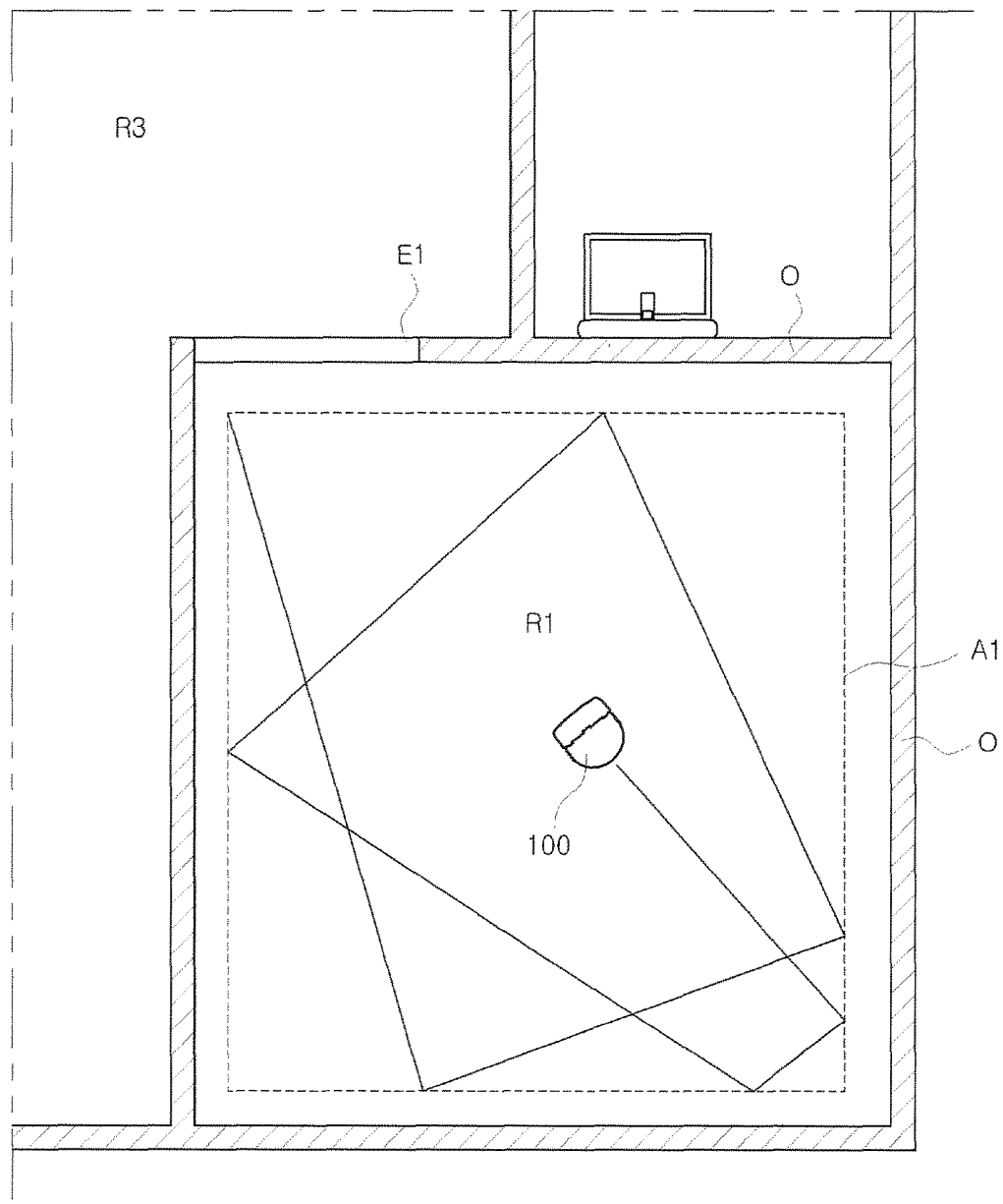

[Fig. 36]
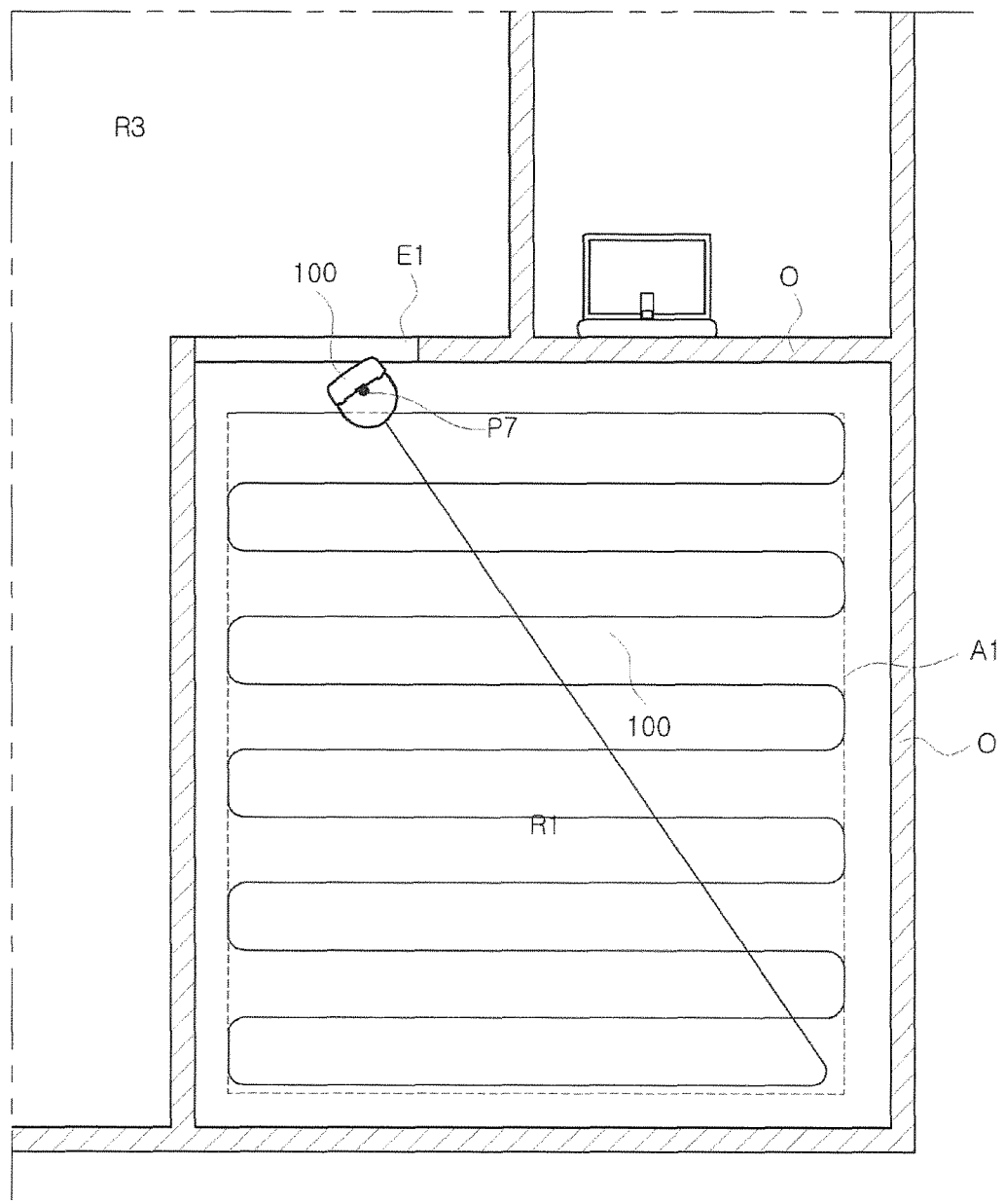

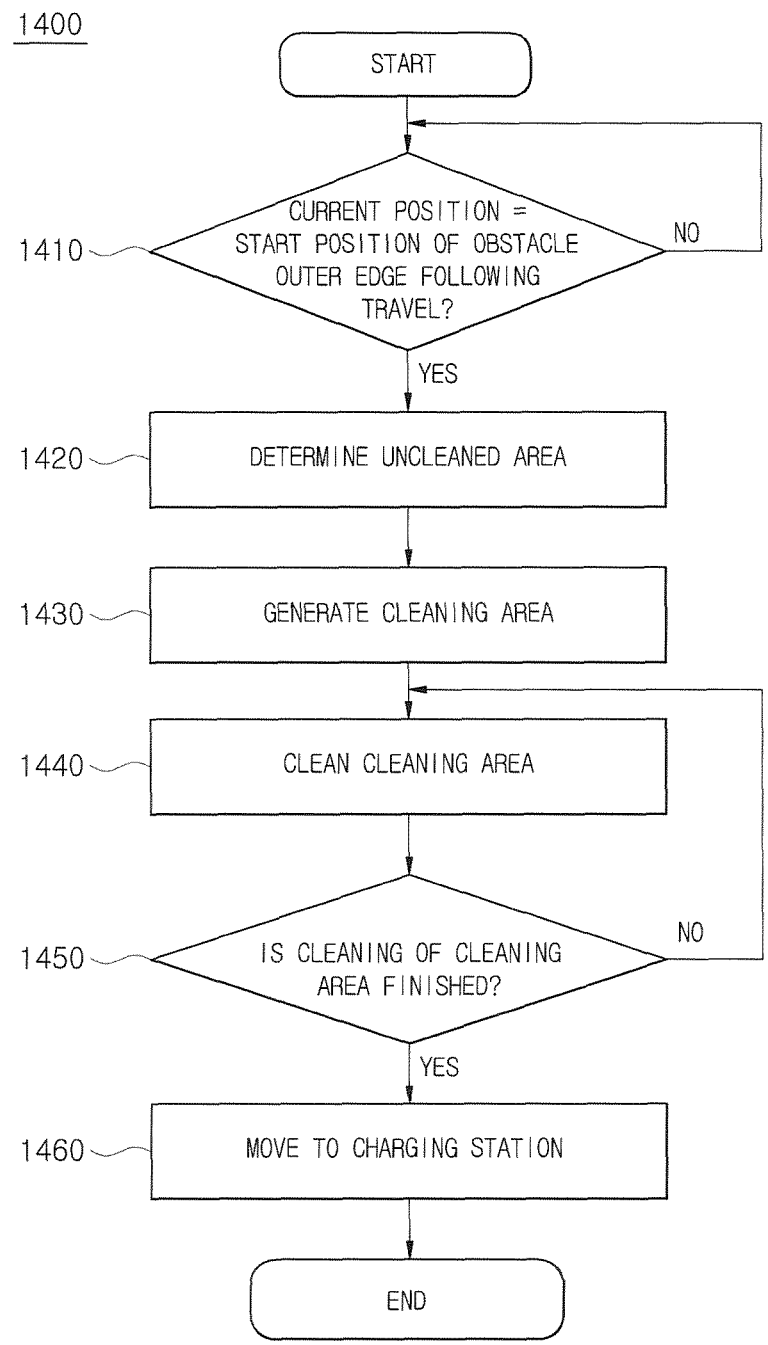
[Fig. 37]

[Fig. 38]
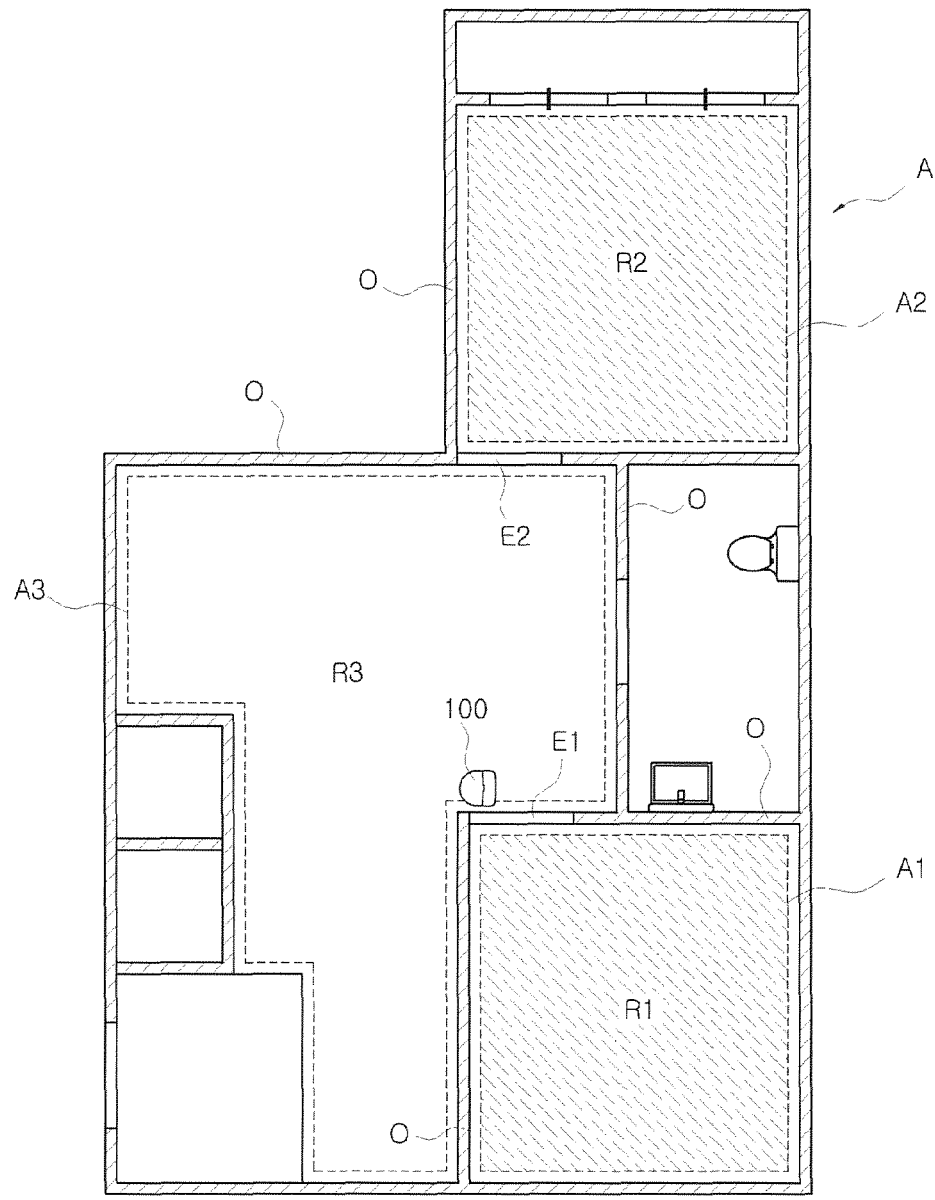

[Fig. 39]
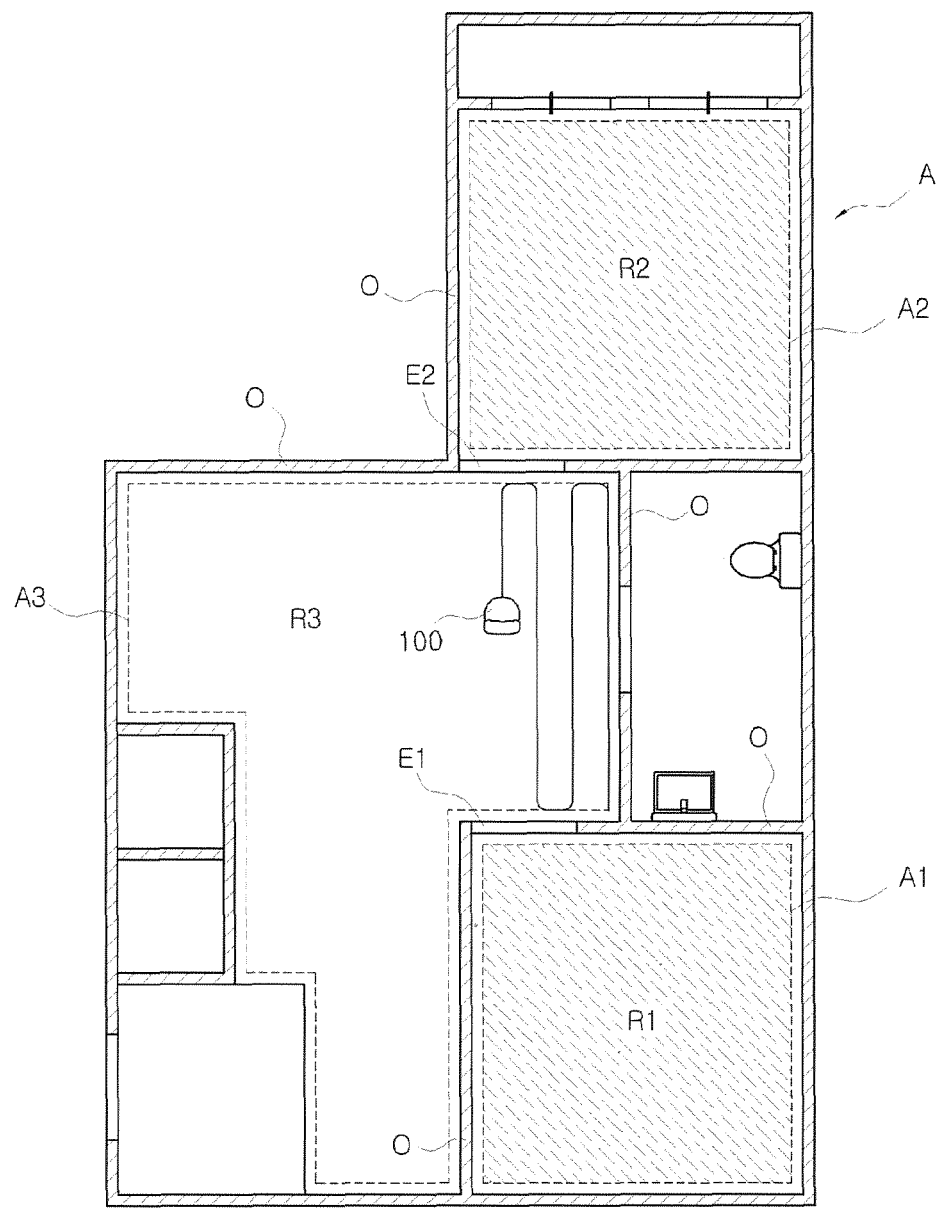

[Fig. 40]
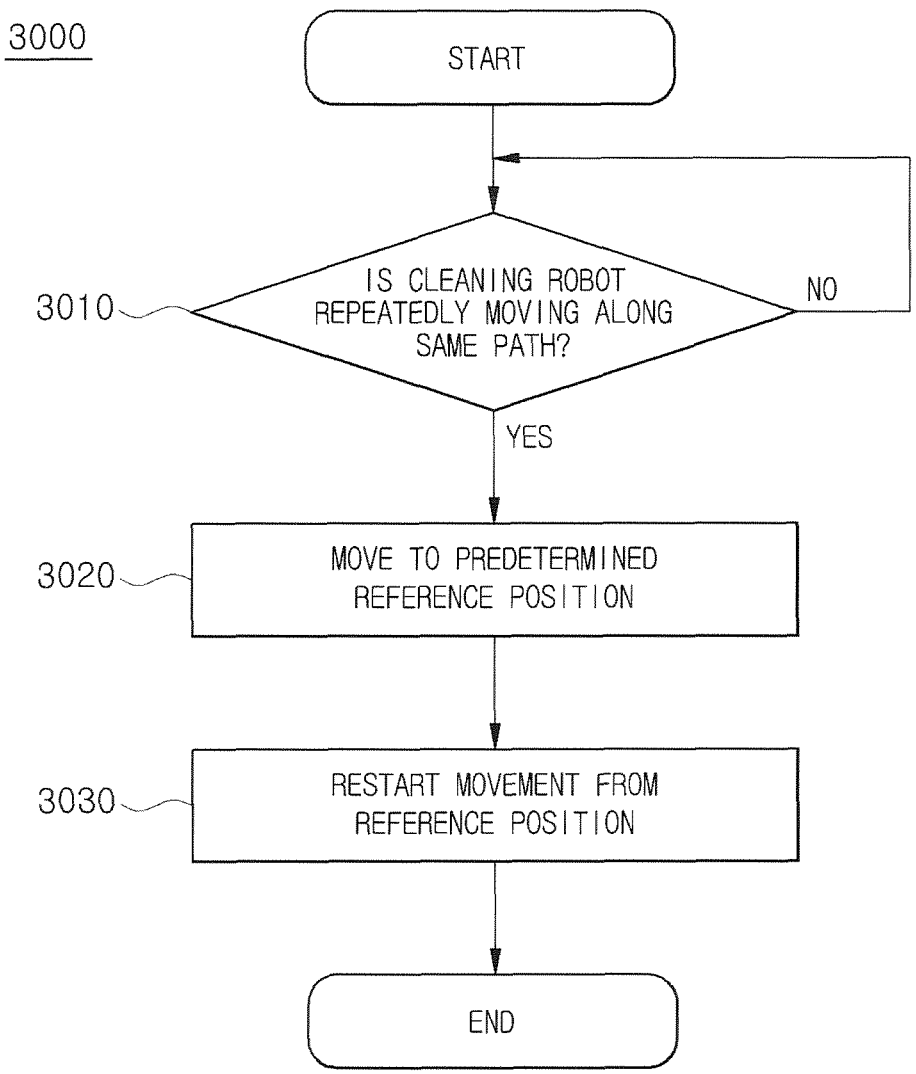

[Fig. 41]
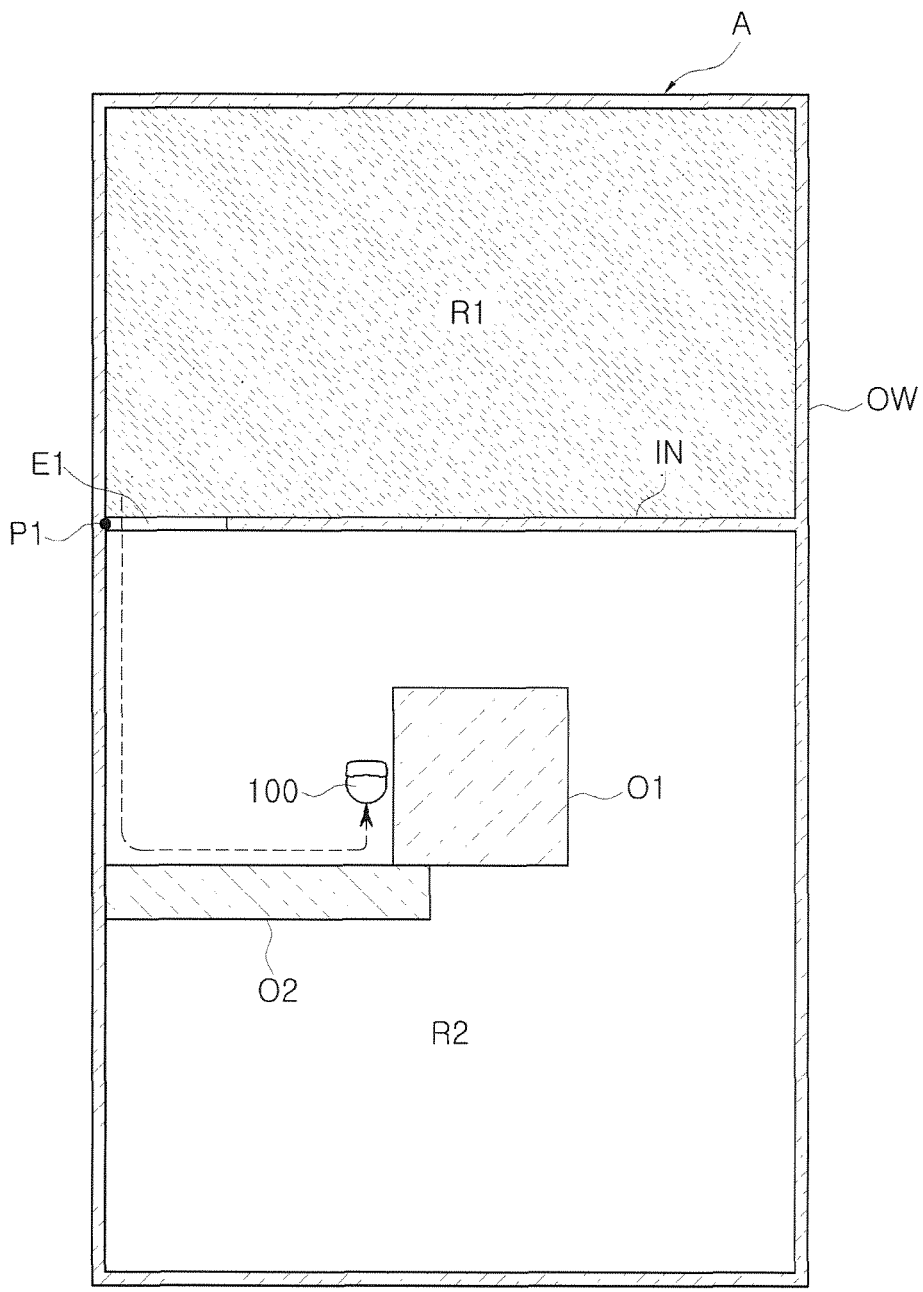

[Fig. 42]
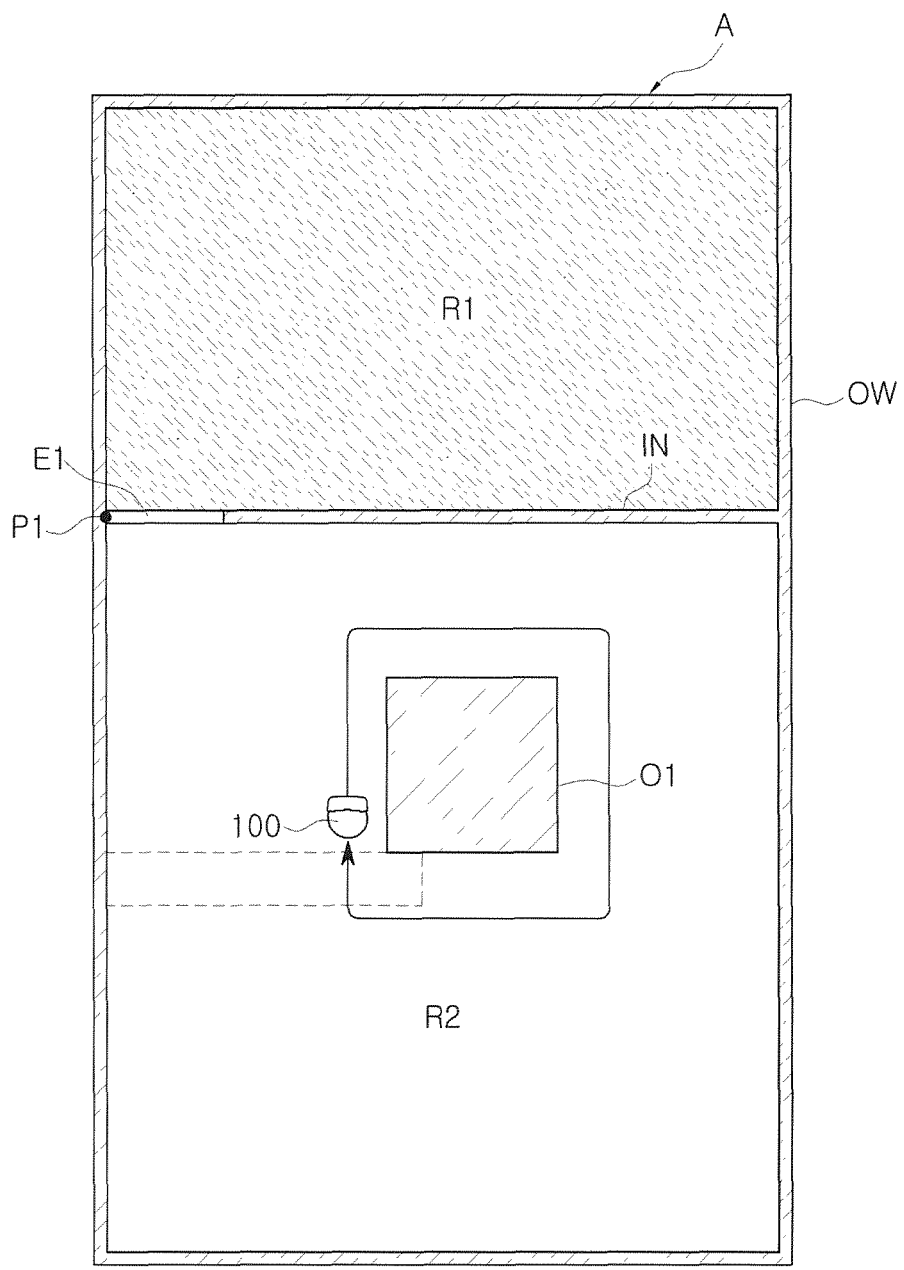

[Fig. 43]
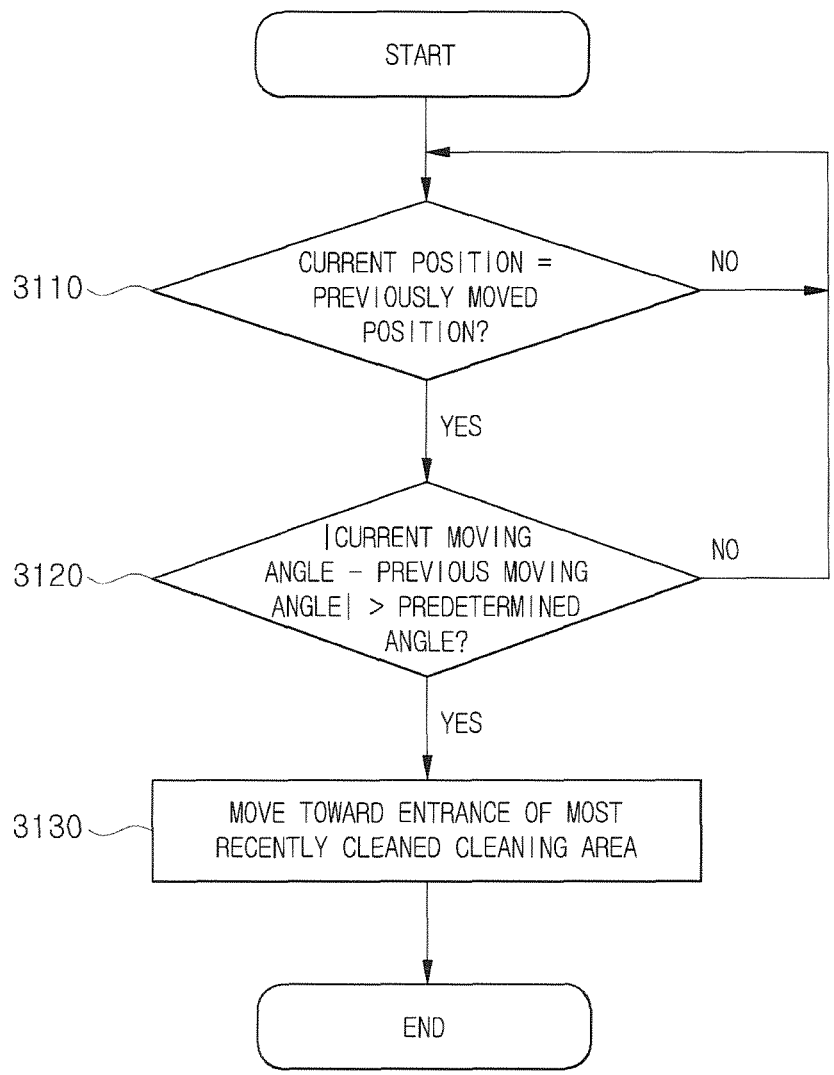

[Fig. 44]
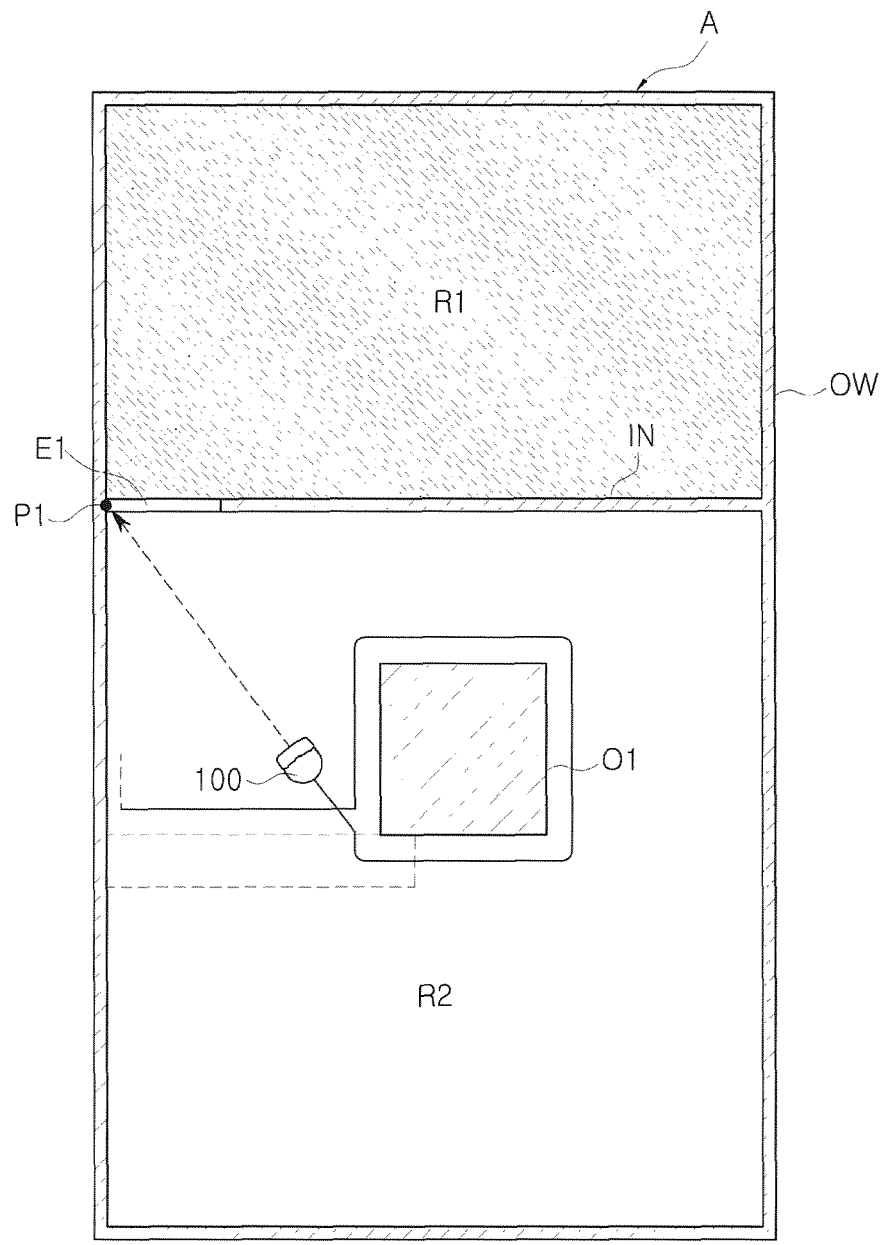

[Fig. 45]
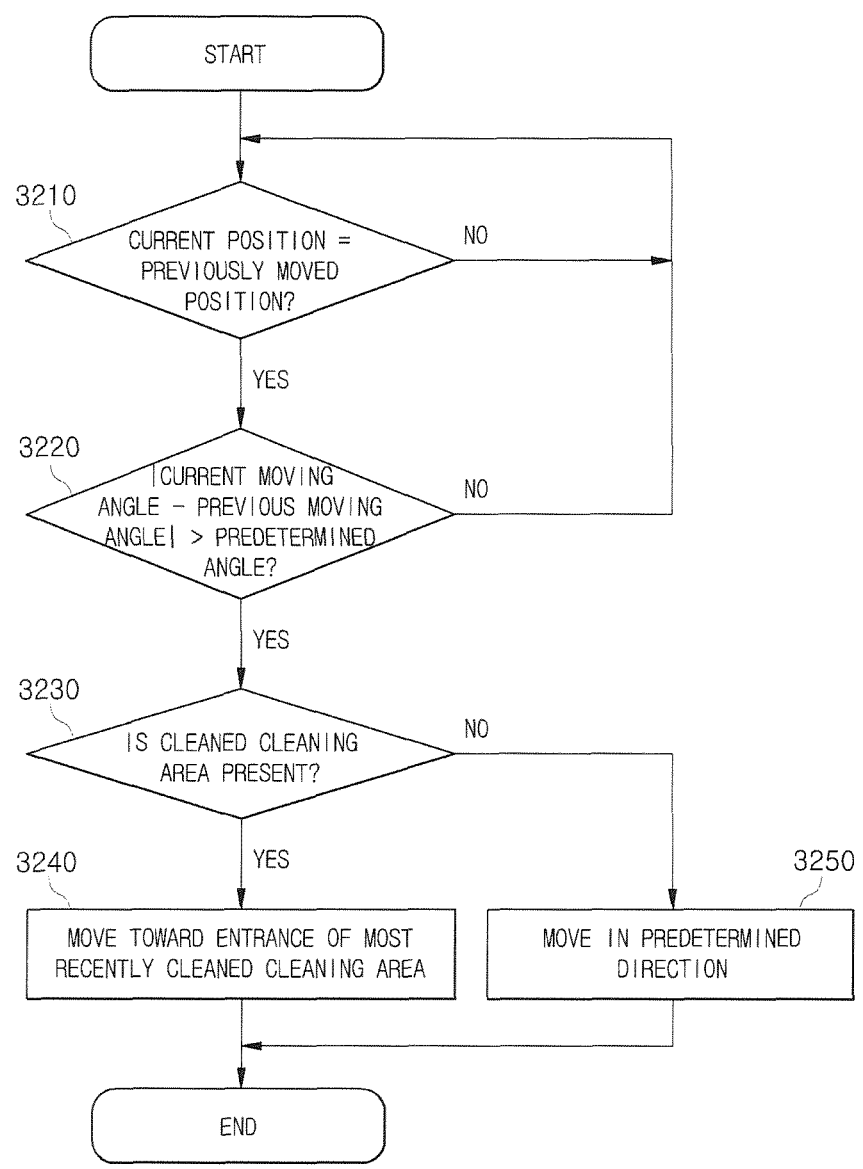

[Fig. 46]
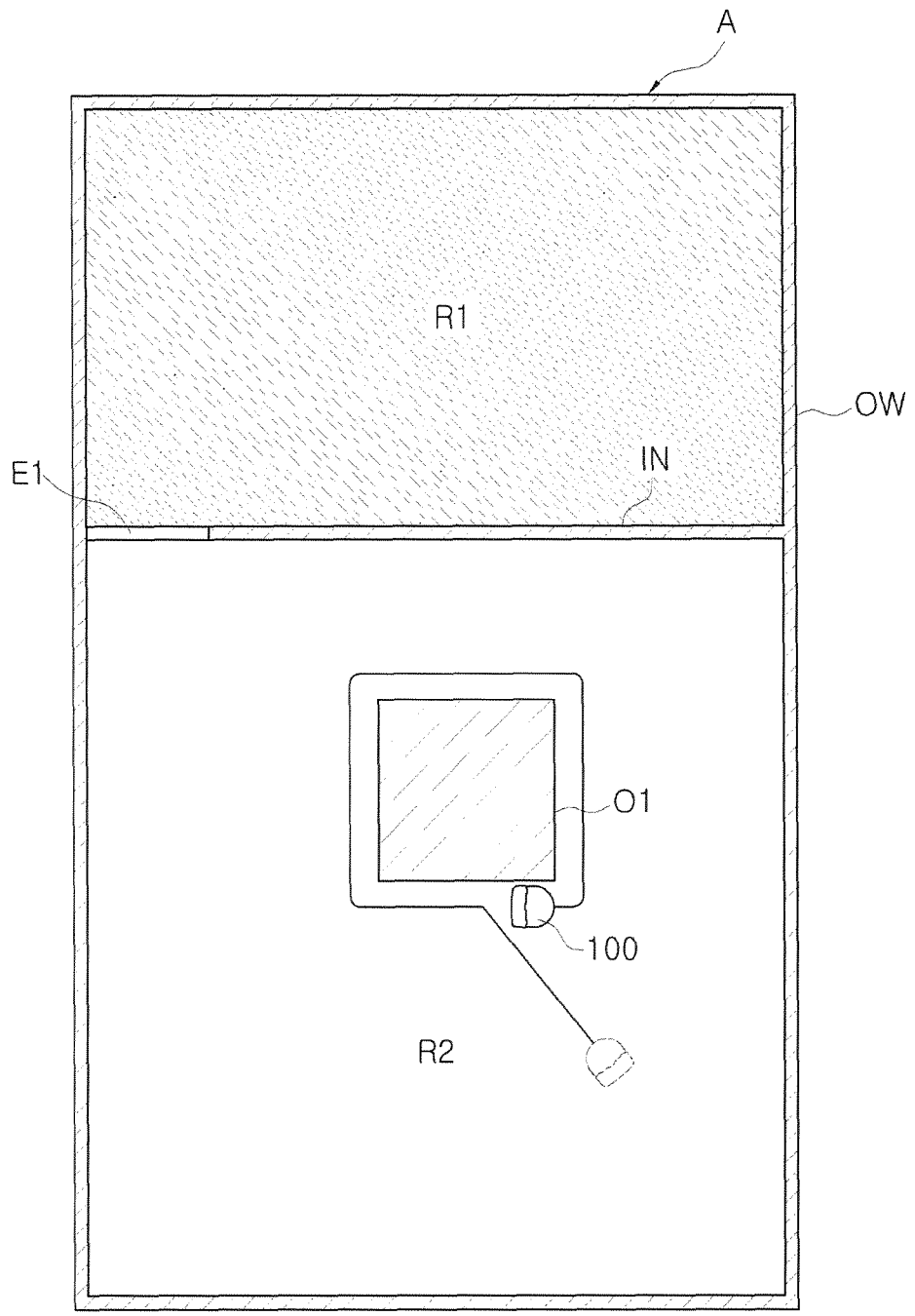

[Fig. 47]
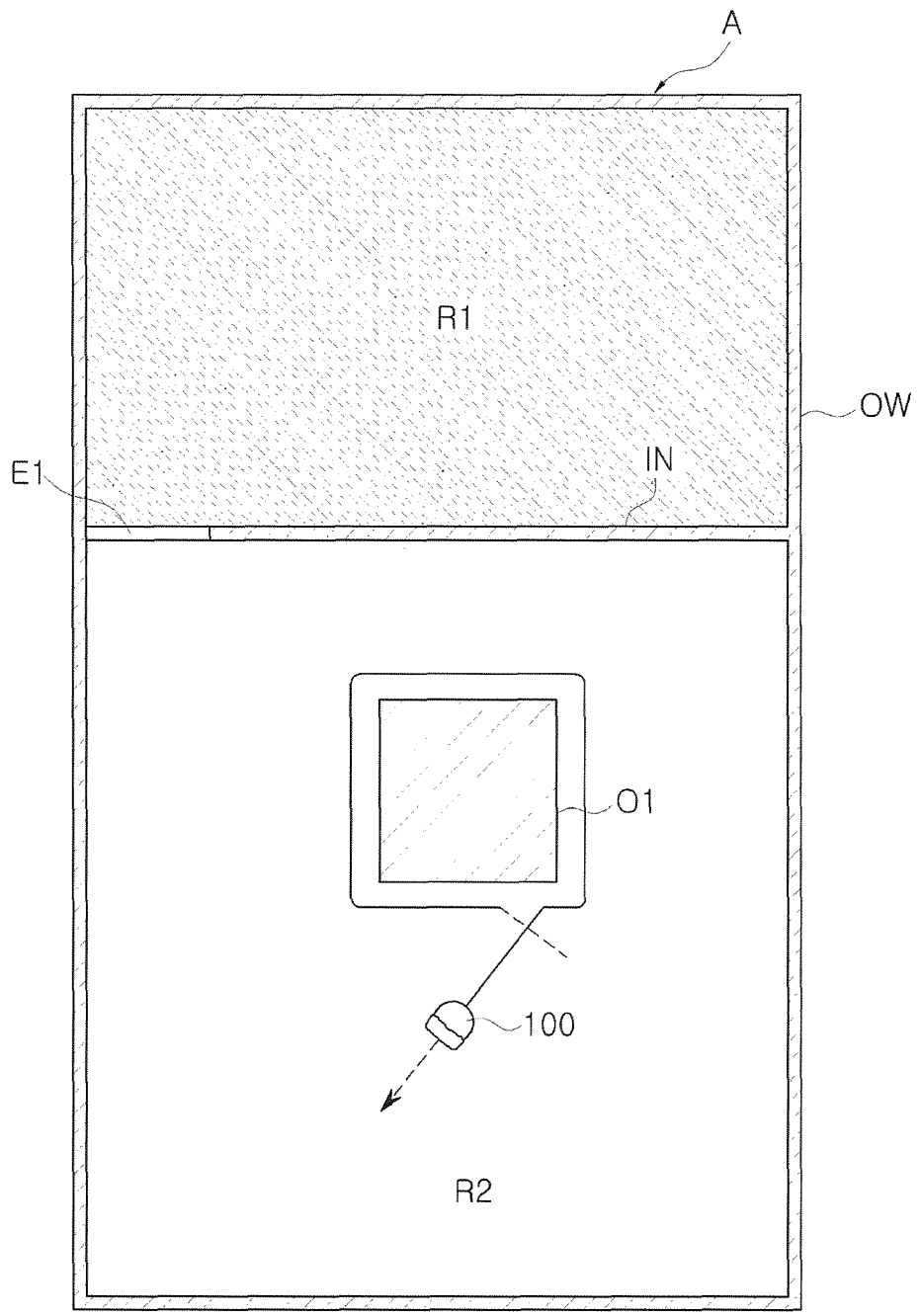

[Fig. 48]
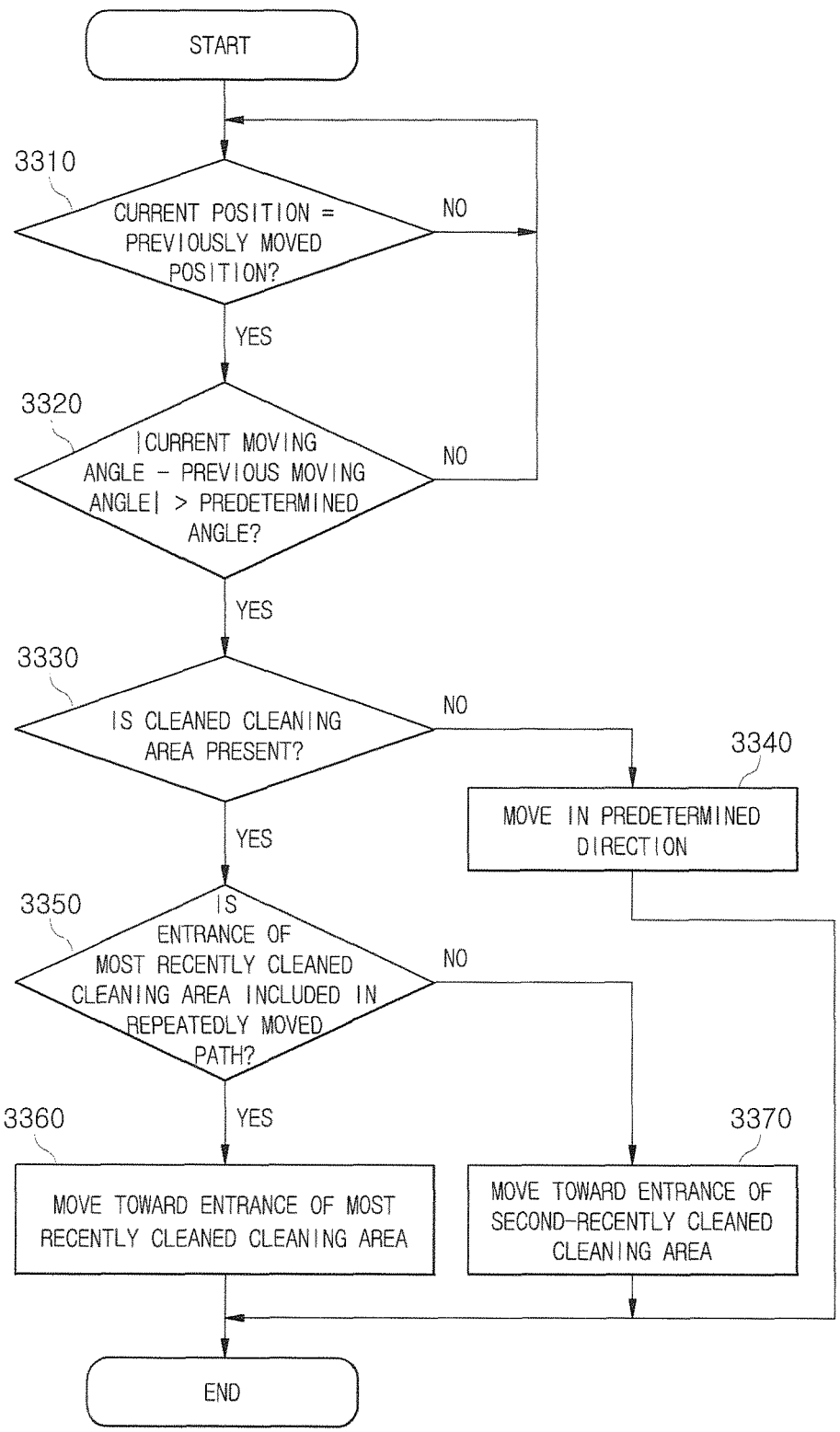

[Fig. 49]
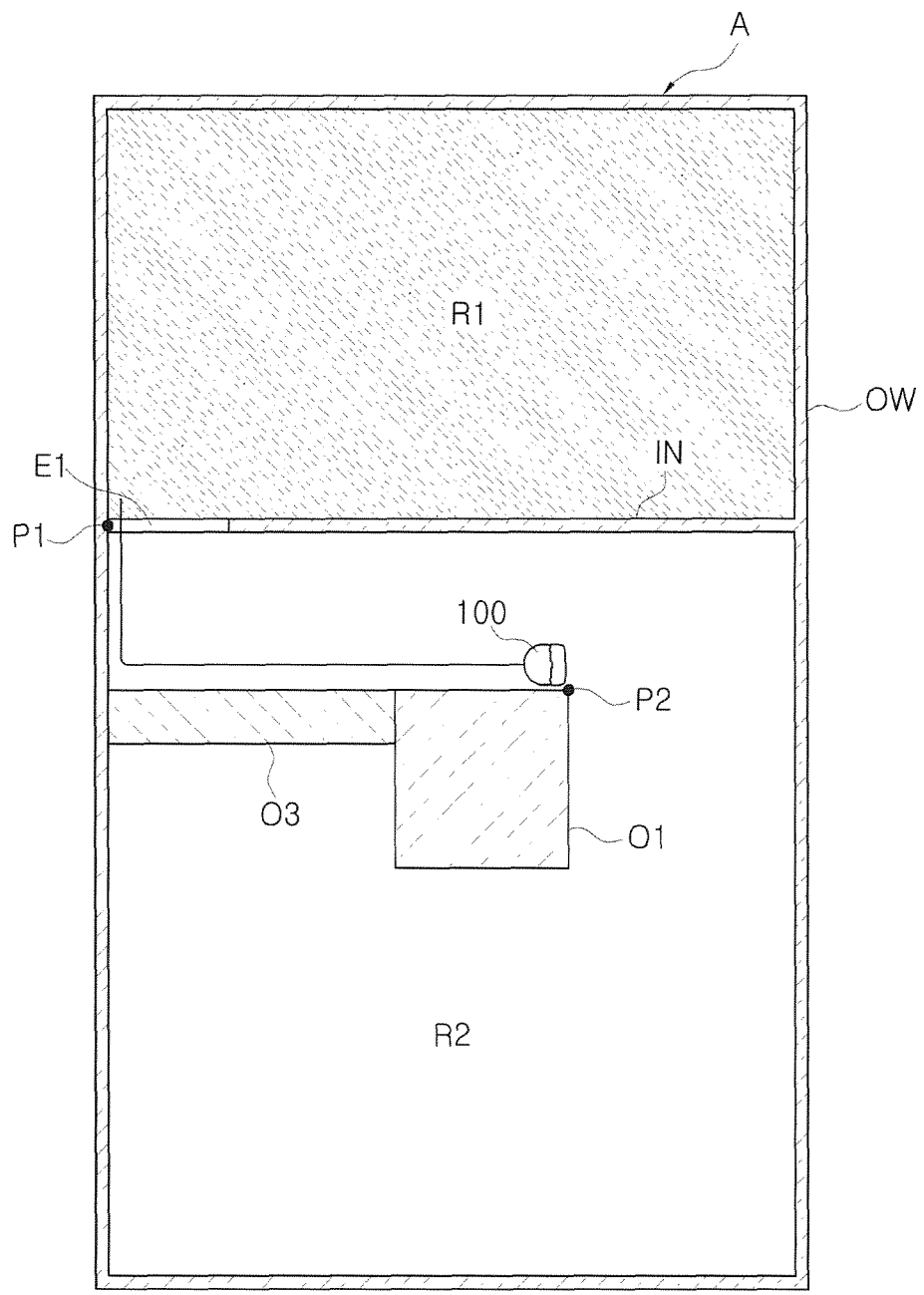

[Fig. 50]
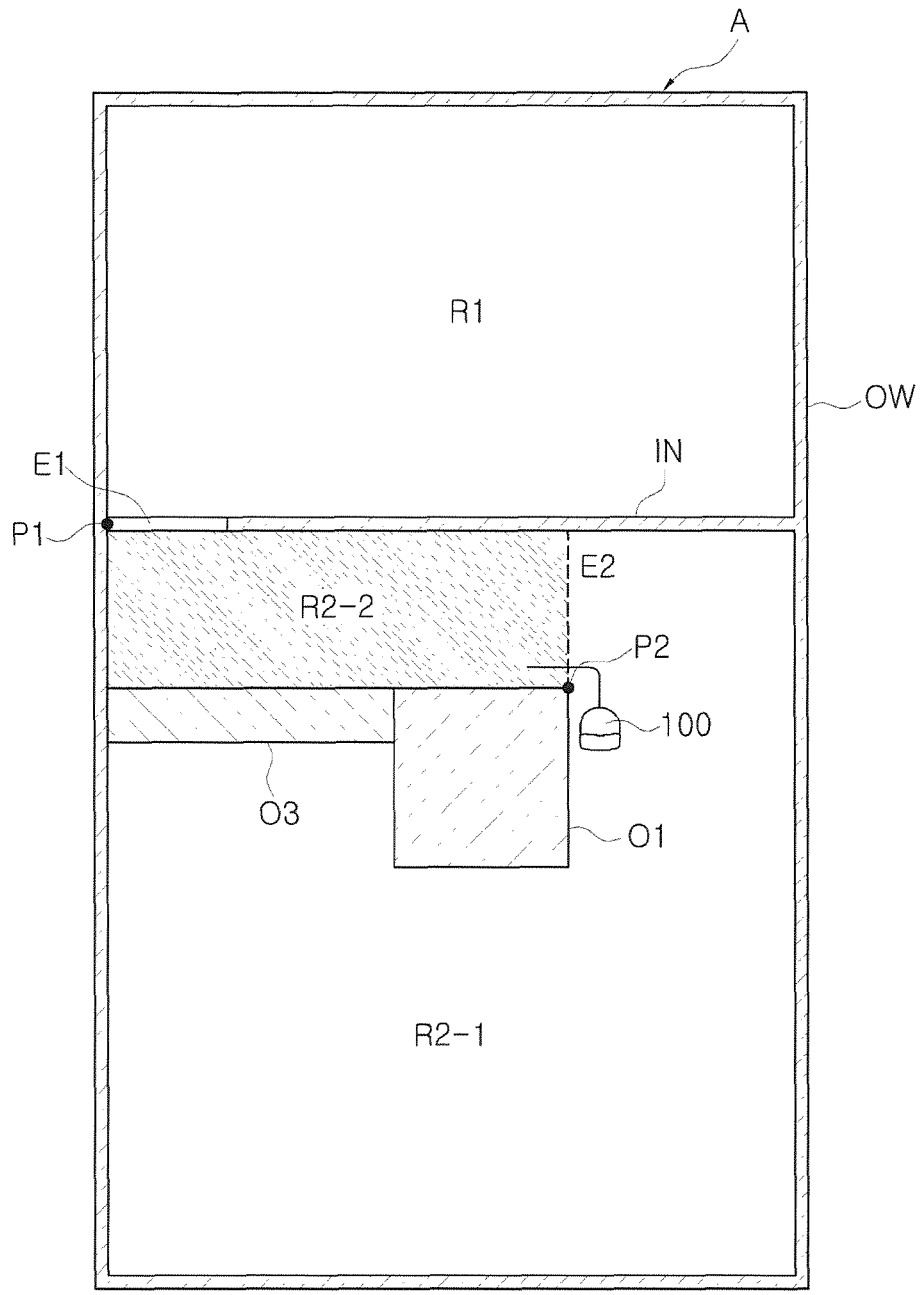

[Fig. 51]
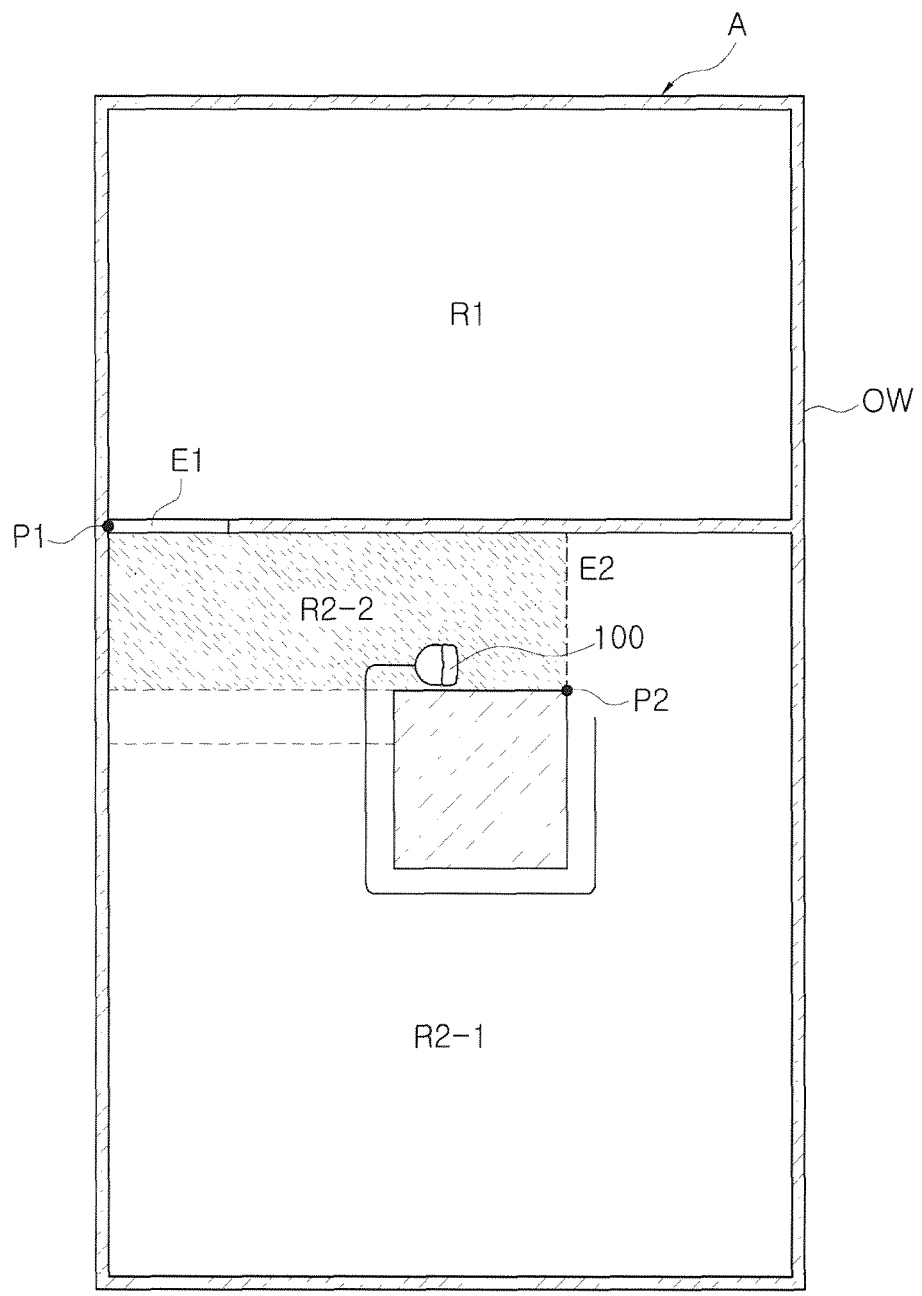

[Fig. 52]
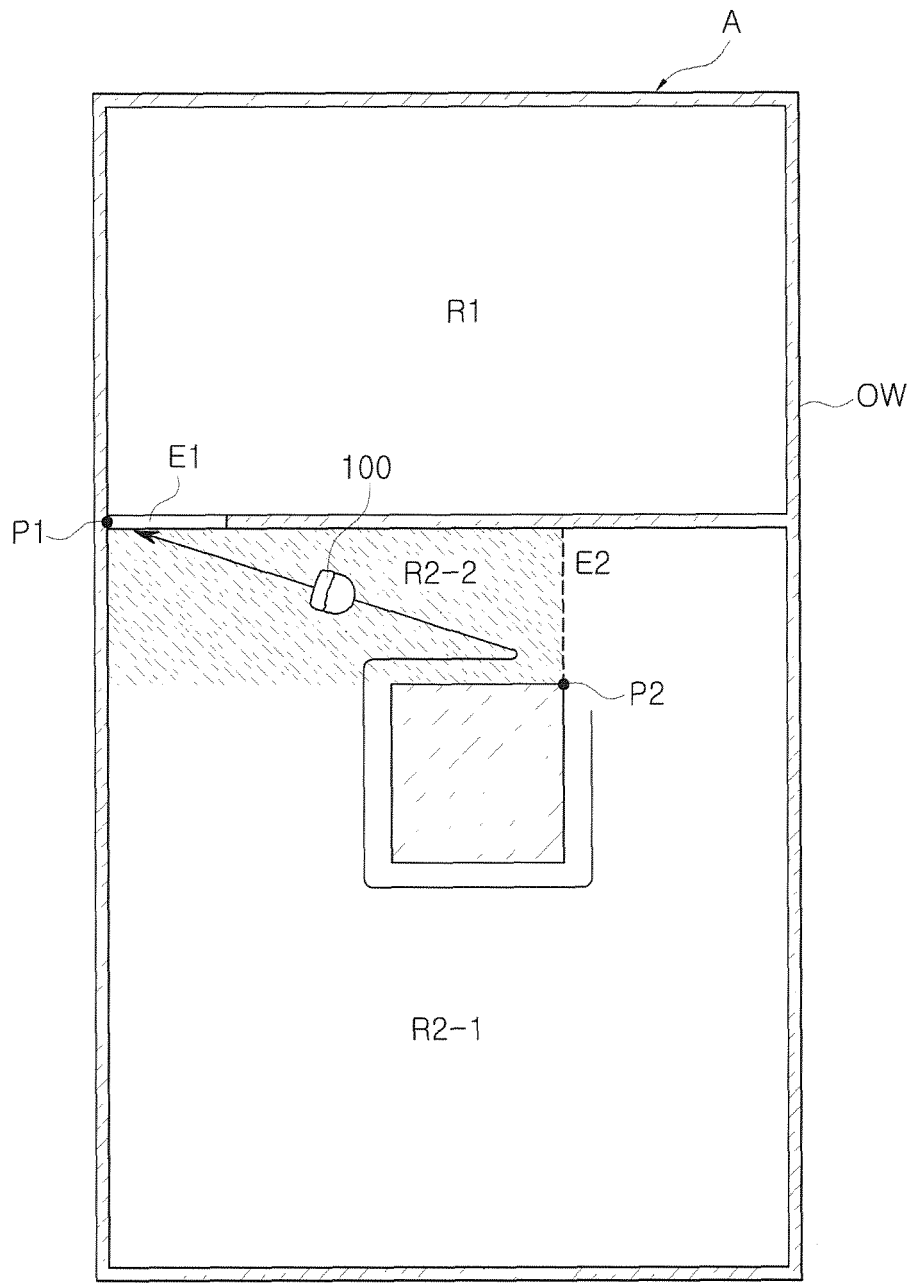

[Fig. 53]
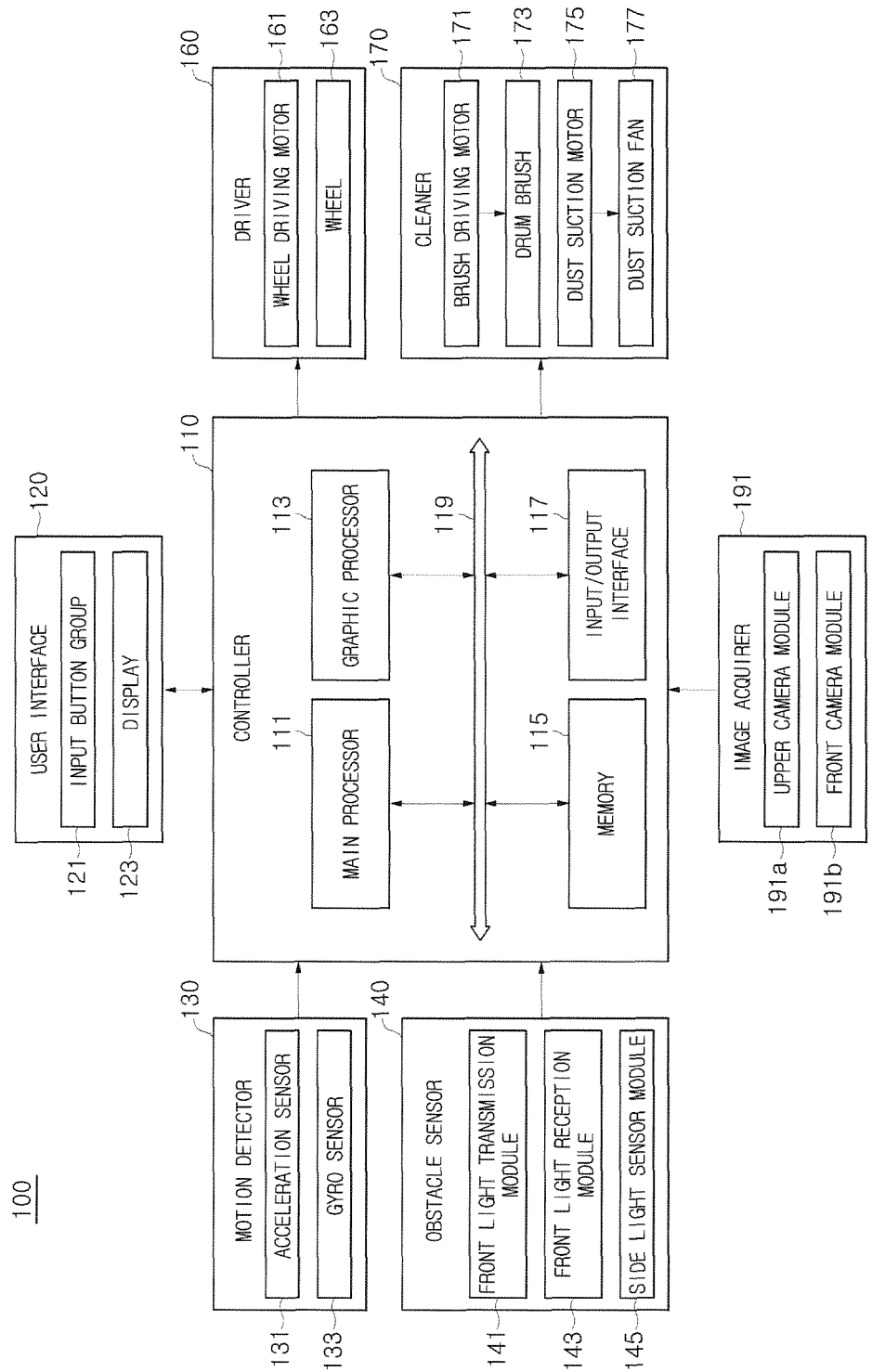

[Fig. 54]
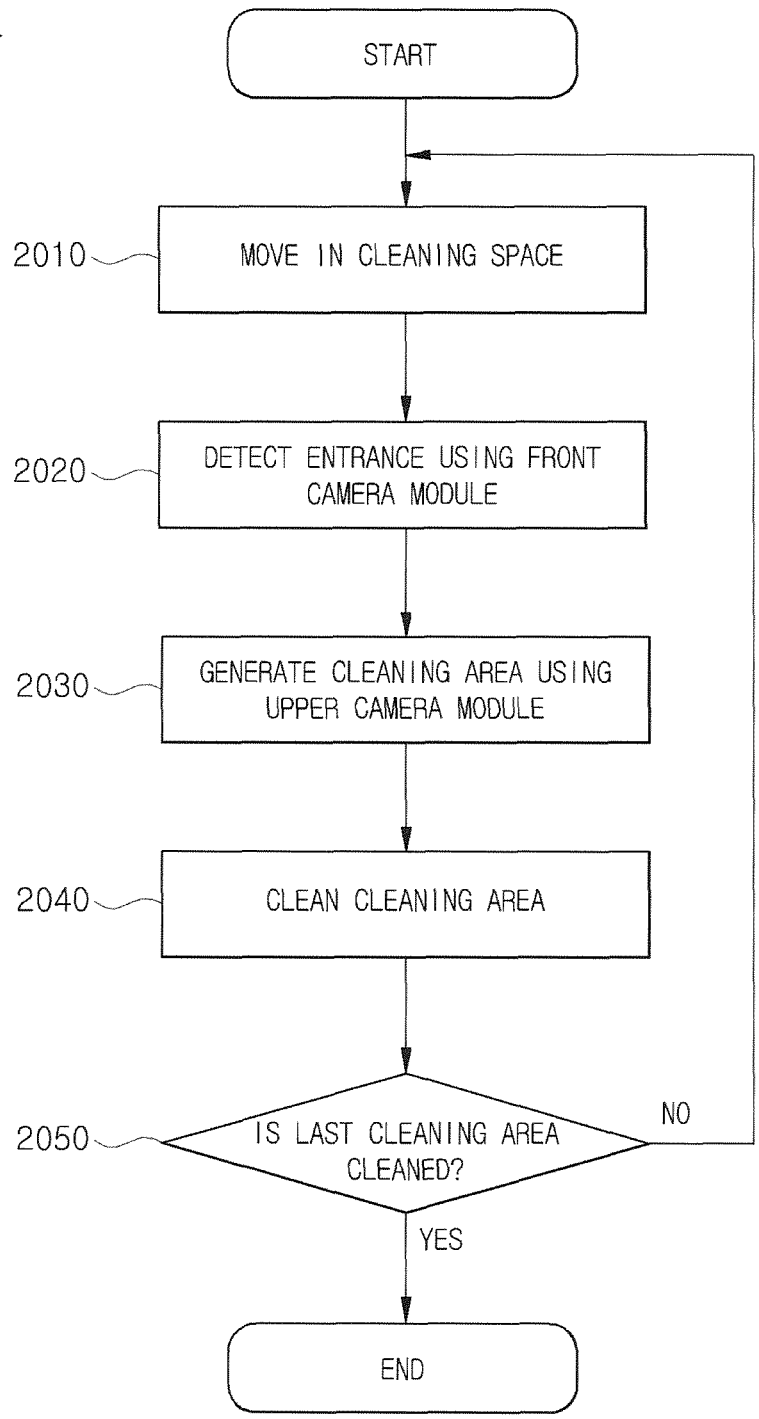

[Fig. 55]
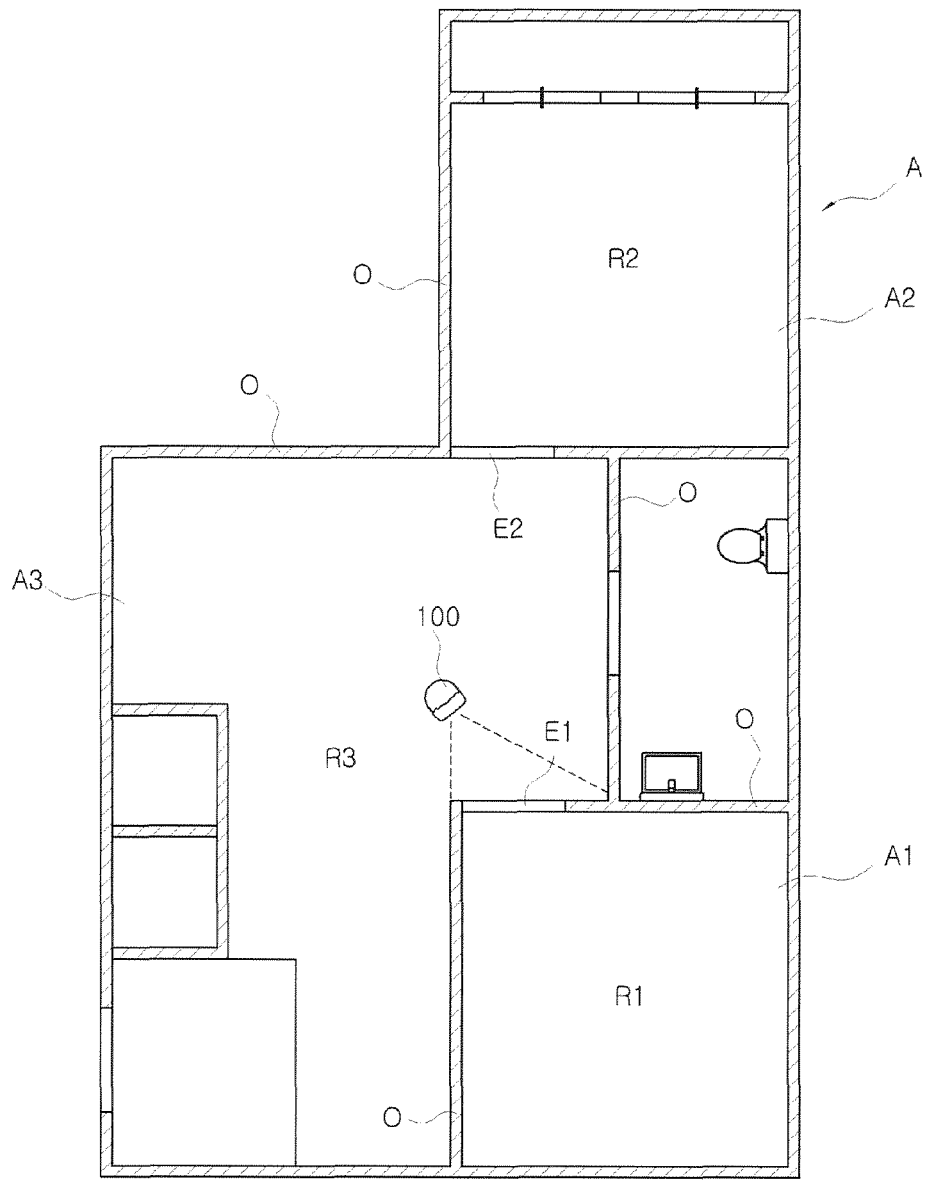

[Fig. 56]
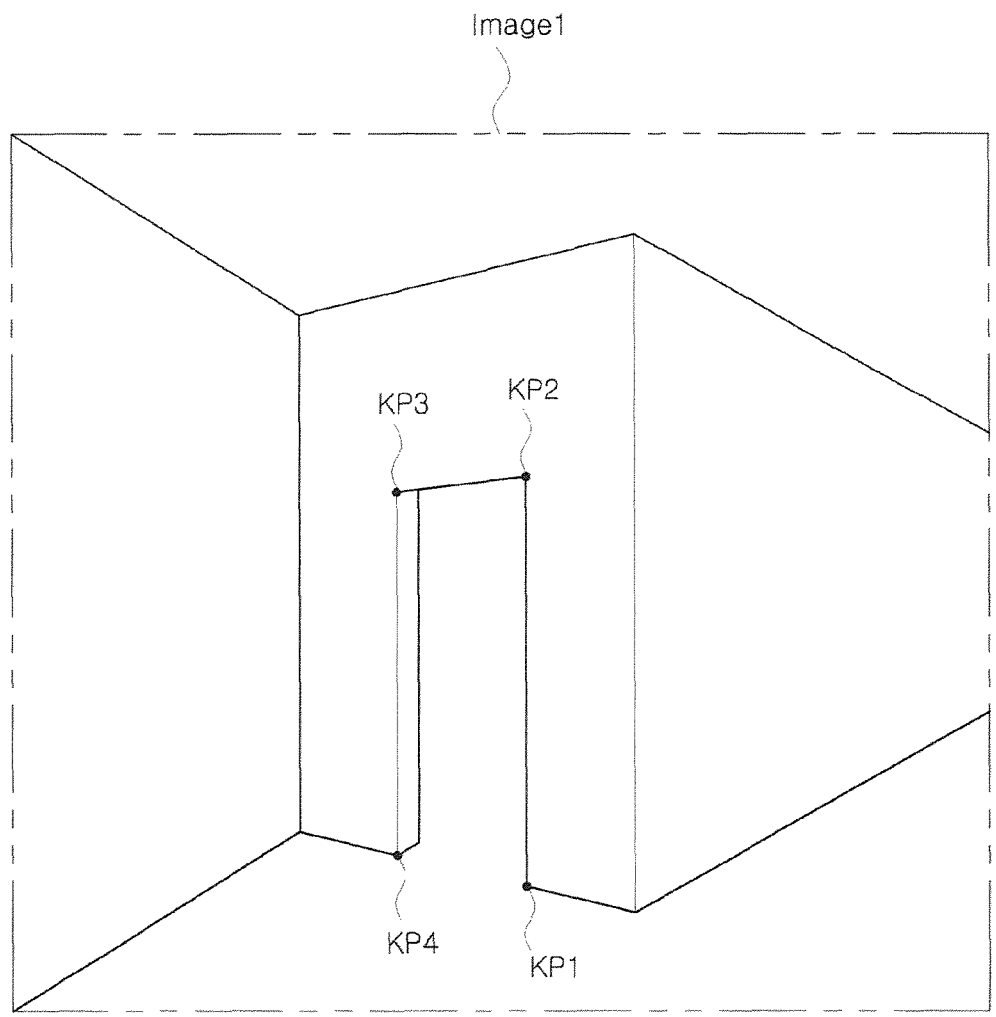

[Fig. 57]
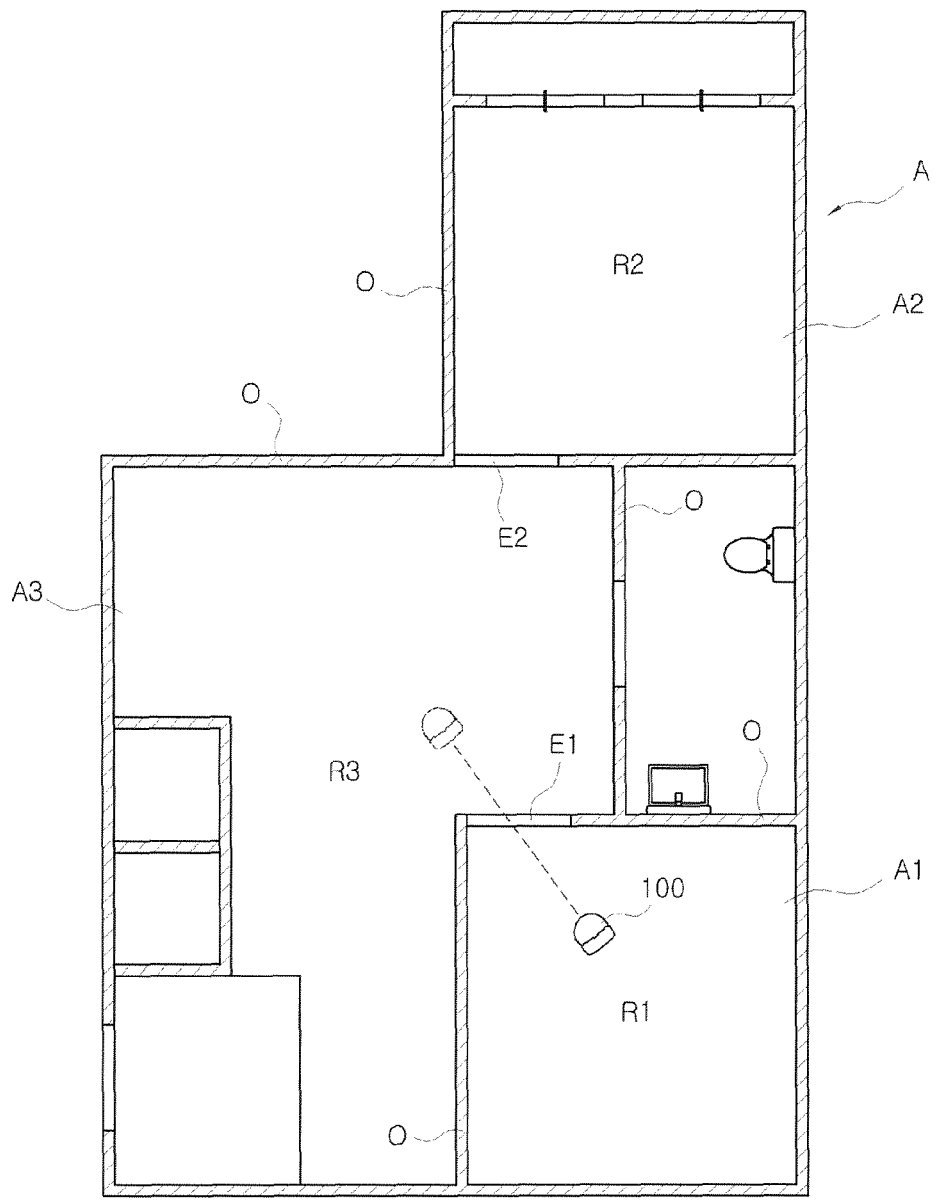

[Fig. 58]
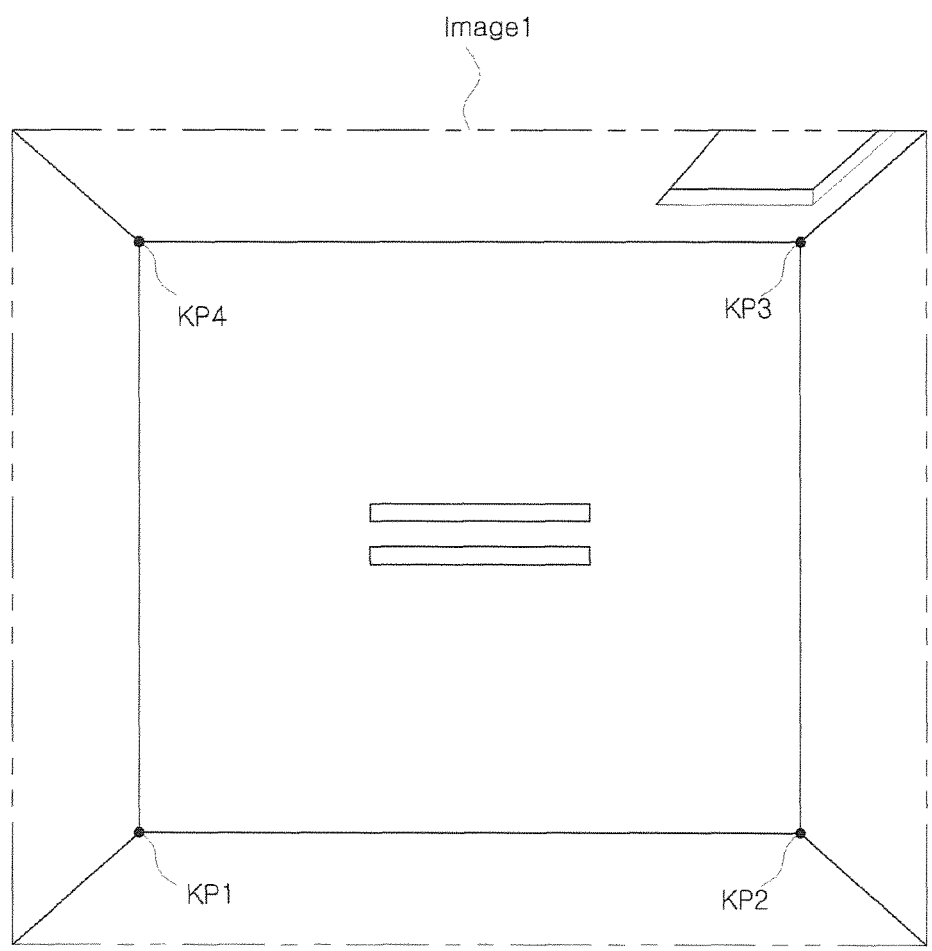

[Fig. 59]
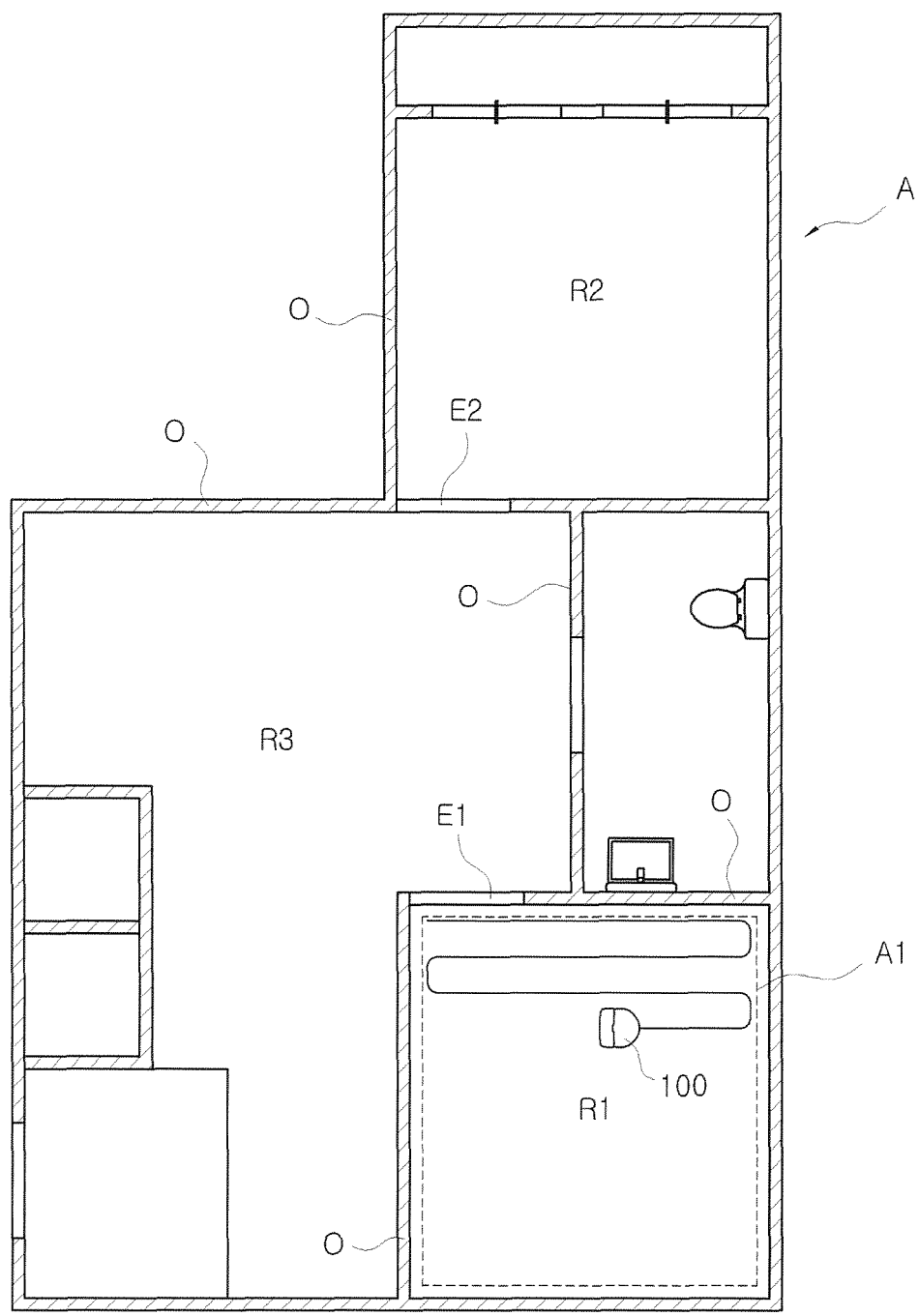

[Fig. 60]
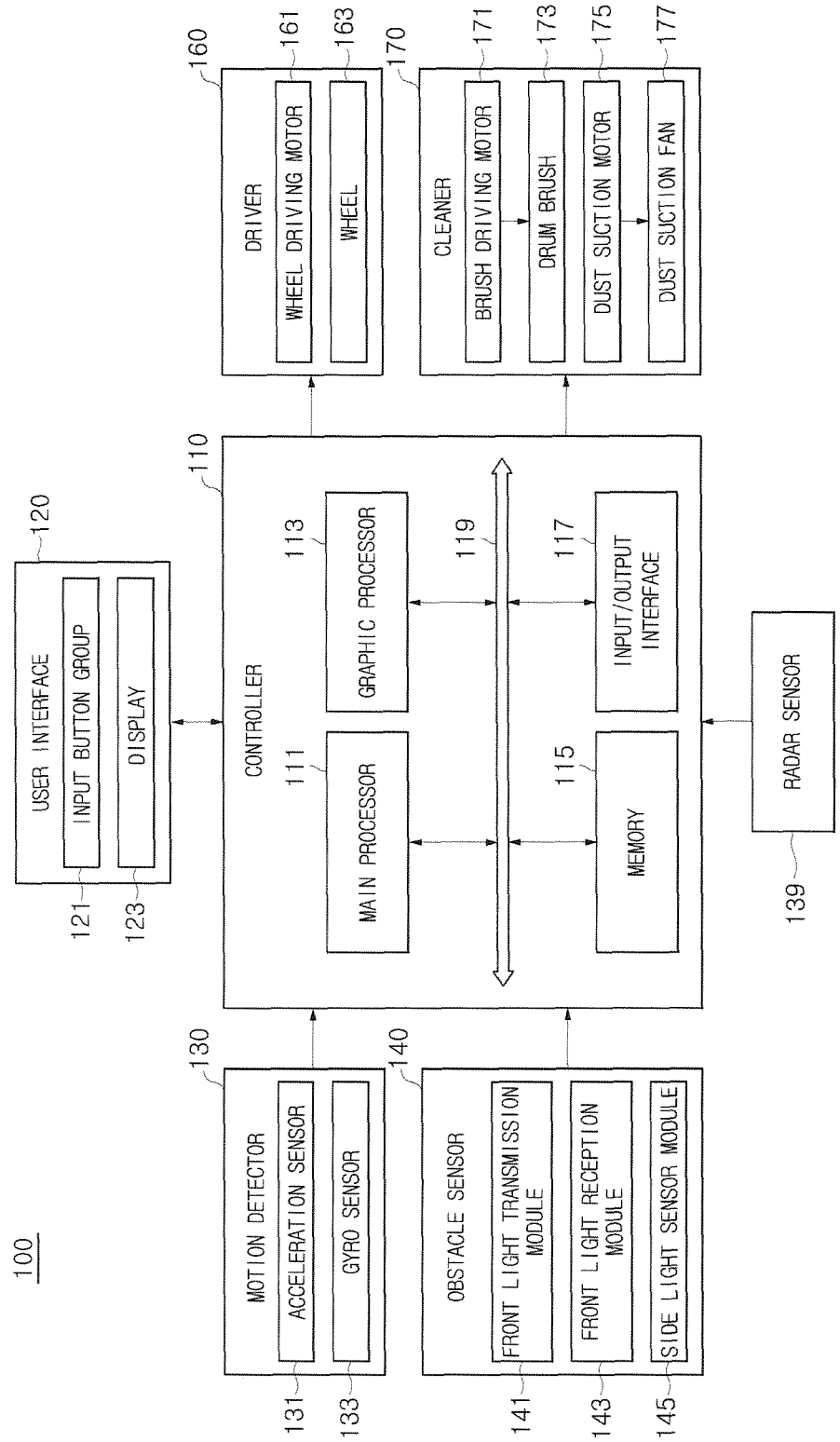

[Fig. 61]
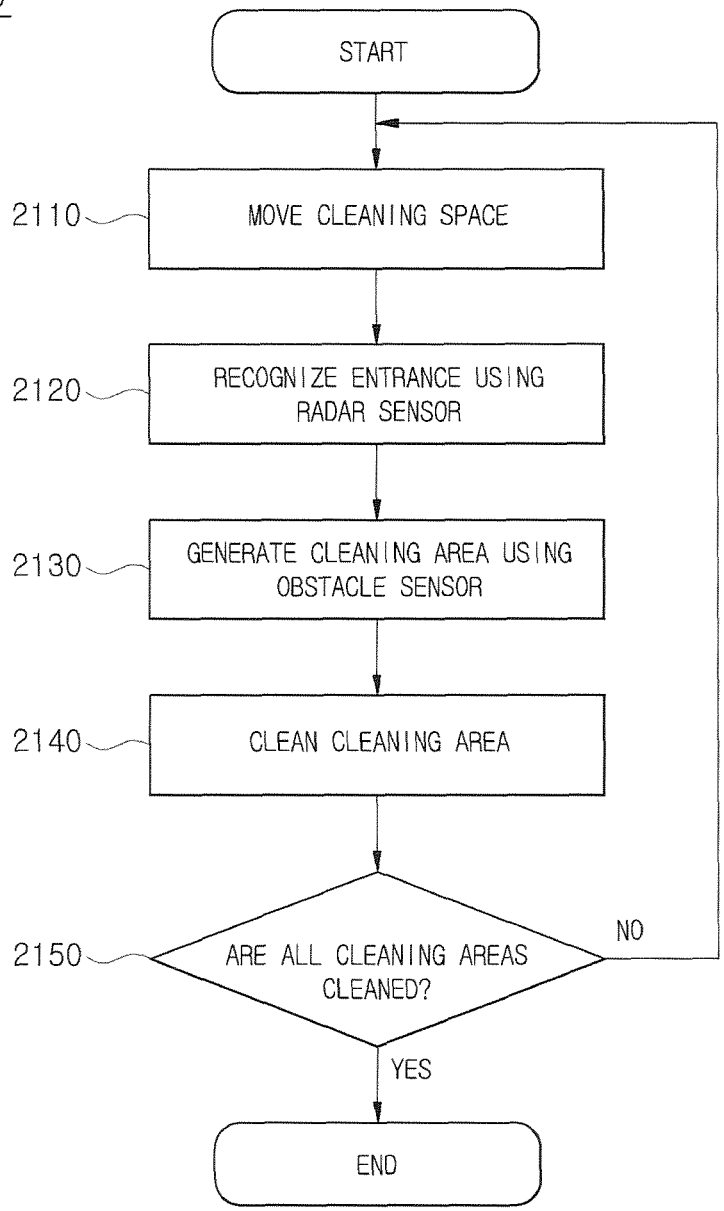

[Fig. 62]
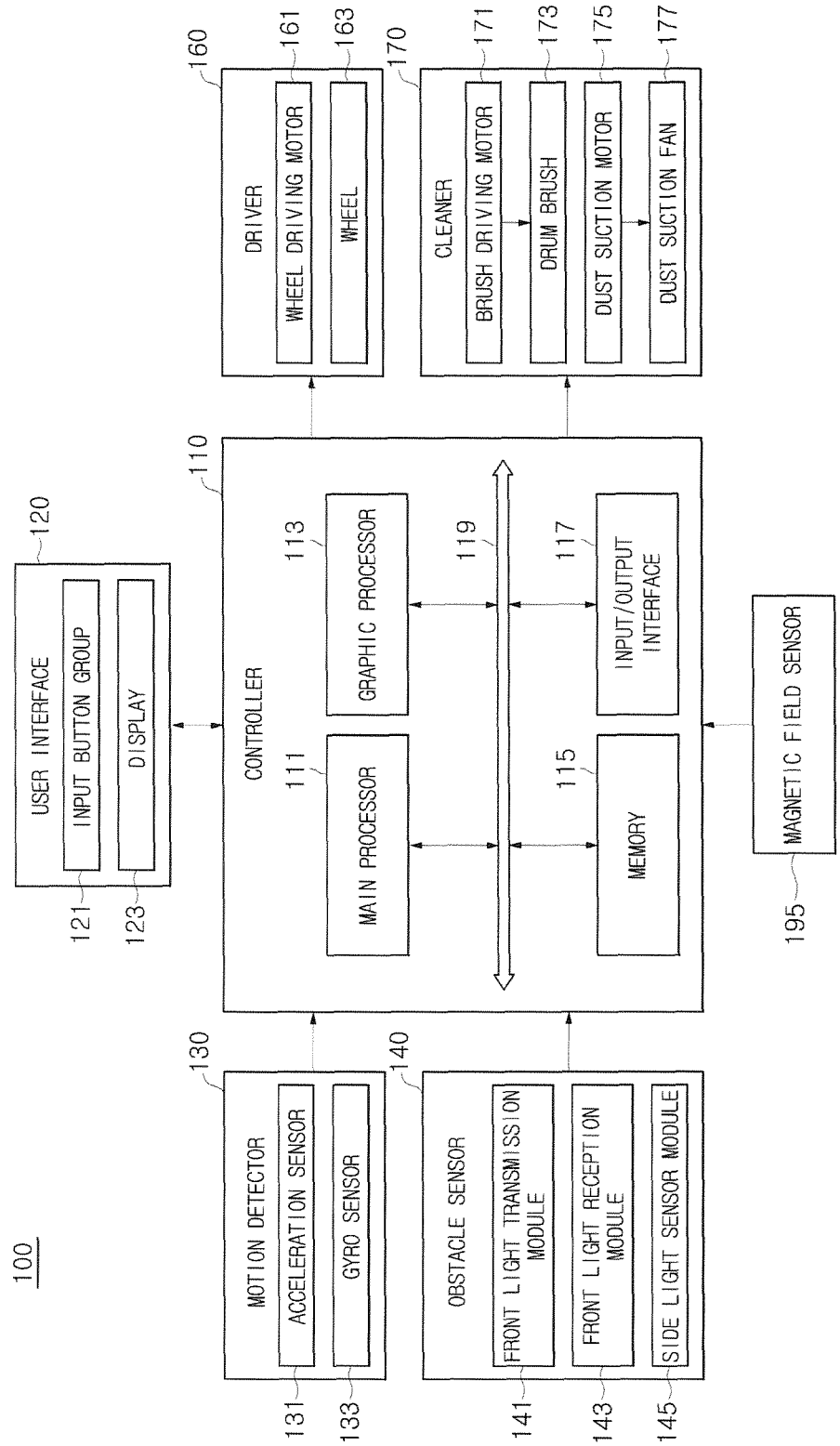

[Fig. 63]
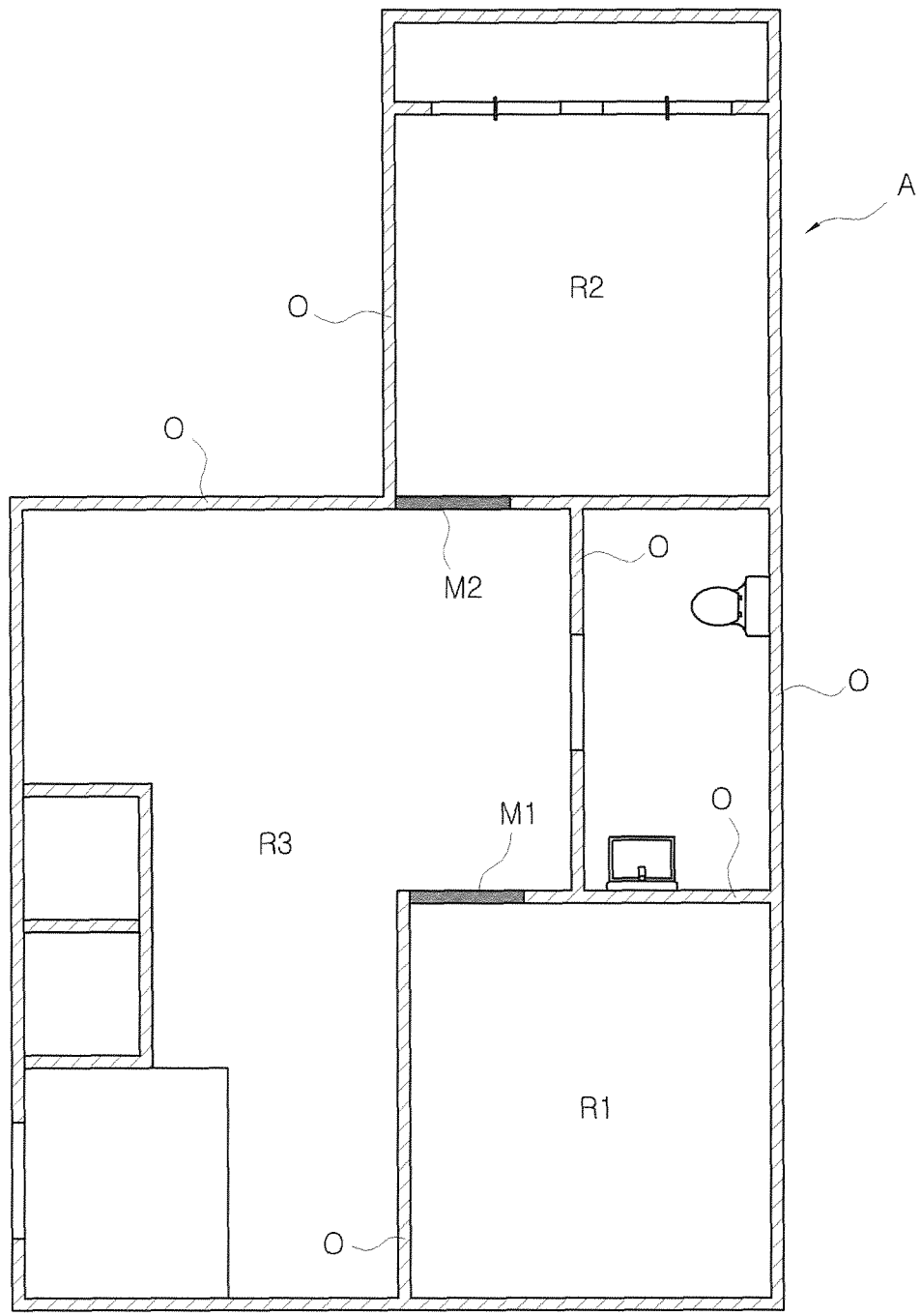

[Fig. 64]
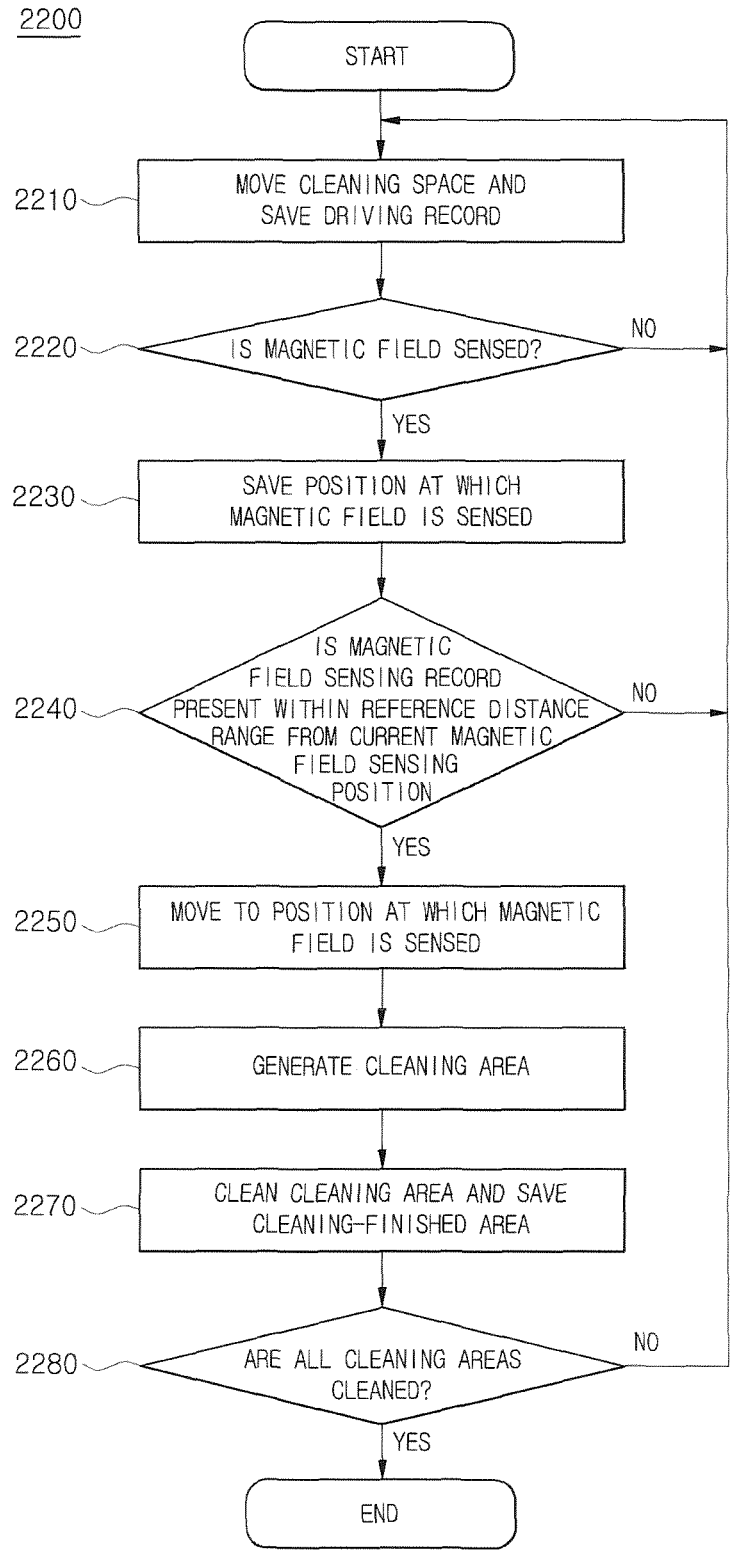

[Fig. 65]
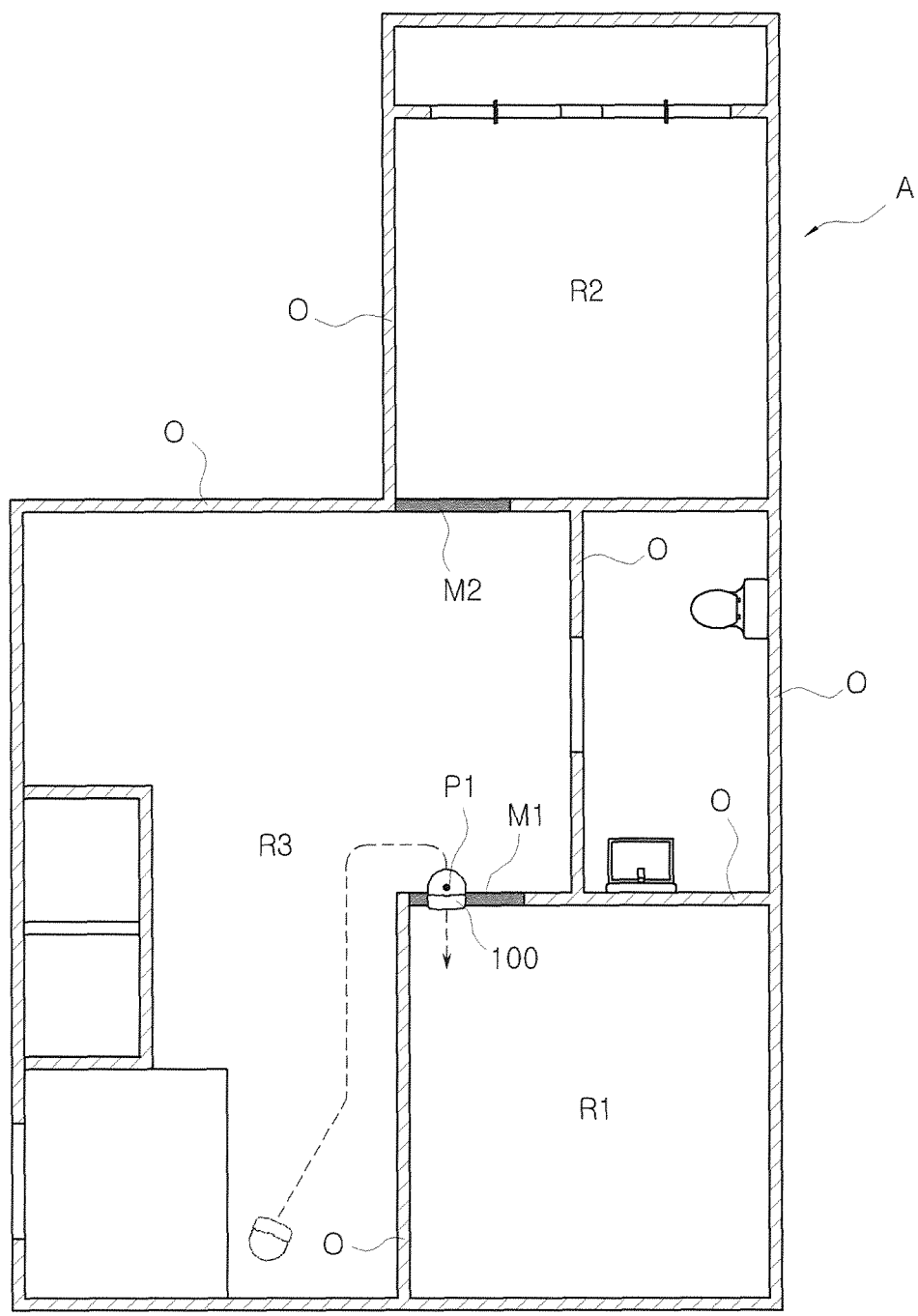

[Fig. 66]
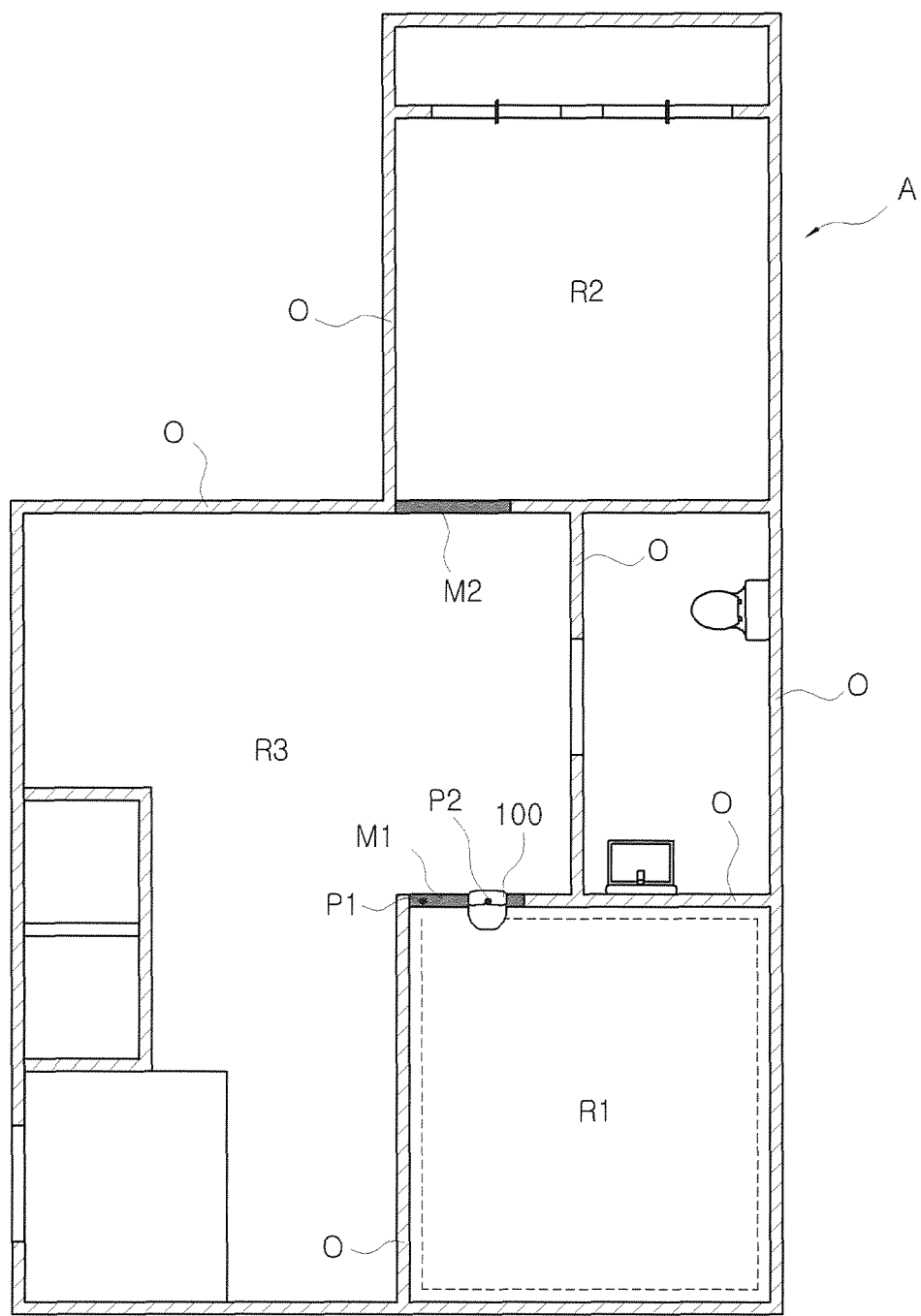

[Fig. 67]
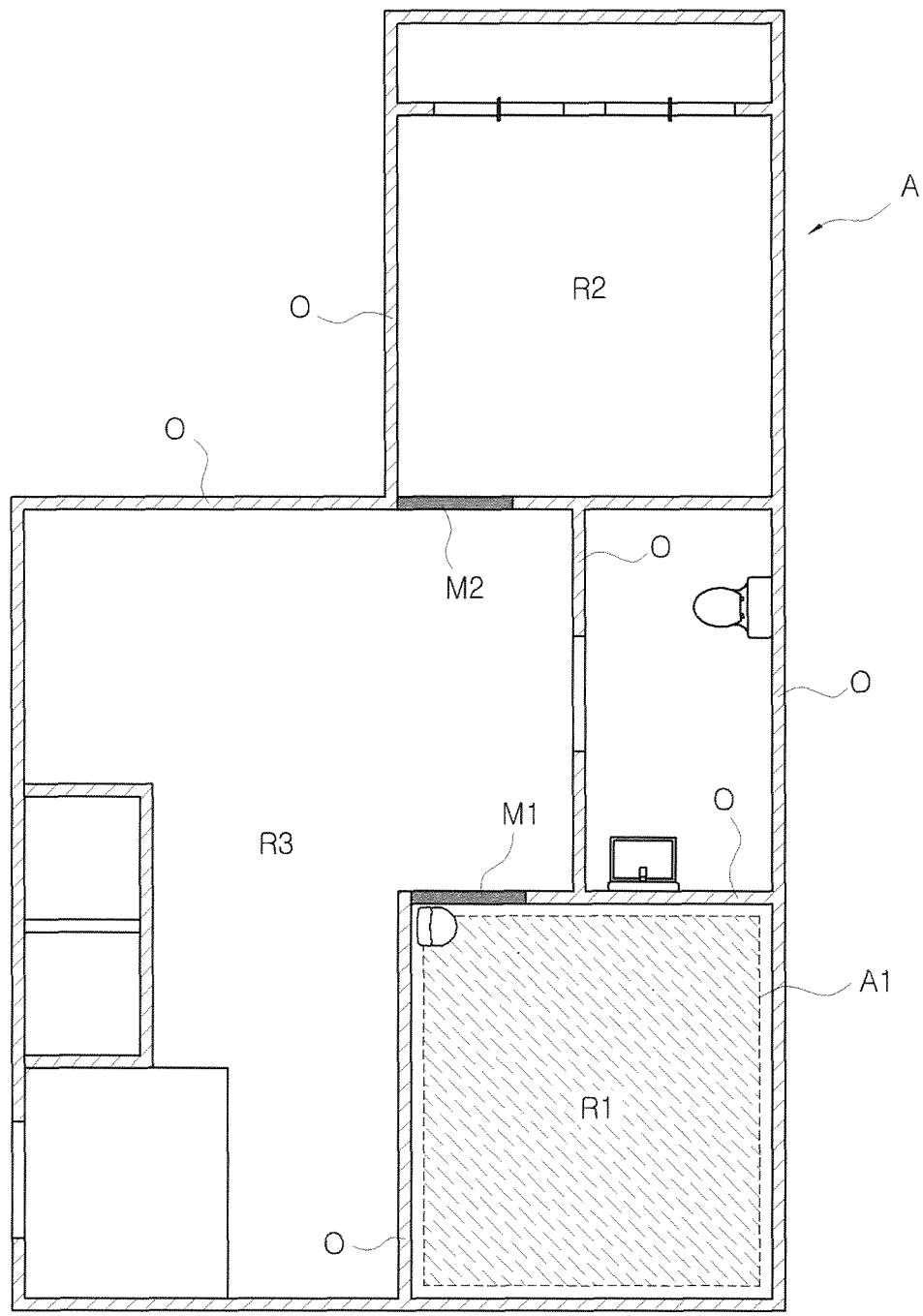

CLEANING ROBOT AND CONTROL METHOD THEREOF

CROSS-REFERENCE TO RELATED APPLICATIONS AND CLAIM OF PRIORITY

The present application claims priority under 35 U.S.C. § 365 to International Patent Application No. PCT/KR2015/008353 filed Aug. 10, 2015, entitled "CLEANING ROBOT AND CONTROLLING METHOD THEREOF", and, through Korean Patent Application No. 10-2014-0108446 filed Aug. 20, 2014, and Korean Patent Application No. 10-2015-0111429 filed Aug. 7, 2015, each of which are incorporated herein by reference into the present disclosure as if fully set forth herein.

TECHNICAL FIELD

The present disclosure relate to a cleaning robot and a controlling method thereof, and more particularly, to a cleaning robot that automatically cleans a cleaning area while moving in the cleaning area, and a controlling method thereof.

BACKGROUND ART

A cleaning robot is an apparatus that automatically cleans a cleaning space by suctioning foreign substances such as dust accumulated on a floor while moving in the cleaning space without a user's manipulation. That is, the cleaning robot cleans the cleaning space while moving in the cleaning space.

A conventional cleaning robot moves through the whole indoor cleaning space and then cleans a cleaning space.

Specifically, the cleaning robot moves through the whole indoor cleaning space, generates a map of the cleaning space on the basis of a driving record of the cleaning robot, sets a cleaning area according to the generated map, and cleans the set cleaning area.

Like this, because the cleaning robot has to move through the whole indoor cleaning space, regardless of a cleaning operation, to generate a map of the cleaning space, a cleaning time is delayed.

DISCLOSURE

Technical Problem

An aspect of the present disclosure is directed to providing a cleaning robot that sets a cleaning area in real time while moving a cleaning space and cleans the set cleaning area first, and a controlling method thereof.

Technical Solution

In accordance with one aspect of the present disclosure, a cleaning robot include a main body, a driver configured to move the main body, a cleaner configured to clean a cleaning space, and a controller configured to set at least one area among a plurality of areas included in the cleaning space as a cleaning area while the main body moves, and clean the cleaning area when the cleaning area is set.

The controller may determine a position of an entrance of the cleaning area while the main body moves, and sets the cleaning area on the basis of the determined position of the entrance and a driving record of the main body.

The cleaning robot may further include an obstacle sensor configured to detect an obstacle that interferes with movement of the main body. The controller may control the driver to enable the main body to move along an outer edge of the obstacle.

The driving record of the main body may include information of positions moved by the main body and outer edge information of the obstacle.

The controller may determine the position of the entrance on the basis of a current position of the main body and the driving record while moving along the outer edge of the obstacle.

The controller may determine a portion between the first convex corner and the second convex corner as the position of the entrance when the current position of the main body is a first convex corner of the obstacle and a driving record of moving along a second convex corner of the obstacle is present within a predetermined distance from the current position.

The controller may determine a portion between the first convex corner and the first wall surface as the position of the entrance when the current position of the main body is a first convex corner of the obstacle and a driving record of moving along a first wall surface of the obstacle is present within a predetermined distance from the current position.

The controller may determine a portion between the first wall surface and the first convex corner as the position of the entrance when the current position of the main body is a first wall surface of the obstacle and a driving record of moving along a first convex corner of the obstacle is present within a predetermined distance from the current position.

The controller may generate a closed line by connecting information of the position of the entrance to information of positions moved by the main body.

The controller may simplify the closed line, and rotate and transform the simplified closed line.

The cleaning robot may further include an image acquirer configured to acquire images of views in front of and above the main body. The controller may determine the position of the entrance on the basis of a front-view image from the main body acquired by the image acquirer.

The controller may determine the position of the entrance by extracting keypoints from the front-view image and comparing the extracted keypoints with a shape of the entrance.

The controller may set the cleaning area on the basis of an upper-view image from the main body when the position of the entrance is determined.

The controller may extract keypoints from the upper-view image, and set the cleaning area on the basis of the extracted keypoints.

The cleaning robot may further include a radar sensor configured to transmit radio waves toward the front of the main body and receive reflected waves reflected from a detected object. The controller may determine a position and a direction of the detected object on the basis of the received reflected waves.

The controller may determine the position of the entrance on the basis of the received reflected waves.

When the position of the entrance is determined, the controller may set the cleaning area on the basis of the position of the entrance and a driving record of the main body.

The cleaning robot may further include a magnetic field sensor configured to sense a magnetic field generated by a magnetic band installed at the entrance. The controller may determine the position of the entrance on the basis of a result sensed by the magnetic field sensor.

The controller may set the cleaning area on the basis of the position of the entrance and a driving record of the main body when the position of the entrance is determined.

In accordance with one aspect of the present disclosure, a method of controlling a cleaning robot that cleans a cleaning space includes moving the cleaning robot, setting a cleaning area while the cleaning robot moves, moving the set cleaning area first when the cleaning area is set, and cleaning the cleaning area while moving the cleaning area.

The setting the cleaning area may include determining a position of an entrance of the cleaning area while the cleaning robot moves, and setting the cleaning area on the basis of the determined position of the entrance and a driving record of the cleaning robot.

The moving of the cleaning robot may include moving the cleaning robot along an outer edge of an obstacle that interferes with movement of the cleaning robot.

The driving record may include information of positions moved by the cleaning robot and outer edge information of the obstacle.

The determining of a position of an entrance may include determining the position of the entrance on the basis of the current position of the cleaning robot and the driving record.

The determining of the position of the entrance may include determining a portion between the first convex corner and the second convex corner as the position of the entrance when the current position of the cleaning robot is a first convex corner of the obstacle and a driving record of moving along a second convex corner of the obstacle is present within a predetermined distance from the current position.

The determining of the position of the entrance may include determining a portion between the first convex corner and the first wall surface as the position of the entrance when the current position of the cleaning robot is a first convex corner of the obstacle and a driving record of moving along a first wall surface of the obstacle is present within a predetermined distance from the current position.

The determining of the position of the entrance may include determining a portion between the first wall surface and the first convex corner as the position of the entrance when the current position of the cleaning robot is a first wall surface of the obstacle and a driving record of moving along a first convex corner of the obstacle is present within a predetermined distance from the current position.

The setting of the cleaning area may include setting the cleaning area on the basis of the position of the entrance and the driving record.

The setting of the cleaning area may include generating a closed line by connecting the information of the position of the entrance to the information of positions moved by the cleaning robot, simplifying the closed line, and rotating and transforming the simplified closed line.

The determining of the position of the entrance may include determining a position of an entrance on the basis of the front-view image from the cleaning robot.

The setting of the cleaning area may include setting a cleaning area on the basis of the upper-view image from the cleaning robot.

The determining of the position of the entrance may include determining the position of the entrance on the basis of reflected waves reflected from the obstacle that interferes with movement of the cleaning robot.

The determining of the position of the entrance may include determining the position of the entrance according to whether a magnetic field generated by a magnetic band installed at the entrance is sensed.

In accordance with one aspect of the present disclosure, a cleaning robot includes a main body, a driver configured to move the main body, a cleaner configured to perform cleaning, and a controller configured to set an area partitioned by an entrance as a cleaning area when the entrance is detected while the main body moves, and clean the cleaning area.

The cleaning robot may further include a motion detector configured to acquire a driving record including position information and a moving angle of the main body while the main body moves, and a storage configured to save the driving record.

The controller may control the driver to enable the main body to move to a predetermined reference position when the main body repeatedly moves along the same path.

The controller may determine whether the main body is repeatedly moving along the same path on the basis of the position information and the moving angle from the driving record.

The controller may control the driver to enable the main body to move to the entrance when the main body repeatedly moves along the same path.

The controller may control the driver to enable the main body to move in a predetermined direction when the main body repeatedly moves along the same path.

In accordance with one aspect of the present disclosure, a cleaning robot includes a main body, a driver configured to move the main body, a cleaner configured to clean a cleaning space that includes a plurality of areas, and a controller configured to set at least one area among the plurality of areas as a cleaning area and clean the cleaning area, and, when cleaning the at least one area is finished, reset at least one area among the rest of the areas as a cleaning area and clean the cleaning area while the main body moves.

Advantageous Effects

According to an aspect of the present disclosure, a cleaning robot that sets a cleaning area in real time while moving in a cleaning space and cleans the set cleaning area first, and a controlling method thereof can be provided.

DESCRIPTION OF DRAWINGS

FIGS. 1 and 2 briefly illustrate an operation of a cleaning robot according to an embodiment.

FIG. 3 illustrates a control configuration of the cleaning robot according to an embodiment.

FIG. 4 illustrates an exterior of the cleaning robot according to an embodiment.

FIGS. 5 and 6 illustrate an inner portion of the cleaning robot according to an embodiment.

FIG. 7 illustrates a bottom surface of the cleaning robot according to an embodiment.

FIGS. 8 and 9 illustrate an example in which an obstacle sensor included in the cleaning robot senses an obstacle located in front of the cleaning robot according to an embodiment.

FIG. 10 illustrates an example in which the obstacle sensor included in the cleaning robot senses an obstacle located beside the cleaning robot according to an embodiment.

FIG. 11 illustrates a method of cleaning a cleaning space by the cleaning robot according to an embodiment.

FIGS. 12 to 14 illustrate examples in which the cleaning robot cleans a cleaning space using the method illustrated in FIG. 11 according to an embodiment.

FIG. 15 illustrates a method of moving in a cleaning space by the cleaning robot according to an embodiment.

FIGS. 16 and 17 illustrate examples in which the cleaning robot moves in the cleaning space using the method illustrated in FIG. 15 according to an embodiment.

FIG. 18 illustrates an example in which the cleaning robot saves a cleaning record using the method illustrated in FIG. 15 according to an embodiment.

FIG. 19 illustrates a method of setting a cleaning area by the cleaning robot according to an embodiment.

FIG. 20 illustrates an example of a method of determining an entrance of a cleaning area by the cleaning robot according to an embodiment.

FIGS. 21 to 23 illustrate examples of determining an entrance of a cleaning area by the cleaning robot using the method illustrated in FIG. 20 according to an embodiment.

FIG. 24 illustrates another example of a method of determining an entrance of a cleaning area by the cleaning robot according to an embodiment.

FIGS. 25 to 27 illustrate examples of a process of determining an entrance of a cleaning area by the cleaning robot using the method illustrated in FIG. 24 according to an embodiment.

FIG. 28 illustrates a method of setting a cleaning area by the cleaning robot according to an embodiment.

FIGS. 29 to 32 illustrate examples of a process of setting a cleaning area by the cleaning robot using the method illustrated in FIG. 28 according to an embodiment.

FIG. 33 illustrates a method of cleaning a cleaning area by the cleaning robot according to an embodiment.

FIGS. 34 to 36 illustrate examples of a process of cleaning a cleaning area by the cleaning robot using the method illustrated in FIG. 33 according to an embodiment.

FIG. 37 illustrates a method of cleaning an uncleaned area by the cleaning robot according to an embodiment.

FIGS. 38 and 39 illustrate examples of a process of cleaning an uncleaned area by the cleaning robot using the method illustrated in FIG. 37 according to an embodiment.

FIG. 40 illustrates a method of determining whether the cleaning robot is repeatedly moving along the same path according to an embodiment.

FIGS. 41 and 42 illustrate an example of the cleaning robot repeatedly moving along the same path according to an embodiment.

FIG. 43 illustrates an example of a method of the cleaning robot deviating from repeated movement according to an embodiment.

FIG. 44 illustrates an example of the cleaning robot moving using the method illustrated in FIG. 43.

FIG. 45 illustrates another example of a method of the cleaning robot deviating from repeated movement according to an embodiment.

FIGS. 46 and 47 illustrate an example of the cleaning robot moving using the method illustrated in FIG. 45.

FIG. 48 illustrates still another example of a method of the cleaning robot deviating from repeated movement according to an embodiment.

FIGS. 49 to 52 illustrate an example of the cleaning robot moving using the method illustrated in FIG. 48.

FIG. 53 illustrates a control configuration of the cleaning robot according to another embodiment.

FIG. 54 illustrates a method of cleaning a cleaning space by the cleaning robot according to another embodiment.

FIGS. 55 to 59 illustrate examples of cleaning a cleaning space by the cleaning robot using the method illustrated in FIG. 54 according to an embodiment.

FIG. 60 illustrates a control configuration of the cleaning robot according to still another embodiment.

FIG. 61 illustrates a method of cleaning a cleaning space by the cleaning robot according to still another embodiment.

FIG. 62 illustrates a control configuration of the cleaning robot according to yet another embodiment.

FIG. 63 illustrates a cleaning space in which a magnetic band is installed.

FIG. 64 illustrates a method of cleaning a cleaning space by the cleaning robot according to yet another embodiment.

FIGS. 65 to 67 illustrate a process of cleaning a cleaning space by the cleaning robot using the cleaning method illustrated in FIG. 64 according to yet another embodiment.

MODES OF THE INVENTION

Embodiments described herein and configurations illustrated in the drawings are merely preferred embodiments of the present disclosure, and various modified embodiments that are capable of substituting the embodiments and the drawings of the present specification may exist at the time of applying the present application.

The terms used herein are used to describe the embodiments and are not intended to restrict and/or limit the present disclosure.

Specifically, a singular expression in the present specification may include a plural expression unless clearly defined otherwise.

In addition, the terms such as "include" or "have" used herein are to designate that a characteristic, a number, a step, an operation, an element, a part, or combinations thereof exist, and do not preclude in advance the existence of or the possibility of adding one or more other characteristics, numbers, steps, operations, elements, parts, or combinations thereof.

In addition, the terms including ordinals such as "first," "second," and the like used herein may be used to describe various elements, but the elements are not limited by the terms, and the terms are used to only distinguish one element from another element.

In addition, terms such as "unit," "-er," "block," "member," "module," and the like used herein may represent a unit of processing at least one function or operation. For example, the terms may represent software stored in a memory and hardware such as a field-programmable gate array (FPGA) or an application specific integrated circuit (ASIC). However, meanings of "unit," "-er," "block," "member," "module," and the like are not limited to software or hardware, and "unit," "-er," "block," "member," "module," and the like may be an element stored in an accessible storage medium and performed by one or more processors.

Hereinafter, an embodiment of the present disclosure will be described in detail with reference to the accompanying drawings. Like reference numerals or marks shown in the accompanying drawings may represent a part or an element performing substantially the same function.

FIGS. 1 and 2 briefly illustrate an operation of a cleaning robot according to an embodiment.

First, an operation of a cleaning robot 100 will be briefly described with reference to FIGS. 1 and 2.

The cleaning robot 100 may move on a floor of a cleaning space A inside the cleaning space A. Also, the cleaning robot 100 may clean the cleaning space A while moving in the cleaning space A.

For example, the cleaning robot 100 disposed at a certain position in the cleaning space A may move in any direction as illustrated in FIG. 1. When the cleaning robot 100 encounters an obstacle O such as a wall surface and a piece of furniture while moving, the cleaning robot 100 may move along an outer edge of the obstacle O.

Here, the obstacle O may be anything that interferes with movement of the cleaning robot 100. For example, anything that interferes with movement of the cleaning robot 100 such as wall surfaces that divide the cleaning space A and a piece of furniture disposed in the cleaning space A may be the obstacle O.

Also, the cleaning robot 100 may divide the cleaning space A into a plurality of cleaning areas for quick and efficient cleaning. The cleaning robot 100 may clean a corresponding cleaning area while moving within each of the divided cleaning areas.

Typically, the cleaning space A is partitioned into a plurality of spaces. For example, the cleaning space A may be partitioned into a first room R1, a second room R2, and a living room R3 as illustrated in FIG. 1.

Also, each of the cleaning spaces R1, R2 and R3 are connected to one another by entrances E1 and E2. For example, the first room R1 and the living room R3 may be connected to each other by a first entrance E1, and the second room R2 and the living room R3 may be connected to each other by a second entrance E2.

In other words, the cleaning space A may be seen as a collection of a plurality of areas connected by the entrances E1 and E2.

Using the above typical characteristic of the cleaning space A, the cleaning robot 100 may set a cleaning area in real time while moving in the cleaning space A.

Specifically, the cleaning robot 100 determines entrances while moving, and sets a cleaning area on the basis of the determined entrances and a driving record.

For example, when the cleaning robot 100 moving along the outer edge of the obstacle O recognizes the first entrance E1, the cleaning robot 100 may recognize the first room R1 on the basis of the recognized first entrance E1. Also, the cleaning robot 100 may set the first room R1 as a first cleaning area A1 and clean the first cleaning area A1 before cleaning other areas of the cleaning space A.

In other words, the cleaning robot 100 may set a cleaning area on the basis of an entrance while moving, and clean the set cleaning area before cleaning other areas of the cleaning space A.

In this way, since the cleaning robot 100 sets a cleaning area while moving and cleans the set cleaning area first, the cleaning robot 100 may more quickly and efficiently clean the cleaning space A.

Hereinafter, configurations and specific operations of the cleaning robot 100 will be described.

FIG. 3 illustrates a control configuration of the cleaning robot according to an embodiment, and FIG. 4 illustrates an exterior of the cleaning robot according to an embodiment. Also, FIGS. 5 and 6 illustrate an inner portion of the cleaning robot according to an embodiment, and FIG. 7 illustrates a bottom surface of the cleaning robot according to an embodiment.

Referring to FIGS. 3 to 7, the cleaning robot 100 may be formed of a main body 101 and a sub-body 103. As illustrated in FIG. 4, the main body 101 may have a substantially semicircular cylindrical shape, and the sub-body 103 may have a substantially rectangular parallelepiped shape.

Also, component parts configured to realize a function of the cleaning robot 100 may be provided at inner portions and outer portions of the main body 101 and the sub-body 103.

Specifically, the cleaning robot 100 may include a user interface 120 configured to interact with a user, a motion detector 130 configured to detect information related to motion of the cleaning robot 100, an obstacle sensor 140 configured to sense an obstacle O in the cleaning space A, a driver 160 configured to move the cleaning robot 100, a cleaner 170 configured to clean the cleaning space, and a controller 110 configured to collectively control an operation of the cleaning robot 100.

The user interface 120 may be provided at an upper surface of the main body 101 of the cleaning robot 100 as illustrated in FIG. 4, and may include a plurality of input buttons 121 configured to receive a control command from a user and a display 123 configured to display operation information of the cleaning robot 100.

The plurality of input buttons 121 may include a power button 121a configured to turn the cleaning robot 100 on or off, an operation button 121b configured to operate or stop the cleaning robot 100, and a return button 121c configured to return the cleaning robot 100 to its charging station (not illustrated).

Each of the buttons included in the plurality of input buttons 121 may employ a push switch and a membrane switch configured to sense a touch pressure by a user, or a touch switch configured to sense contact with a part of a user's body.

The display 123 displays information of the cleaning robot 100 corresponding to a control command input by a user. For example, the display 123 may display an operational state of the cleaning robot 100, a state of the power, a cleaning mode selected by a user, and whether the cleaning robot 100 is returned to its charging station.

The display 123 may employ a light emitting diode (LED) display and an organic LED (OLED) display which are self-luminous, or a liquid crystal display having a separate light emitting source.

Also, the display 123 may employ a touch screen panel (TSP) configured to receive a control command from a user and display operational information corresponding to the received control command.

The TSP may include a display configured to display operational information and a control command that may be input by a user, a touch panel configured to detect coordinates of a point thereon with which a part of a user's body comes into contact, and a TS controller configured to determine a control command input by the user on the basis of the detected contact coordinates.

The TS controller may compare coordinates of a user's touch detected by the touch panel with coordinates of a control command displayed by the display and recognize a control command input by the user.

The motion detector 130 may detect motion of the cleaning robot 100 while the cleaning robot 100 moves in the cleaning space A.

Specifically, the motion detector 130 may detect acceleration, velocity, displacement, moving direction, and the like of the cleaning robot 100 while the cleaning robot 100 linearly moves. Also, the motion detector 130 may detect a rotational velocity, rotational displacement, a radius of rotation, and the like of the cleaning robot 100 while the cleaning robot 100 rotates.

The motion detector 130 may include an acceleration sensor 131 configured to detect linear motion information of the cleaning robot 100 and a gyro sensor 133 configured to detect rotational motion information of the cleaning robot 100.

The acceleration sensor 131 detects linear movement information of the cleaning robot 100. Specifically, the acceleration sensor 131 may detect linear acceleration, linear velocity, linear displacement, and the like of the cleaning robot 100 using Newton's second law of motion (the law of acceleration).

The acceleration sensor 131 may employ a piezoelectric acceleration sensor, an electrostatic capacitance acceleration sensor, a strain gauge acceleration sensor, and the like.

The piezoelectric acceleration sensor includes a piezoelectric element configured to output an electrical signal by mechanical deformation and detects acceleration using the electrical signal output by the piezoelectric element. Specifically, the piezoelectric acceleration sensor detects an electrical signal output by the piezoelectric element according to deformation of the piezoelectric element caused by acceleration and calculates acceleration from the detected electrical signal.

The electrostatic capacitance acceleration sensor detects acceleration using a distance between structures being changed due to an inertial force and electrostatic capacitance being changed due to the change in the distance. Specifically, the electrostatic capacitance acceleration sensor includes a movable structure and a fixed structure, detects a change in a distance between the structures caused by an inertial force as a change in electrostatic capacitance, and calculates acceleration from the detected change in electrostatic capacitance.

The strain gauge acceleration sensor detects acceleration using a strain gauge whose electrical resistance is changed due to mechanical deformation. Specifically, the strain gauge acceleration sensor detects deformation of a structure caused by acceleration as a change in electrical resistance and calculates acceleration from the detected change in electrical resistance.

Also, the acceleration sensor 131 may employ a microelectro-mechanical system (MEMS) sensor that is miniaturized by fusing micro mechanical technology, micro electronic technology, and semiconductor processing technology.

The gyro sensor 133 is referred to as a gyroscope or an angular velocity sensor and detects rotational motion information of the cleaning robot 100. Specifically, the gyro sensor 133 may detect a rotational angular velocity, rotational displacement, and the like of a detected object using the law of angular momentum conservation, the Sagnac effect, the Coriolis force, and the like.

The gyro sensor 133 may employ a gimbal gyro sensor, an optical gyro sensor, a vibrating gyro sensor, and the like.

The gimbal gyro sensor detects a rotation of an object using angular momentum conservation that attempts to constantly maintain a rotation axis, which is the center of rotation of a rotating object, and precession in which the rotating shaft of the rotating object is rotated along a predetermined trajectory due to a rotation-repulsive force when an external force is acted on a rotating object.

The optical gyro sensor detects a rotation of an object using the Sagnac effect in which amounts of time taken for light that is transmitted clockwise or counterclockwise along a circular optical path to reach a transmission point are varied due to rotation of an object.

The vibrating gyro sensor senses a rotation of an object using the Coriolis force generated due to the rotation of the object. Specifically, a rotation of an object is detected using a phenomenon in which, when an object vibrating in a predetermined direction is rotated, the object is vibrated in another direction due to the Coriolis force.

The gyro sensor 133 may also employ a MEMS sensor. For example, an electrostatic capacitance gyro sensor, among MEMS gyro sensors, detects deformation of a fine mechanical structure due to the Coriolis force proportional to a rotational velocity as a change in electrostatic capacitance and calculates the rotational velocity from the detected change in electrostatic capacitance.

The motion detector 130 is not limited to the acceleration sensor 131 and the gyro sensor 133. For example, the motion detector 130 may include an encoder (not illustrated) configured to sense rotation of wheels 163 of the driver 160 that will be described below.

The encoder may include a light emitting element configured to transmit light, a light receiving element configured to receive light, a rotary slit and a fixed slit provided between the light emitting element and the light receiving element, and an encoder controller configured to detect a rotational velocity and rotational displacement of the rotary slit. Here, the rotary slit may be provided to rotate together with the wheels 163, and the fixed slit may be provided to be fixed to the main body 101.

Light transmitted by the light emitting element either passes through the rotary slit and reaches the light receiving element or is blocked by the rotary slit according to rotation of the rotary slit. The light receiving element receives light in the form of a pulse according to rotation of the rotary slit and outputs an electrical signal according to the received light.

Also, the encoder controller may calculate the rotational velocity and the rotational displacement of wheels 163 on the basis of the electrical signal output by the light receiving element, may calculate the linear velocity, the linear displacement, the rotational velocity, the rotational displacement, and the like of the cleaning robot 100 on the basis of the calculated rotational velocity and rotational displacement of the wheels 163, and may provide the calculated values to the controller 110 that will be described below.

The obstacle sensor 140 senses an obstacle O that interferes with movement of the cleaning robot 100.

Here, as described above, the obstacle O refers to anything that may interfere with movement of the cleaning robot 100 due to protruding from the floor of the cleaning space A or being recessed from the floor of the cleaning space A. A piece of furniture such as a table and a sofa, a wall surface that partitions the cleaning space A, an entrance floor that is lower than the floor of the cleaning space A, and the like may be the obstacle O.

The obstacle sensor 140 may include a front light transmission module 141 configured to transmit light toward the front of the cleaning robot 100, a front light reception module 143 configured to receive light reflected from the obstacle O, and a side light sensor module 145 configured to transmit light toward a side of the cleaning robot 100 and receive light reflected from the obstacle O.

The cleaning robot 100 according to an embodiment uses light such as infrared rays to sense the obstacle O, but embodiments are not limited thereto. The cleaning robot 100 may also use light amplification by stimulated emission of radiation (LASER), ultrasonic waves, radio waves, and the like.

The front light transmission module 141 may include a light source 141a configured to transmit light and a wide-angle lens 141b configured to diffuse light in a direction parallel to a floor being cleaned, as illustrated in FIGS. 5 and 6.

The light source 141a may employ an LED or a LASER diode configured to emit light in several directions.

The wide-angle lens 141b may be formed of a material through which light may pass, and diffuses light emitted from the light source 141a in the direction parallel to the floor being cleaned using refraction or total reflection. The light emitted from the front light transmission module 141 may be diffused in a fan shape toward the front of the cleaning robot 100 by the wide-angle lens 141b. (Hereinafter, light diffused in a direction parallel to a floor being cleaned and having a fan shape will be referred to as planar light.)

In this way, the front light transmission module 141 may transmit light toward the front of the cleaning robot 100 in all directions.

Also, to minimize parts not reached by the planar light transmitted from the front light transmission module 141, the obstacle sensor 140 may include a plurality of front light transmission modules 141 as illustrated in FIGS. 5 and 6.

The front light reception module 143 may include a reflective mirror 143a configured to condense light reflected from the obstacle O and an image sensor 143b configured to receive light reflected by the reflective mirror 143a.

The image sensor 143b may be provided below the reflective mirror 143a and receive light reflected by the reflective mirror 143a. Specifically, the image sensor 143b may acquire a two-dimensional image formed on the reflective mirror 143a by reflected light that is reflected from the obstacle O. Here, the image sensor 143b may be a two-dimensional image sensor in which a light sensor is arranged in two dimensions.

The image sensor 143b may employ a complementary metal oxide semiconductor (CMOS) sensor or a charge coupled device (CCD) sensor.

Here, the image sensor 143b preferably employs an image sensor 143b that is capable of receiving light having the same wavelength as that of light transmitted by the light source 141a of the front light transmission module 141. For example, when the light source 141a transmits light in an infrared range, it is preferable that the image sensor 143b also employ an image sensor 143b that is capable of acquiring an infrared image.

In this way, the front light reception module 143 may receive reflected light that is reflected from the front of the cleaning robot 100 in all directions.

Also, the number of the front light reception modules 143 may be different from the number of the front light transmission modules 141. Because the front light transmission module 141 uses the wide-angle lens 141b to diffuse light transmitted from the light source 141a in various directions, and the front light reception module 143 uses the reflective mirror 143a to condense light in various directions to the image sensor 143b as described above, the obstacle sensor 140 may include different numbers of front light transmission modules 141 and front light reception modules 143.

Although the front light transmission module 141 configured to transmit light toward the front of the cleaning robot 100 in all directions and the front light reception module 143 configured to receive the reflected light reflected from the front of the cleaning robot 100 in all directions have been described above related to the obstacle sensor 140, the obstacle sensor 140 is not limited to including the front light transmission module 141 and the front light reception module 143.

For example, the obstacle sensor 140 may include a light sensor module configured to transmit light in a straight line form toward the front of the cleaning robot 100 in a particular direction and detect a position of the obstacle O using reflected light that is reflected from the obstacle O.

The side light sensor module 145 may include a left light sensor module 145a configured to obliquely transmit light toward the left of the cleaning robot 100 and receive light reflected from the obstacle O, and a right light sensor module 145b configured to obliquely transmit light toward the right of the cleaning robot 100 and receive light reflected from the obstacle O.

The side light sensor module 145 may be used in movement of the cleaning robot 100 as well as detection of the obstacle O.

For example, in a case of outer edge following travel in which the cleaning robot 100 moves while maintaining a predetermined distance from the obstacle O, the side light sensor module 145 may detect a distance between a side of the cleaning robot 100 and the obstacle O, and the controller 110 may control the driver 160 so that the cleaning robot 100 maintains a predetermined distance from the obstacle O on the basis of a result of the detection by the side light sensor module 145.

The side light sensor module 145 is a configuration for assisting the front light transmission module 141 and the front light reception module 143 configured to sense the obstacle O mostly disposed in front of the cleaning robot 100. In some cases, the obstacle sensor 140 may not include the side light sensor module 145.

The driver 160 moves the cleaning robot 100 and may include a wheel driving motor 161, the wheels 163, and a caster wheel 165 as illustrated in FIG. 7.

The wheels 163 may be provided at both ends of a bottom surface of the main body 101, and may include a left wheel 163a provided at a left side of the cleaning robot 100 and a right wheel 163b provided at a right side of the cleaning robot 100 with respect to the front of the cleaning robot 100.

Also, the wheels 163 receives a rotational force from the wheel driving motor 161 and moves the cleaning robot 100.

The wheel driving motor 161 generates a rotational force for rotating the wheels 163, and includes a left driving motor 161a configured to rotate the left wheel 163a and a right driving motor 161b configured to rotate the right wheel 163b.

The left driving motor 161a and the right driving motor 161b may receive a driving control signal from the controller 110 and operate independently from each other.

The left wheel 163a and the right wheel 163b may rotate independently from each other by the left driving motor 161a and the right driving motor 161b operating independently from each other as above.

Also, because the left wheel 163a and the right wheel 163b may rotate independently from each other, the cleaning robot 100 is capable of various movements such as forward movement, rearward movement, rotational movement, and in-place rotation.

For example, the cleaning robot 100 may move forward in a straight line (advance) when both of the left and right wheels 163a and 163b rotate in a first direction, and the main body 101 may move rearward in a straight line (retreat) when both of the left and right wheels 163a and 163b rotate in a second direction.

Also, the cleaning robot 100 may rotate rightward or leftward when the left and right wheels 163a and 163b rotate in the same direction but at different velocities, and the cleaning robot 100 may rotate in place clockwise or counterclockwise when the left and right wheels 163a and 163b rotate in different directions.

The caster wheel 165 may be installed at the bottom surface of the main body 101, and a rotating shaft of the caster wheel 165 may rotate in a moving direction of the cleaning robot 100. The caster wheel 165 whose rotating shaft rotates in the moving direction of the cleaning robot 100 as described above does not interfere with movement of the cleaning robot 100 and enables the cleaning robot 100 to move while maintaining a stable posture.

Also, moreover, the driver 160 may further include a motor driving circuit (not illustrated) configured to supply a driving current to the wheel driving motor 161 according to a control signal from the controller 110, a power transmission module (not illustrated) configured to transmit a rotational force of the wheel driving motor 161 to the wheels 163, and a rotation sensor (not illustrated) configured to detect rotational displacement and rotational velocity of the wheel driving motor 161 or the wheels 163.

The cleaner 170 includes a drum brush 173 configured to scatter dust on a floor of a cleaning area, a brush driving motor 171 configured to rotate the drum brush 173, a dust suction fan 177 configured to suction in scattered dust, a dust suction motor 175 configured to rotate the dust suction fan 177, and a dust container 179 configured to store the suctioned dust.

The drum brush 173 is provided at a dust suction port 105 formed at a bottom surface of the sub-body 103 as illustrated in FIG. 7, and scatters dust on a floor being cleaned into the dust suction port 105 by rotating about a rotating shaft of the sub-body 103 provided to be horizontal to the floor being cleaned.

The brush driving motor 171 is provided to be adjacent to the drum brush 173 and rotates the drum brush 173 according to a cleaning control signal from the controller 110.

Although not illustrated in the drawings, the cleaner 170 may further include a motor driving circuit (not illustrated) configured to supply a driving current to the brush driving motor 171 according to a control signal from the controller 110, and a power transmission module (not illustrated) configured to transmit a rotational force of the brush driving motor 171 to the drum brush 173.

The dust suction fan 177 is provided at the main body 101 as illustrated in FIGS. 5 and 6 and suctions dust scattered by the drum brush 173 into the dust container 179.

The dust suction motor 175 is provided at a position adjacent to the dust suction fan 177 and rotates the dust suction fan 177 by a control signal from the controller 110.

Although not illustrated in the drawings, the cleaner 170 may further include a motor driving circuit (not illustrated) configured to supply a driving current to the dust suction motor 175 according to a control signal from the controller 110, and a power transmission module (not illustrated) configured to transmit a rotational force of the dust suction motor 175 to the dust suction fan 177.

The dust container 179 is provided at the main body 101 as illustrated in FIGS. 5 and 6 and stores dust suctioned by the dust suction fan 177.

Also, the cleaner 170 may include a dust guide tube configured to guide dust suctioned through the dust suction port 105 of the sub-body 103 to the dust container 179 provided at the main body 101.

The controller 110 collectively controls operation of the cleaning robot 100.

Specifically, the controller 110 may include an input/output interface 117 configured to mediate data exchange between various types of component devices included in the cleaning robot 100 and the controller 110, a memory 115 configured to store a program and data, a graphic processor 113 configured to perform image processing, and a main processor 111 configured to perform computational operation according to the program and the data stored in the memory 115. Also, a system bus 119 configured to mediate transmission and reception of data between the input/output interface 117, the memory 115, the graphic processor 113, and the main processor 111 may be provided in the controller 110.

The input/output interface 117 receives a user command received by the user interface 120, motion information of the cleaning robot 100 detected by the motion detector 130, and position information of an obstacle sensed by the obstacle sensor 140, and transmits the received pieces of information to the main processor 111, the graphic processor 113, the memory 115, and the like via the system bus 119.

Furthermore, the input/output interface 117 may transmit various types of control signals output by the main processor 111 to the user interface 120, the driver 160, or the cleaner 170.

The memory 115 may temporarily store a control program and control data for controlling operation of the cleaning robot 100, a user command received by the user interface 120, motion information detected by the motion detector 130, position information of an obstacle sensed by the obstacle sensor 140, and various types of control signals output by the main processor 111.

The memory 115 may include a non-volatile memory such as a flash memory, a read-only memory (ROM), an erasable programmable ROM (EPROM), and an electrically EPROM (EEPROM), as well as a volatile memory such as a static random access memory (S-RAM), and a dynamic RAM (D-RAM).

Specifically, the non-volatile memory may semi-permanently store a control program and control data for controlling operation of the cleaning robot 100, and the volatile memory may load the control program and the control data from the non-volatile memory and temporarily store the control program and the control data, or temporarily store a user command received by the user interface 120, motion information detected by the motion detector 130, position information of an obstacle sensed by the obstacle sensor 140, and various types of control signals output by the main processor 111.

The graphic processor 113 may convert a reflected light image acquired by the obstacle sensor 140 into an image having a resolution that enables the image to be processed by the main processor 111, or convert the reflected light image into a format that enables the image to be processed by the main processor 111.

The main processor 111 processes data stored in the memory 115 according to the control program stored in the memory 115.

For example, the main processor 111 may process results sensed by the motion detector 130 and the obstacle sensor 140 and generate a control signal for controlling the driver 160 and the cleaner 170.

The main processor 111 may generate driving record information on the basis of motion information of the cleaning robot 100 detected by the motion detector 130 and store the generated driving record information in the memory 115, or calculate a direction and a size of and a distance from an obstacle on the basis of a reflected light image acquired by the obstacle sensor 140.

Also, the main processor 111 may calculate a moving path for avoiding the obstacle O according to the direction and the size of and the distance from the obstacle O, and generate a movement control signal that will be provided to the driver 160 so that the cleaning robot 100 moves along the calculated moving path.

In this way, the controller 110 may determine a position, movement, and the like of the cleaning robot 100 on the basis of the motion information from the motion detector 130, and may determine a position, a size, and the like of the obstacle O on the basis of an obstacle sensing signal from the obstacle sensor 140.

Also, the controller 110 may control the driver 160 so that the cleaning robot 100 moves a floor being cleaned and may control the cleaner 170 so that the cleaning robot 100 cleans the floor being cleaned while moving on the floor being cleaned.

Operations of the cleaning robot 100 that will be described below may be construed as operations caused by controlling operations of the controller 110.

Hereinafter, a method of sensing the obstacle O by the obstacle sensor 140 described above will be described.

FIGS. 8 and 9 illustrate an example in which an obstacle sensor included in the cleaning robot senses an obstacle located in front of the cleaning robot according to an embodiment, and FIG. 10 illustrates an example in which the obstacle sensor included in the cleaning robot senses an obstacle located beside the cleaning robot according to an embodiment.

As described above, the obstacle sensor 140 may include the front light transmission module 141, the front light reception module 143, and the side light sensor module 145.

The front light transmission module 141 included in the obstacle sensor 140 may transmit light toward the front of the cleaning robot 100, and light transmitted toward the front by the front light transmission module 141 is diffused in a sector shape as illustrated in FIG. 8.

When the obstacle O is not located in front of the cleaning robot 100, light transmitted from the front light transmission module 141 advances toward the front of the cleaning robot 100, and the front light reception module 143 is unable to receive light reflected from the obstacle O.

When the obstacle O is located in front of the cleaning robot 100, light transmitted from the front light transmission module 141 is reflected from the obstacle O, and the light reflected from the obstacle O is reflected in various directions as illustrated in FIG. 9 (diffused reflection).

Some of the reflected light reflected from the obstacle O as above may head toward the front light reception module 143 of the cleaning robot 100 as illustrated in FIG. 9.

The reflected light heading toward the front light reception module 143 is reflected by the reflective mirror 143a, a traveling path of the reflected light heads toward the image sensor 143b, and the image sensor 143b receives reflected light reflected from the reflective mirror 143a.

Here, because the reflected light is reflected from various positions of the obstacle O, the image sensor 143b may acquire a two-dimensional reflected light image, and the obstacle sensor 140 may calculate a distance from and a direction of the obstacle O on the basis of the reflected light image.

Specifically, an incidence angle in which light reflected from the obstacle O is incident on the reflective mirror 143a varies according to a distance between the front light reception module 143 and the obstacle O. Also, rays of light incident on the reflective mirror 143a in different incidence angles are received by different positions of the image sensor 143b. As a result, positions at which the image sensor 143b receives reflected light differs according to a distance between the front light reception module 143 and the obstacle O. That is, a reflected light image acquired by the image sensor 143b varies according to the distance between the front light reception module 143 and the obstacle O.

For example, light reflected from the obstacle O located at a far distance from the cleaning robot 100 is incident on the reflective mirror 143a in a large incidence angle, and a reflected light image is generated at a far distance from a point of the reflective mirror 143a. Also, light reflected from the obstacle O located at a short distance from the cleaning robot 100 is incident on the reflective mirror 143a in a small incidence angle, and a reflected light image is generated at a short distance from the point of the reflective mirror 143a.

A position at which light reflected from the obstacle O is incident on the reflective mirror 143a varies according to a direction of the obstacle O. Also, rays of reflected light reflected from different positions of the reflective mirror 143a are received by different positions of the image sensor 143b. As a result, positions at which the image sensor 143b receives reflected light differ according to the direction of the obstacle O. That is, a reflected light image acquired by the image sensor 143b varies according to a direction of the obstacle O with respect to the cleaning robot 100.

In this way, the cleaning robot 100 may calculate a direction of and a distance from the obstacle O according to a reflected light image received by the image sensor 143b.

The side light sensor module 145 may transmit light in a straight line form toward the side of the cleaning robot 100 as illustrated in FIG. 10 and may receive reflected light that is reflected from the obstacle O located beside the cleaning robot 100.

Also, the side light sensor module 145 may transmit information related to the received reflected light to the controller 110, and the controller 110 may calculate a distance between the cleaning robot 100 and the obstacle O on the basis of the information related to the reflected light.

For example, the side light sensor module 145 may transmit intensity of the received reflected light to the controller 110, and the controller 110 may calculate the distance between the cleaning robot 100 and the obstacle O on the basis of the intensity of the reflected light. Specifically, the controller 110 may determine that the distance between the cleaning robot 100 and the obstacle O is short as the intensity of the reflected light is high, and may determine that the distance between the cleaning robot 100 and the obstacle O is far as the intensity of the reflected light is low.

In another example, the side light sensor module 145 may transmit time of flight (TOF) between transmitted light and received reflected light to the controller 110, and the controller 110 may calculate a distance between the cleaning robot 100 and the obstacle O on the basis of the TOF. Specifically, the controller 110 may determine that the distance between the cleaning robot 100 and the obstacle O is short as the TOF is short, and may determine that the distance between the cleaning robot 100 and the obstacle O is far as the TOF is long.

In still another example, the side light sensor module 145 may transmit a distance between a transmission position at which light is transmitted and a reception position at which light is received to the controller 110, and the controller 110 may calculate a distance between the cleaning robot 100 and the obstacle O on the basis of the distance between the transmission position and the reception position. Specifically, the controller 110 may determine that the distance between the cleaning robot 100 and the obstacle O is short as the distance between the transmission position and the reception position of light is short, and may determine that the distance between the cleaning robot 100 and the obstacle O is far as the transmission position and the reception position of light is far.

A configuration of the cleaning robot 100 has been described above.

Hereinafter, an operation of the cleaning robot 100, particularly, a method of setting a cleaning area by the cleaning robot 100 while the cleaning robot 100 is moving will be described.

FIG. 11 illustrates a method of cleaning a cleaning space by the cleaning robot according to an embodiment, and FIGS. 12 to 14 illustrate examples in which the cleaning robot cleans a cleaning space using the method illustrated in FIG. 11 according to an embodiment.

Referring to FIGS. 11 to 14, a cleaning operation (1000) of the cleaning robot 100 will be described.

The cleaning robot 100 moves in the cleaning space A (1100).

Specifically, the cleaning robot 100 may move in any direction from a certain position.

A certain position may be a position at which the charging station (not illustrated) configured to charge a battery of the cleaning robot 100 is located, or a position on the floor of the cleaning space A on which a user places the cleaning robot 100. Like this, a position from which the cleaning robot 100 starts movement is not limited.

Also, the cleaning robot 100 may move in any direction upon starting movement. For example, the cleaning robot 100 may move forward upon starting movement. However, embodiments are not limited thereto, and the cleaning robot 100 may move after changing its moving direction before starting movement.

However, after the cleaning robot 100 starts movement, the cleaning robot 100 preferably does not change its moving direction until an obstacle O is encountered.

The cleaning robot 100 sets a cleaning area while moving in the cleaning space (1200).

Here, a cleaning area is a part of the cleaning space A and refers to a unit of performing cleaning by the cleaning robot 100. In other words, the cleaning robot 100 may clean any one cleaning area and then clean another cleaning area.

Also, a cleaning area may be set to correspond to a single room or a living room that is separated from another area by a wall and connected to another area by an entrance, and the like. However, embodiments are not limited thereto, and a cleaning area may be set by dividing a single room or a living room in a plurality of sections in some cases.

The cleaning robot 100 may set a cleaning area before exploring the entire cleaning space A. Specifically, the cleaning robot 100 may determine whether a condition for setting a cleaning area is satisfied in real time while moving in the cleaning space A, and the cleaning robot 100 may set a corresponding area as a cleaning area first when the condition for setting a cleaning area is satisfied.

For example, as illustrated in FIG. 12, the cleaning robot 100 may set the first room R1 as the first cleaning area A1 when a condition for setting a cleaning area is satisfied, even when the cleaning robot 100 has not explored the entire cleaning space A yet.

When the cleaning area is set, the cleaning robot 100 cleans the set cleaning area first (1300). In other words, when the cleaning area is set while moving, the cleaning robot 100 may clean the set cleaning area before cleaning other areas of the cleaning space A.

Also, when cleaning the cleaning area is finished, the cleaning robot 100 may save that cleaning is finished with respect to the cleaning area on which cleaning has been performed. For example, the cleaning robot 100 may save a cleaning record that shows whether cleaning is finished with respect to a cleaning area. In other words, when a cleaning area is set, the cleaning robot 100 may assign an identification code to the cleaning area, and when cleaning is finished with respect to the cleaning area, the cleaning robot 100 may save the identification code of the cleaned cleaning area to the cleaning record.

For example, as illustrated in FIG. 12, when the first cleaning area A1 is set, the cleaning robot 100 may clean the first cleaning area A1 first before moving in other areas of the cleaning space A.

Then, the cleaning robot 100 determines whether all cleaning areas are cleaned (1400). In other words, the cleaning robot 100 determines whether all areas included in the cleaning space A are cleaned by the cleaning robot 100.

When not all of the cleaning areas are cleaned (NO to 1400), the cleaning robot 100 repeats moving in the cleaning space A, setting a cleaning area, and cleaning the cleaning area.

Also, when all of the cleaning areas are cleaned (YES to 1400), the cleaning robot 100 may end moving and return to the charging station.

For example, after the cleaning robot 100 has moved in the entire cleaning space A, the cleaning robot 100 may generate a cleaning area corresponding to an uncleaned area, clean the generated cleaning area, and then return to the charging station.

The above-described case of cleaning the cleaning space A illustrated in FIG. 1 will be used as an example to describe setting a cleaning area and cleaning the set cleaning area by the cleaning robot 100.

The cleaning robot 100 may set the first room R1 as the first cleaning area A1 according to a preset condition while moving in the cleaning space A as illustrated in FIG. 12.

When the first cleaning area A1 is set as above, the cleaning robot 100 cleans the first cleaning area A1 first.

After cleaning the first cleaning area A1, the cleaning robot 100 determines whether all areas of the cleaning space A are cleaned.

As illustrated in FIG. 12, because some areas of the cleaning space A are not cleaned, the cleaning robot 100 moves in the cleaning space A again.

While moving in the cleaning space A again, the cleaning robot 100 may set the second room R2 as a second cleaning area A2 according to a preset condition as illustrated in FIG. 13 and clean the second cleaning area A2.

After cleaning the second cleaning area A2, the cleaning robot 100 determines whether all areas of the cleaning areas of the cleaning space A are cleaned.

As illustrated in FIG. 13, because some areas of the cleaning space A are not cleaned, the cleaning robot 100 moves in the cleaning space A again.

While moving in the cleaning space A again, the cleaning robot 100 reaches an initial movement starting position as illustrated in FIG. 14.

The cleaning robot 100 which has reached the initial movement starting position may determine that the cleaning robot 100 has moved in all of the areas within the cleaning space A.

The cleaning robot 100 which has moved in all of the areas within the cleaning space A sets an uncleaned area within the cleaning space A as a cleaning area. Specifically, the cleaning robot 100 sets the living room R3 as a third cleaning area A3 as illustrated in FIG. 14. Then, the cleaning robot 100 cleans the third cleaning area R3.

After cleaning the third cleaning area A3, the cleaning robot 100 may determine that all of the areas included in the cleaning space A is cleaned and may return to the charging station for charging its battery.

In this way, the cleaning robot 100 sets the cleaning areas A1, A2, and A3 while moving in the cleaning space A and immediately cleans the cleaning areas A1, A2, and A3 when the cleaning areas A1, A2, and A3 are set.

Also, the cleaning robot 100 may more quickly and effectively clean all of the areas of the cleaning space A by moving in the cleaning space A, setting the cleaning areas A1, A2, and A3, and cleaning the set cleaning areas A1, A2, and A3.

Hereinafter, moving in the cleaning space (1100), setting a cleaning area (1200), cleaning the cleaning area (1300), and determining that cleaning is finished (1400) which constitute the cleaning operation (1000) of the cleaning robot 100 will be described in detail.

FIG. 15 illustrates a method of moving in a cleaning space by the cleaning robot according to an embodiment, FIGS. 16 and 17 illustrate examples in which the cleaning robot moves the cleaning space using the method illustrated in FIG. 15 according to an embodiment, and FIG. 18 illustrates an example in which the cleaning robot saves a cleaning record using the method illustrated in FIG. 15 according to an embodiment.

Referring to FIGS. 15 to 17, moving in the cleaning space (1100) by the cleaning robot 100 will be described.

The cleaning robot 100 moves in any direction (1110).

As described above, the cleaning robot 100 may move in any direction from a certain position.

For example, the cleaning robot 100 may move forward from the charging station (not illustrated) as illustrated in FIG. 16. However, embodiments are not limited thereto, and the cleaning robot 100 may rotate in any direction before starting movement and then move in the direction.

The cleaning robot 100 determines whether the obstacle O is sensed while moving (1120).

Specifically, the obstacle sensor 140 of the cleaning robot 100 transmits light toward the front and side of the cleaning robot 100 and detects reflected light that is received after being reflected from the obstacle O. The controller 110 of the cleaning robot 100 may determine whether the obstacle O is present according to whether reflected light is detected.

When the obstacle O is not sensed (NO to 1120), the cleaning robot 100 continues to move.

When the obstacle O is sensed (YES to 1120), the cleaning robot 100 moves along an outer edge of the obstacle O (1130).

Specifically, when the obstacle sensor 140 of the cleaning robot 100 detects reflected light reflected from the obstacle O, the controller 110 of the cleaning robot 100 determines a distance from and a direction of the obstacle O on the basis of the reflected light.

When a distance from the cleaning robot 100 to the obstacle O becomes smaller than a predetermined reference distance, the cleaning robot 100 may change the moving direction to move parallel to the outer edge of the obstacle O.

For example, the cleaning robot 100 may calculate an angle formed by the moving direction of the cleaning robot 100 and the outer edge of the obstacle O on the basis of the reflected light detected by the obstacle sensor 140, and may move after rotating in place by the calculated angle in a direction opposite to the obstacle O. Here, the in-place rotation refers to rotation of the cleaning robot 100 about the center of the cleaning robot 100 as a rotation axis. That is, the in-place rotation refers to movement in which linear velocity is 0 but angular velocity is not 0.

In another example, the cleaning robot 100 may perform rotational movement in the direction opposite to the obstacle O until the distance between the cleaning robot 100 and the obstacle O reaches a predetermined obstacle-following distance. Here, the rotational movement refers to rotation of the cleaning robot 100 about a position other than the center of the cleaning robot 100 as the rotation axis, with a distance between the center of the cleaning robot 100 and the rotation axis as a radius of rotation. The rotational movement refers to movement in which both linear velocity and angular velocity are not 0.

Then, the cleaning robot 100 performs outer edge following travel in which the cleaning robot 100 moves parallel to the outer edge of the obstacle O while a distance between the cleaning robot 100 and the obstacle O is maintained to be the predetermined obstacle-following distance.

To maintain the distance between the cleaning robot 100 and the obstacle O to be the obstacle-following distance, the cleaning robot 100 may move in a direction receding from the obstacle O when the distance between the cleaning robot 100 and the obstacle O located beside the cleaning robot 100 becomes smaller than the obstacle-following distance, and the cleaning robot 100 may move in a direction approaching the obstacle O when the distance between the cleaning robot 100 and the obstacle O located beside the cleaning robot 100 becomes larger than the obstacle-following distance.

Also, the cleaning robot 100 may perform right-side following movement in which the cleaning robot 100 moves along the outer edge of the obstacle O at the right of the obstacle O (left-handed movement in which the obstacle is located at the left of the cleaning robot) or left-side following movement in which the cleaning robot 100 moves along the outer edge of the obstacle O at the left of the obstacle O (right-handed movement in which the obstacle is located at the right of the cleaning robot). Here, the cleaning robot 100 preferably selects and performs any one of the right-side following movement and the left-side following movement. Hereinafter, the cleaning robot 100 is assumed as performing the left-side following movement in which the cleaning robot 100 moves at the left of the obstacle O (right-handed movement) to assist in understanding the present disclosure.

As a result of the outer edge following travel, the cleaning robot 100 may move along the outer edge of the obstacle O as illustrated in FIG. 17. In other words, the cleaning robot 100 may move along a wall surface of the cleaning space A.

The cleaning robot 100 saves the driving record of the cleaning robot 100 while performing the outer edge following travel (1140).

Specifically, at every predetermined time intervals, the cleaning robot 100 may save position information that represents a position of the cleaning robot 100, movement information including moving velocity information, moving direction information, and the like of the cleaning robot 100, and outer edge information including a feature of the outer edge of the obstacle O along which the cleaning robot 100 follows.

The position information may include position coordinates of the cleaning robot 100. For example, the cleaning robot 100 may generate an xy-coordinate system that has a movement starting point as an origin. Here, the y-axis corresponds to a forward direction of the cleaning robot, and the x-axis corresponds to a direction perpendicular to the y-axis. Also, the cleaning robot 100 may integrate a moving velocity according to the moving direction detected using the motion detector 130 and calculate current position coordinates of the cleaning robot 100.

Because the cleaning robot 100 saves the driving record every predetermined time intervals as described above, information on positions along which the cleaning robot 100 has moved has a form of discontinuous points as illustrated in FIG. 18, and a moving path moved by the cleaning robot 100 is generated when the points are connected.

The movement information may include a moving velocity, a moving direction (a moving angle), and a moving distance related to movement of the cleaning robot 100. For example, the cleaning robot 100 may detect the moving velocity, the moving direction (the moving angle), and the moving distance using the motion detector 130.

The moving direction may be shown using an angle between a direction in which the cleaning robot 100 is moving and a reference direction, with respect to the reference direction. For example, when a direction in which the cleaning robot 100 initially starts movement is defined as the reference direction, the moving direction (angle) may be "+90°" when the cleaning robot 100 rotates 90° counterclockwise (or leftward), and the moving direction (angle) may be "−90°" when the cleaning robot 100 rotates 90° clockwise (or rightward).

Also, the moving direction may include an instantaneous moving direction (angle) that shows a current moving direction (angle) of the cleaning robot 100 and an accumulated moving direction (angle) in which moving directions (angles) of the cleaning robot 100 are accumulated. For example, when the cleaning robot 100 initially starts movement, the instantaneous moving direction (angle) and the accumulated moving direction (angle) are both 0°. However, when the cleaning robot 100 makes one turn counterclockwise in place, the instantaneous moving direction (angle) is 0°, but the accumulated moving direction (angle) is "+360°." Also, when the cleaning robot 100 makes one turn clockwise in place, the instantaneous moving direction (angle) is 0°, but the accumulated moving direction (angle) is "−360°."

The moving velocity may include linear velocity and angular velocity. For example, when the cleaning robot 100 linearly moves, the linear velocity may be the moving velocity of the cleaning robot 100, and the angular velocity may be 0. Also, when the cleaning robot 100 rotates in place, the linear velocity may be 0, and the angular velocity may be the rotational velocity of the cleaning robot 100.

The moving distance may be calculated by integrating the linear velocity among the moving velocities.

The outer edge information may include a shape of the outer edge of the obstacle O along which the cleaning robot 100 follows.

Specifically, the cleaning robot 100 may determine whether the shape of the outer edge of the obstacle O has a linear shape, a convex shape, or a concave shape. For example, the cleaning robot 100 may estimate the shape of the outer edge on the basis of the movement information or the position information of the cleaning robot 100.

Also, the cleaning robot 100 may distinguish the shape of the outer edge of the obstacle O adjacent to the cleaning robot 100 as a wall surface, a convex corner, or a concave corner on the basis of the determined shape of the outer edge of the obstacle O. When the outer edge of the obstacle O has a linear shape, the cleaning robot 100 may distinguish the shape of the outer edge of the obstacle O as a wall surface. When the outer edge of the obstacle O has a convex shape, the cleaning robot 100 may distinguish the shape of the outer edge of the obstacle O as a convex corner. Also, when the outer edge of the obstacle O has a concave shape, the cleaning robot 100 may distinguish the shape of the outer edge of the obstacle O as a concave corner.

The cleaning robot 100 may save the shape of the outer edge of the obstacle O distinguished above as the outer edge information. In other words, the cleaning robot 100 may save any of a wall surface, a convex corner, and a concave corner as the outer edge information according to the shape of the outer edge of the obstacle O.

For example, since the cleaning robot 100 linearly moves through a first point P1 illustrated in FIG. 18, the cleaning robot 100 may save wall surface as outer edge information of the first point P1.

Also, since the cleaning robot 100 performs rotational movement in a direction in which the obstacle O is located (rightward) through a second point P2, the cleaning robot 100 may save convex corner as outer edge formation information of the second point P2.

Also, since the cleaning robot 100 linearly moves through a third point P3, the cleaning robot 100 may save wall surface as outer edge information of the third point P3.

Also, since the cleaning robot 100 linearly moves also through a fourth point P4, the cleaning robot 100 may save wall surface as outer edge information of the fourth point P4.

Also, since the cleaning robot 100 performs rotational movement in a direction opposite to that in which the obstacle O is located (leftward) through a fifth point P5, the cleaning robot 100 may save concave corner as outer edge information of the fifth point P5.

Also, since the cleaning robot 100 linearly moves through a sixth point P6, the cleaning robot 100 may save wall surface as outer edge information of the sixth point P6.

As described above, the cleaning robot 100 may move in any direction from a certain position until the obstacle O is sensed, and performs the outer edge following travel along the outer edge of the obstacle O when the obstacle O is sensed. Also, the cleaning robot 100 saves the driving record including the movement information and the position information of the cleaning robot 100 and the outer edge information of the obstacle O while moving.

FIG. 19 illustrates a method of setting a cleaning area by the cleaning robot according to an embodiment.

Referring to FIG. 19, setting the cleaning area (1200) by the cleaning robot 100 will be described.

The cleaning robot 100 determines an entrance while moving in the cleaning space (1100) described above (1210).

As described above, an entrance corresponds to a passageway configured to connect areas divided by a wall. That is, the cleaning space A may be partitioned into a plurality of areas (a room and a living room) by a wall, and an entrance connects the plurality of partitioned areas.

Also, when the plurality of areas partitioned by the wall are set as cleaning areas, the plurality of cleaning areas are connected via the entrance, and areas on both sides of the entrance may be set as different cleaning areas.

In other words, an entrance may be a reference for setting a cleaning area. That is, when an entrance is determined, the cleaning space A may be divided into a plurality of cleaning areas on the basis of the entrance.

For example, in a case of a room that includes a single entrance, a closed line is formed when a wall surface forming the room and the entrance are connected, and the cleaning robot 100 may set an inner portion within the closed line formed as above as a cleaning area.

Also, in a case of a living room that includes two or more entrances, a closed line is also formed when a wall surface forming the living room and the two or more entrances are connected, and the cleaning robot 100 may set an inner portion within the formed closed line as a cleaning area.

Since the entrance becomes a reference for setting a cleaning area, the cleaning robot 100 determines a position of the entrance.

When an entrance is not determined (NO to 1210), the cleaning robot 100 continues to perform the outer edge following travel.

When an entrance is determined (YES to 1210), the cleaning robot 100 sets a cleaning area on the basis of the driving record of the cleaning robot 100 (1220).

When attempting to divide the cleaning space A into a plurality of cleaning areas on the basis of the entrance, the cleaning robot 100 may set a cleaning area on the basis of outer edge information of a wall and a position of an entrance.

As described above, the cleaning robot 100 performs the outer edge following travel in which the cleaning robot 100 moves along the outer edge of the obstacle O such as a wall surface of the cleaning space A, before setting a cleaning area. Also, the cleaning robot 100 saves the driving record including the position information of the cleaning robot 100, the movement information of the cleaning robot 100, and the outer edge formation information of the obstacle O while performing the outer edge following travel.

In this way, because the cleaning robot 100 saves the driving record while performing the outer edge following travel in which the cleaning robot 100 moves along the outer edge of the obstacle O, the cleaning robot 100 may estimate the outer edge of the obstacle O from the driving record.

For example, the cleaning robot 100 that has performed the outer edge following travel along an inner wall of a room may estimate the shape of the inner wall of the room on the basis of the position information of the cleaning robot 100 in the driving record.

Consequently, the cleaning robot 100 may set a cleaning area on the basis of previously detected position information of an entrance and outer edge information of the inner wall acquired by the cleaning robot 100 while performing the outer edge following travel. That is, the cleaning robot 100 may set a room or a living room separated from another area by a wall and an entrance as a single cleaning area.

In this way, the cleaning robot 100 may determine a position of an entrance and set a cleaning area on the basis of the position of the entrance and the driving record of the cleaning robot 100.

Hereinafter, a specific method of determining a position of an entrance by the cleaning robot 100 and a specific method of setting a cleaning area on the basis of the driving record by the cleaning robot 100 will be described.

Prior to describing the specific method of determining a position of an entrance by the cleaning robot 100, a reference for determining an entrance will be briefly described.

As described above, the cleaning space A may be partitioned by a wall surface and may be divided into a plurality of areas connected by an entrance. Also, a closed line is formed when an entrance and an outer edge of a wall surface are connected, and the cleaning robot 100 may set an inner portion within the closed line connecting the entrance and the outer edge of the wall surface as a cleaning area.

The entrance may be formed between one end of an inner wall that protrudes from an outer wall of the cleaning space toward an inside of the cleaning space and one end of another inner wall, or may be formed between a wall surface of an inner wall (or a wall surface of an outer wall) and one end of another inner wall.

Generally, a portion between a wall surface of an inner wall and a wall surface of another inner wall corresponds to a passageway, not an entrance. Also, an entrance is not formed at an inside of a bent wall surface, i.e., a concave corner of an inner wall (or an outer wall).

As a result, obstacles O at both ends of an entrance may be formed of a convex corner, or an obstacle O at one end of the entrance may be formed of a convex corner, and an obstacle O at the other end thereof may be formed of a wall surface. In other words, at least one of the both ends of the entrance is formed of a convex corner.

Also, the entrance may have a width of about 80 cm to 110 cm to enable a user to easily enter and exit through the entrance.

Also, when the cleaning robot 100 passes through the entrance, the moving direction of the cleaning robot 100 is perpendicular to the entrance. That is, a straight line that connects both ends of the entrance is perpendicular to the moving direction of the cleaning robot 100.

To sum up, 1) at least one of both ends of the entrance is formed of a convex corner; 2) a width of the entrance is within a predetermined reference distance range; and 3) the entrance is disposed parallel to the moving direction of the cleaning robot 100 that passes through the entrance.

When the above conditions of an entrance are satisfied, the cleaning robot 100 may determine a corresponding position as an entrance.

Also, since the cleaning robot 100 moves along the outer edge of the obstacle O, a position at which the driving record of the cleaning robot 100 is recorded, i.e., position information from the driving record, corresponds to the outer edge of the obstacle O.

Consequently, the cleaning robot 100 may find out a shape, a position, and the like of the obstacle O on the basis of the driving record of the cleaning robot 100 and determine an entrance on the basis of the driving record.

FIG. 20 illustrates an example of a method of determining an entrance of a cleaning area by the cleaning robot according to an embodiment, and FIGS. 21 to 23 illustrate examples of determining an entrance of a cleaning area by the cleaning robot using the method illustrated in FIG. 20 according to an embodiment.

Referring to FIGS. 20 to 23, an entrance determining method (1500) of the cleaning robot 100 will be described.

The cleaning robot 100 determines whether the cleaning robot 100 is performing rotational movement along a convex corner of the obstacle (1510).

As described above, the cleaning robot 100 saves the driving record while moving, and the driving record includes the movement information and the position information of the cleaning robot 100 and the outer edge information of the obstacle O.

The cleaning robot 100 may determine whether the cleaning robot 100 is performing rotational movement along the convex corner of the obstacle O on the basis of the outer edge information of the obstacle O in the driving record. Also, the cleaning robot 100 may determine that the outer edge of the obstacle O is a convex corner when the cleaning robot 100 performs rotational movement in a direction in which the obstacle O is located.

For example, when the cleaning robot 100 moves through the first point P1 and the second point P2 as illustrated in FIG. 21, because the cleaning robot 100 linearly moves, the cleaning robot 100 is determined as not moving along the convex corner of the obstacle O.

Also, when the cleaning robot 100 moves through the third point, because the cleaning robot 100 performs rotational movement in a direction in which the obstacle O is located, the cleaning robot 100 is determined as moving along the convex corner of the obstacle O.

Also, when the cleaning robot 100 moves through the fourth point P4, the fifth point P5, and the sixth point P6 as illustrated in FIG. 22, because the cleaning robot 100 linearly moves, the cleaning robot 100 is determined as not moving along the convex corner of the obstacle O. Also, since the cleaning robot 100 performs rotational movement in a direction in which the obstacle O is located when the cleaning robot 100 moves through the seventh point P7, the cleaning robot 100 is determined as moving along the convex corner of the obstacle O.

When the cleaning robot 100 is determined as performing rotational movement along the convex corner of the obstacle O (YES to 1510), the cleaning robot 100 searches for a driving record recorded within a reference distance range (1520).

As described above, the entrance may be formed between one end and another end of an inner wall or between one end of an inner wall and a wall surface of another inner wall, and one end of the inner wall may include a convex corner.

Consequently, when the cleaning robot 100 moves along the convex corner of the obstacle O, the cleaning robot 100 determines whether the corresponding convex corner corresponds to one end of an inner wall that forms an entrance, as will be described below.

Whether a driving record is recorded within a reference distance range from a current position of the cleaning robot 100 is determined. Specifically, the cleaning robot 100 may compare the position information of the cleaning robot 100 included in the driving record with the current position of the cleaning robot 100 to determine whether the driving record is recorded within the reference distance range from the current position of the cleaning robot 100.

As described above, the entrance may have a width of about 80 cm to 110 cm. Consequently, when a driving record of the cleaning robot 100 is present within the reference distance range from the current position of the cleaning robot 100, another obstacle O may be determined as being present within a range of 80 cm to 110 cm from the convex corner of the obstacle O along which the cleaning robot 100 follows.

Here, the reference distance range may be a distance range that results from subtracting a width of the cleaning robot 100 from about 80 cm to 110 cm. For example, when the width of the cleaning robot 100 is 30 cm, the reference distance range may be 50 cm to 80 cm.

Also, a driving record that is recorded within the reference distance may be saved in an entrance candidate list for determining whether an entrance is present.

For example, when the cleaning robot 100 is located at the third point P3 as illustrated in FIG. 21, the cleaning robot 100 may save the first point P1 and the second point P2 disposed within the reference distance range in the entrance candidate list.

Also, when the cleaning robot 100 is located at the seventh point P7 as illustrated in FIG. 22, the cleaning robot 100 may save the fourth point P4, the fifth point P5, and the sixth point P6 disposed within the reference distance range in the entrance candidate list.

When the driving record that is recorded within the reference distance range is found (YES to 1520), the cleaning robot 100 determines whether the found driving record is recorded at an opposite side from the obstacle O (1530).

When the cleaning robot 100 moves while saving driving records, immediately previously saved driving records such as the first point P1 and the second point P2 illustrated in FIG. 21 may be disposed within the reference distance range. Also, when the cleaning robot 100 moves along both sides of a single obstacle O and the single obstacle O is placed therebetween, a driving record saved at the opposite side of the obstacle O may be disposed within the reference distance range.

In other words, obstacles O that form an entrance are different obstacles O disposed at both sides of the cleaning robot 100. Driving records that are recorded within a reference distance range includes driving records recorded while the cleaning robot 100 moves along the same obstacle O as well as driving records recorded while the cleaning robot 100 moves along different obstacles O.

In this way, the driving records recorded while the cleaning robot 100 moves along the same obstacle O are generally behind the cleaning robot 100 or in the same direction as that of the obstacle O.

Consequently, to exclude a driving record that is recorded while the cleaning robot 100 moves along the same obstacle O as the obstacle O that is currently being followed by the cleaning robot 100, the cleaning robot 100 determines whether a position at which a driving record is recorded is at the opposite side of the obstacle O.

Specifically, since a driving record that is behind the cleaning robot 100 or recorded at the same side as the obstacle O is recorded while following the same obstacle O as the obstacle O that is currently being followed by the cleaning robot 100, the cleaning robot 100 excludes a driving record that is behind the cleaning robot 100 or recorded at the same side as the obstacle O from the entrance candidate list.

For example, when the cleaning robot 100 moves through the third point P3 as illustrated in FIG. 21, because the first point P1 and the second point P2 are disposed within the reference distance range from the cleaning robot 100 but are disposed at the same side as the obstacle O, driving records along the first point P1 and the second point P2 are excluded from the entrance candidate list.

Also, when the cleaning robot 100 moves through the seventh point P7 as illustrated in FIG. 22, because the fourth point P4, the fifth point P5, and the sixth point P6 are disposed within the reference distance range from the cleaning robot 100 and are disposed at the opposite side of obstacle O, driving records along the fourth point P4, the fifth point P5, and the sixth point P6 are not excluded from the entrance candidate list.

When a driving record is determined as being recorded at the opposite side of the obstacle (YES to 1530), the cleaning robot 100 determines whether outer edge information from the driving record is wall surface or convex corner (1540).

As described above, the entrance may be formed between one end and another end of an inner wall or between one end of an inner wall and a wall surface of another inner wall, and one end of the inner wall may include a convex corner.

Also, since the cleaning robot 100 moves along the convex corner of the obstacle O in Step 1510, the cleaning robot 100 determines whether an outer edge of an obstacle O disposed at the opposite side of the obstacle O which is currently being followed by the cleaning robot 100 is a convex corner or a wall surface. In other words, whether the cleaning robot 100 moves between a convex corner and another convex corner or between a wall surface and a convex corner is determined.

Specifically, on the basis of outer edge information from a driving record saved in the entrance candidate list, the cleaning robot 100 may determine whether the corresponding driving record is a driving record that is recorded while moving along a wall surface of the obstacle O or a convex corner of the obstacle O. Also, a driving record that is not recorded while moving along the wall surface or the convex corner of the obstacle O is excluded from the entrance candidate list.

For example, when the cleaning robot 100 is placed at the seventh point P7 as illustrated in FIG. 22, the driving records along the fourth point P4, the fifth point P5, and the sixth point P6 are all recorded while the cleaning robot 100 moves along the wall surface of the obstacle O. Consequently, the driving records along the fourth point P4, the fifth point P5, and the sixth point P6 are not excluded from the entrance candidate list.

When outer edge information from the driving record is determined as wall surface or convex corner (YES to 1540), the cleaning robot 100 determines whether the driving record is recorded at a position perpendicular to the current moving direction of the cleaning robot 100 (1550).

As described above, the entrance is disposed perpendicular to the moving direction of the cleaning robot 100 that passes through the entrance. In other words, the advancing direction of the cleaning robot 100 and the straight line connecting both ends of the entrance are perpendicular to each other while the cleaning robot 100 passes through the entrance.

When the cleaning robot 100 is passing through the entrance, a pair of obstacles O that form the entrance are disposed at a direction perpendicular to the moving direction of the cleaning robot 100. One of the pair of obstacles O that form the entrance is an obstacle whose outer edge is followed by the cleaning robot 100, and the other obstacle O is disposed at the opposite side of the obstacle O followed by the cleaning robot 100.

Also, the cleaning robot 100 may determine whether the other one of the obstacles O that form the entrance is present from a driving record. Specifically, the cleaning robot 100 may determine whether a driving record that is recorded at a position in a direction perpendicular to the current moving direction of the cleaning robot 100 is present.

When a driving record that is recorded at a position in a direction perpendicular to the current moving direction of the cleaning robot 100 is present, the cleaning robot 100 may determine that an entrance is present between a position at which the found driving record is recorded (determined on the basis of position information) and the current position of the cleaning robot 100.

For example, when the cleaning robot 100 is placed at the seventh point P7 as illustrated in FIG. 22, the fifth point P5 is disposed in a direction perpendicular to the moving direction of the cleaning robot 100, but the fourth point P4 and the sixth point P6 are not. Consequently, driving records recorded at the fourth point P4 and the sixth point P6 are excluded from the entrance candidate record, and the cleaning robot 100 may determine that an entrance is formed between the seventh point P7 and the fifth point P5.

When the driving record is recorded at a position in a direction perpendicular to the moving direction of the cleaning robot 100 (YES to 1550), the cleaning robot 100 moves to the position at which the detected driving record is recorded (1560).

When the cleaning robot 100 moves along the convex corner of the obstacle O, a convex corner or a wall surface of another obstacle O is present within a reference distance range from the convex corner of the obstacle O, and the cleaning robot 100 perpendicularly moves between the obstacle O and the other obstacle O, the cleaning robot 100 may be determined as passing through the entrance of the cleaning space A.

For example, when the cleaning robot 100 moves through the seventh point P7 as illustrated in FIG. 22, because the cleaning robot 100 performs rotational movement along the convex corner of the obstacle O, the fifth point P5 is located within a reference distance range from the cleaning robot 100, and the fifth point P5 is disposed in a direction perpendicular to the moving direction of the cleaning robot 100, the cleaning robot 100 may determine that an entrance is formed between the seventh point P7 and the fifth point P5.

When the entrance is detected in this way, the cleaning robot 100 moves to a point that forms the entrance with the current position of the cleaning robot 100.

For example, as illustrated in FIG. 23, the cleaning robot 100 may move to the fifth point P5 that is determined as forming the entrance.

Also, the cleaning robot 100 saves driving records of the cleaning robot 100 while moving to the fifth point P5.

Consequently, when the cleaning robot 100 reaches the fifth point P5, the path along which the cleaning robot 100 has moved forms a closed line CL as illustrated in FIG. 23. An inner portion within the closed line CL will be set as a cleaning area afterwards.

As described above, in relation to determining an entrance, the cleaning robot 100: 1) determines whether the cleaning robot 100 moves along a convex corner; 2) searches for a driving record present within a reference distance; 3) determines whether the found driving record is recorded while moving along a wall surface or a convex corner; and 4) determines whether the found driving record is placed in a direction perpendicular to the current moving direction of the cleaning robot 100.

However, an order of determining each condition for determining an entrance may be different from the above. For example, the cleaning robot 100 may: 1) determine whether the cleaning robot 100 moves along a convex corner; 2) search for a driving record present within a reference distance; 4) determine whether the found driving record is placed in a direction perpendicular to the current moving direction of the cleaning robot 100; and 3) determine whether the found driving record is recorded while moving along a wall surface or a convex corner.

The method of determining an entrance by the cleaning robot 100 moving along the convex corner of the obstacle O has been described above.

Hereinafter, a method of determining an entrance by the cleaning robot 100 that moves along a wall surface of an obstacle O will be described.

FIG. 24 illustrates another example of a method of determining an entrance of a cleaning area by the cleaning robot according to an embodiment, and FIGS. 25 to 27 illustrate examples of a process of determining an entrance of a cleaning area by the cleaning robot using the method illustrated in FIG. 24 according to an embodiment.

Referring to FIGS. 24 to 27, an entrance determining method (1600) of the cleaning robot 100 will be described.

The cleaning robot 100 determines whether the cleaning robot 100 linearly moves along a wall surface of an obstacle O (1610).

As described above, the cleaning robot 100 saves a driving record while moving, and the driving record includes movement information and position information of the cleaning robot 100 and outer edge information of the obstacle O.

The cleaning robot 100 may determine whether the cleaning robot 100 linearly moves along the wall surface of the obstacle O on the basis of the outer edge information of the obstacle O in the driving record. Also, the cleaning robot 100 may determine that the outer edge of the obstacle O is a wall surface when the cleaning robot 100 linearly moves.

For example, when the cleaning robot 100 moves through the first point P1 as illustrated in FIG. 25, because the cleaning robot 100 linearly moves, the cleaning robot 100 is determined as moving along a wall surface of the obstacle O. Also, when the cleaning robot 100 moves through the second point P2, because the cleaning robot 100 performs rotational movement, the cleaning robot 100 is determined as not moving along the wall surface of the obstacle O. Also, when the cleaning robot 100 moves through the third point P3, because the cleaning robot 100 linearly moves, the cleaning robot 100 is determined as moving along the wall surface of the obstacle O.

Also, when the cleaning robot 100 moves through the fourth point P4 as illustrated in FIG. 26, since the cleaning robot 100 performs rotational movement, the cleaning robot 100 is determined as not moving along the wall surface of the obstacle O. Also, when the cleaning robot 100 moves through the fifth point P5, the sixth point P6, and the seventh point P7, because the cleaning robot 100 linearly moves, the cleaning robot 100 is determined as moving along the wall surface of the obstacle O.

When the cleaning robot 100 is determined as linearly moving along the wall surface of the obstacle O (YES to 1610), the cleaning robot 100 searches for a driving record that is recorded within a reference distance range (1620).

As described above, an entrance may be formed between one end and another end of an inner wall or between one end of an inner wall and a wall surface of another inner wall.

Consequently, when the cleaning robot 100 moves along the wall surface of the obstacle O, the cleaning robot 100 determines whether the wall surface corresponds to a wall surface of an inner wall that forms an entrance as will be described below.

Whether a driving record is recorded within a reference distance range from the current position of the cleaning robot 100 is determined. Specifically, the cleaning robot 100 may compare the position information of the cleaning robot 100 included in the driving record with the current position of the cleaning robot 100 to determine whether the driving record is recorded within the reference distance range from the current position of the cleaning robot 100.

As described above, the entrance may have a width of about 80 cm to 110 cm. Consequently, when a driving record of the cleaning robot 100 is present within the reference distance range from the current position of the cleaning robot 100, another obstacle O may be determined as being present within a range of 80 cm to 110 cm from the wall surface of the obstacle O along which the cleaning robot 100 follows.

Here, the reference distance range may be a distance range that results from subtracting the width of the cleaning robot 100 from about 80 cm to 110 cm. For example, when the width of the cleaning robot 100 is 30 cm, the reference distance range may be 50 cm to 80 cm.

Also, a driving record that is recorded within the reference distance may be saved in an entrance candidate list for determining whether an entrance is present.

For example, when the cleaning robot 100 is located at the third point P3 as illustrated in FIG. 25, the cleaning robot 100 may save the first point P1 and the second point P2 disposed within the reference distance range in the entrance candidate list.

Also, when the cleaning robot 100 is located at the seventh point P7 as illustrated in FIG. 26, the cleaning robot 100 may save the fourth point P4, the fifth point P5, and the sixth point P6 disposed within the reference distance range in the entrance candidate list.

When the driving record that is recorded within the reference distance range is found (YES to 1620), the cleaning robot 100 determines whether the found driving record is recorded at an opposite side from the obstacle O (1630).

When the cleaning robot 100 moves while saving driving records, immediately previously saved driving records such as the first point P1 and the second point P2 illustrated in FIG. 25 may be disposed within the reference distance range. Also, when the cleaning robot 100 moves along both sides of a single obstacle O and the single obstacle O is placed therebetween, a driving record saved at the opposite side of the obstacle O may be disposed within the reference distance range.

In other words, obstacles O that form an entrance are different obstacles O disposed at both sides of the cleaning robot 100. Driving records that are recorded within a reference distance range includes driving records recorded while the cleaning robot 100 moves along the same obstacle O as well as driving records recorded while the cleaning robot 100 moves along different obstacles O.

In this way, the driving records recorded while the cleaning robot 100 moves along the same obstacle O are generally placed behind the cleaning robot 100 or placed in the same direction as that of the obstacle O.

Consequently, to exclude a driving record that is recorded while the cleaning robot 100 moves along the same obstacle O as the obstacle O that is currently being followed by the cleaning robot 100, the cleaning robot 100 determines whether a position at which a driving record is recorded is at the opposite side of the obstacle O.

Specifically, since a driving record that is behind the cleaning robot 100 or recorded at the same side as the obstacle O is recorded while following the same obstacle O as the obstacle O that is currently being followed by the cleaning robot 100, the cleaning robot 100 excludes a driving record that is behind the cleaning robot 100 or recorded at the same side as the obstacle O from the entrance candidate list.

For example, when the cleaning robot 100 moves through the third point P3 as illustrated in FIG. 25, because the first point P1 and the second point P2 are disposed within the reference distance range from the cleaning robot 100 but are disposed behind the cleaning robot 100 or disposed at the same side as the obstacle O, driving records along the first point P1 and the second point P2 are excluded from the entrance candidate list.

Also, when the cleaning robot 100 moves through the seventh point P7 as illustrated in FIG. 26, because the fourth point P4 is disposed within the reference distance range from the cleaning robot 100 and is disposed at the opposite side of obstacle O, a driving record along the fourth point P4 is not excluded from the entrance candidate list. However, because the fifth point P5 and the sixth point P6 are located within the reference distance range from the cleaning robot 100 but are disposed behind the cleaning robot 100, driving records along the fifth point P5 and the sixth point P6 are excluded from the entrance candidate list.

When a driving record is determined as being recorded at the opposite side of the obstacle (YES to 1630), the cleaning robot 100 determines whether outer edge information from the driving record is convex corner (1640).

As described above, the entrance may be formed between one end and another end of an inner wall or between one end of an inner wall and a wall surface of another inner wall, and one end of the inner wall may include a convex corner.

Also, since the cleaning robot 100 moves along the wall surface of the obstacle O in Step 1610, the cleaning robot 100 determines whether an outer edge of an obstacle O disposed at the opposite side of the obstacle O which is currently being followed by the cleaning robot 100 is a convex corner. In other words, whether the cleaning robot 100 moves between a wall surface and a convex corner is determined.

Specifically, on the basis of outer edge information from a driving record saved in the entrance candidate list, the cleaning robot 100 may determine whether the corresponding driving record is a driving record that is recorded while moving along a convex corner of the obstacle O. Also, a driving record that is not recorded while moving along the convex corner of the obstacle O is excluded from the entrance candidate list.

For example, when the cleaning robot 100 is placed at the seventh point P7 as illustrated in FIG. 26, the driving record along the fourth point P4 is recorded while the cleaning robot 100 moves along the convex corner of the obstacle O. Consequently, the driving records along the fourth point P4 is not excluded from the entrance candidate list.

When outer edge information from the driving record is determined as convex corner (YES to 1640), the cleaning robot 100 determines whether the driving record is recorded at a position perpendicular to the current moving direction of the cleaning robot 100 (1650).

As described above, the entrance is disposed perpendicular to the moving direction of the cleaning robot 100 that passes through the entrance. In other words, the advancing direction of the cleaning robot 100 and the straight line connecting both ends of the entrance are perpendicular to each other while the cleaning robot 100 passes through the entrance.

When the cleaning robot 100 is passing through the entrance, a pair of obstacles O that form the entrance are disposed at a direction perpendicular to the moving direction of the cleaning robot 100. One of the pair of obstacles O that form the entrance is an obstacle whose outer edge is followed by the cleaning robot 100, and the other obstacle O is disposed at the opposite side of the obstacle O followed by the cleaning robot 100.

Also, the cleaning robot 100 may determine whether the other one of the obstacles O that forms the entrance is present from a driving record. Specifically, the cleaning robot 100 may determine whether a driving record that is recorded at a position in a direction perpendicular to the current moving direction of the cleaning robot 100 is present.

When a driving record that is recorded at a position in a direction perpendicular to the current moving direction of the cleaning robot 100 is present, the cleaning robot 100 may determine that an entrance is present between a position at which the found driving record is recorded (determined on the basis of position information) and the current position of the cleaning robot 100.

For example, when the cleaning robot 100 is placed at the seventh point P7 as illustrated in FIG. 26, the fourth point P4 is disposed in a direction perpendicular to the moving direction of the cleaning robot 100. Consequently, the cleaning robot 100 may determine that an entrance is formed between the seventh point P7 and the fourth point P4.

When the driving record is recorded at a position in a direction perpendicular to the moving direction of the cleaning robot 100 (YES to 1650), the cleaning robot 100 moves to the position at which the detected driving record is recorded (1660).

When the cleaning robot 100 moves along the wall surface of the obstacle O, a convex corner of another obstacle O is present within a reference distance range from the wall surface of the obstacle O, and the cleaning robot 100 perpendicularly moves between the obstacle O and the other obstacle O, the cleaning robot 100 may be determined as passing through the entrance of the cleaning space A.

For example, when the cleaning robot 100 moves through the seventh point P7 as illustrated in FIG. 26, since the cleaning robot 100 has performed rotational movement along the convex corner of the obstacle O, the fourth point P4 is located within a reference distance range from the cleaning robot 100, and the fourth point P4 is disposed in a direction perpendicular to the moving direction of the cleaning robot 100, the cleaning robot 100 may determine that an entrance is formed between the seventh point P7 and the fourth point P4.

When the entrance is detected in this way, the cleaning robot 100 moves to a point that forms the entrance with the current position of the cleaning robot 100.

For example, as illustrated in FIG. 27, the cleaning robot 100 may move to the fourth point P4 that is determined as forming the entrance.

Also, the cleaning robot 100 saves driving records of the cleaning robot 100 while moving to the fourth point P4.

Consequently, when the cleaning robot 100 reaches the fourth point P4, the path along which the cleaning robot 100 has moved forms a closed line CL as illustrated in FIG. 27. An inner portion within the closed line CL will be set as a cleaning area afterwards.

As described above, in relation to determining an entrance, the cleaning robot 100: 1) determines whether the cleaning robot 100 moves along a wall surface; 2) searches for a driving record present within a reference distance; 3) determines whether the found driving record is recorded while moving along a convex corner; and 4) determines whether the found driving record is placed in a direction perpendicular to the current moving direction of the cleaning robot 100.

However, an order of determining each condition for determining an entrance may be different from the above. For example, the cleaning robot 100 may: 1) determine whether the cleaning robot 100 moves along a wall surface; 2) search for a driving record present within a reference distance; 4) determine whether the found driving record is placed in a direction perpendicular to the current moving direction of the cleaning robot 100; and 3) determine whether the found driving record is recorded while moving along a convex corner.

As described above, the cleaning robot 100 determines a position of an entrance on the basis of current movement information and previously saved driving records. Specifically, the cleaning robot 100 determines in real time whether the cleaning robot 100 is currently passing through an entrance on the basis of the current movement information and the previously saved driving records.

FIG. 28 illustrates a method of setting a cleaning area by the cleaning robot according to an embodiment, and FIGS. 29 to 32 illustrate examples of a process of setting a cleaning area by the cleaning robot using the method illustrated in FIG. 28 according to an embodiment.

Referring to FIGS. 28 to 32, a cleaning area setting method (1700) of the cleaning robot 100 will be described.

The cleaning robot 100 determines whether the current position thereof is the same as a previously moved position (1710).

Specifically, the cleaning robot 100 may determine whether the current position thereof is the same as a previously moved position on the basis of position information included in a driving record.

When the current position of the cleaning robot 100 is the same as a previously moved position, a closed line is formed by a moving path of the cleaning robot 100.

As described above, the cleaning robot 100 may determine an entrance and move from one end of the determined entrance to the other end thereof. As a result, as illustrated in FIG. 29, a moving path along which the cleaning robot 100 has moved forms a closed line CL.

When the current position of the cleaning robot 100 is the same as a previously moved position of the cleaning robot 100 (YES to 1710), the cleaning robot 100 performs linear modeling of the closed line CL formed by the driving record (1720).

Specifically, the cleaning robot 100 connects points represented by pieces of position information of a plurality of driving records to each other according to the order of movement. Here, the cleaning robot 100 connects the points so that a moving path formed by connecting the points is flat.

Specifically, when the cleaning robot 100 has performed linear movement, the cleaning robot 100 may connect the points so that angles between line segments connecting the points are a predetermined angle or larger.

For example, as illustrated in FIG. 30, when a plurality of driving records represent the first point P1, the second point P2, the third point P3, the fourth point P4, and the fifth point P5, the cleaning robot 100 sequentially connects the first point P1 to the fifth point P5 and generates a moving path of the cleaning robot 100.

First, as illustrated in (a) of FIG. 30, the cleaning robot 100 connects the first point P and the second point P2.

Then, the cleaning robot 100 determines whether an angle θ3 between a line segment connecting the second point P2 and the third point P3 and a line segment connecting the first point P1 and the second point P2 is a predetermined reference angle or larger. When the corresponding angle θ3 is a reference angle or larger as illustrated in (a) of FIG. 30, the cleaning robot 100 connects the second point P2 and the third point P3.

Then, the cleaning robot 100 determines whether an angle θ4 between a line segment connecting the third point P3 and the fourth point P4 and a line segment connecting the second point P2 and the third point P3 is the predetermined reference angle or larger. When the corresponding angle θ4 is a reference angle or smaller as illustrated in (b) of FIG. 30, the cleaning robot 100 does not connect the third point P3 and the fourth point P4.

Then, the cleaning robot 100 determines whether an angle θ5 between a line segment connecting the third point P3 and the fifth point P5 and the line segment connecting the second point P2 and the third point P3 is a predetermined reference angle or larger. When the corresponding angle θ5 is a reference angle or larger as illustrated in (c) of FIG. 30, the cleaning robot 100 connects the third point P3 and the fifth point P5.

In this way, the cleaning robot 100 may generate a moving path along which the cleaning robot 100 has moved by connecting points represented by driving records of the cleaning robot 100.

In another example, the cleaning robot 100 may connect a first point at which linear movement is initially performed and a second point at which linear movement is lastly performed in a straight line, when a degree at which a third point between the first point and the second point is deviated from the straight line exceeds an error range, connect the first point and the third point in a straight line, and connect the third point and the second point in a straight line.

Also, when the cleaning robot 100 has performed rotational movement, the cleaning robot 100 may generate a moving path along which the cleaning robot 100 has moved by connecting the points from where they are located.

After performing linear modeling of the cleaning area, the cleaning robot 100 simplifies the closed line CL (1730).

When a partial area of the linearly-modeled closed line CL is deviated from another area thereof by a reference value or more, the partial area may be simplified by the cleaning robot 100.

For example, as illustrated in (a) of FIG. 31, a first path L1, a second path L2, and a third path L3 included in the closed line CL are more generated in a more complex shape compared to other paths.

As illustrated in (b) of FIG. 31, the cleaning robot 100 may simplify the complexly generated first path L1, second path L2, and third path L3.

After performing the task of simplifying the cleaning area, the cleaning robot 100 may save intersections of lines forming the closed line CL as feature points, and use vector components of the lines to finally save position information of a convex corner and a concave corner.

After simplifying the cleaning area, the cleaning robot 100 rotates and transforms the closed line CL (1740).

The cleaning robot 100 saves a driving record with an initial movement position as an origin, and sets a cleaning area on the basis of the saved position information from the driving record.

For example, when the cleaning robot 100 begins obliquely moving from one side of the living room R3 (see FIG. 1) as illustrated in FIG. 1, the first cleaning area A1 corresponding to the first room R1 (see FIG. 1) of the cleaning robot 100 is set as illustrated in (a) of FIG. 32. In other words, the cleaning robot 100 generates a rhombus-shaped closed line CL corresponding to the rectangular first room R1 (see FIG. 1) according to a direction of the xy-coordinate system generated upon starting movement.

The cleaning robot 100 rotates and transforms the closed line CL to further simplify the rhombus-shaped closed line CL.

Specifically, the cleaning robot 100 acquires angles formed between lines forming the closed line CL and the x-axis illustrated in (a) of FIG. 32. Here, the cleaning robot 100 may divide the xy-coordinate system generated upon starting movement into a plurality of angular ranges r1 to r12 according to angles as illustrated in (a) of FIG. 32.

Then, the cleaning robot 100 determines an angular range, among the plurality of angular ranges r1 to r12, to which an angle of each of the lines belongs.

According to (a) of FIG. 32, the cleaning robot 100 may determine that a first line l1 and a third line l3 of the closed line CL belong to the fourth angular range r4, and a second line l2 and a fourth line l4 thereof belong to the tenth angular range r10.

In this way, the cleaning robot 100 calculates a sum of lengths of lines that belong to the same angular range for each angular range.

Then, the cleaning robot 100 selects an angular range in which the sum of lengths of lines that belong thereto is largest as a main angular range.

After selecting a main angular range, the cleaning robot 100 calculates a sum of lengths of lines that belong to an angular range that is perpendicular to the main angular range, and determines whether the sum is a predetermined reference value or larger.

When the sum of lengths of lines that belong to the angular range perpendicular to the main angular range is smaller than the reference value, the cleaning robot 100 may reselect an angular range in which the sum of lengths of lines that belong thereto is the second largest as a main angular range.

Then, the cleaning robot 100 recalculates a sum of lengths of lines that belong to an angular range that is perpendicular to the main angular range, and determines whether the sum is the predetermined reference value or larger.

When selecting a main angular range, an angular range perpendicular thereto is taken in to consideration to prevent a cleaning area having an extremely narrow width from being formed.

For example, in a case of the first cleaning area A1 illustrated in (a) of FIG. 32, the sum of lengths of the first line l1 and the third line l3 belonging to the fourth angular range r4 is the largest. Also, the sum of lengths of the second line l2 and the fourth line l4 belonging to the tenth angular range r10 that is perpendicular to the fourth angular range r4 is a reference value or larger.

Consequently, the cleaning robot 100 may select the fourth angular range r4 as a main angular range.

When the main angular range is selected, the cleaning robot 100 rotates and transforms the closed line CL by a central angle of the main angular range.

For example, the cleaning robot 100 may rotate and transform the closed line CL illustrated in (a) of FIG. 32 by a central angle (52.5°) of the fourth angular range r4, which is the main angular range.

As result, the first cleaning area A1 is transformed into a rectangular shape as illustrated in (b) of FIG. 32.

Then, the cleaning robot 100 calculates a maximum value and a minimum value in the x-axis direction and a maximum value and a minimum value in the y-axis direction of the rotated and transformed cleaning area. Also, the cleaning robot 100 sets a final cleaning area in a rectangular shape on the basis of the maximum value and the minimum value in the x-axis direction and the maximum value and the minimum value in the y-axis direction.

For example, because the closed line illustrated in (b) of FIG. 32 has a rectangular shape, the cleaning robot 100 may set the closed line illustrated in (b) of FIG. 32 as the first cleaning area A1.

As described above, to set a simplified cleaning area, the cleaning robot 100 simplifies the closed line CL generated by movement of the cleaning robot 100 and then sets the simplified closed line CL as the cleaning area A1.

After the cleaning area A1 is set, the cleaning robot 100 cleans an inner portion of the set cleaning area A1.

FIG. 33 illustrates a method of cleaning a cleaning area by the cleaning robot according to an embodiment, and FIGS. 34 to 36 illustrate examples of a process of cleaning a cleaning area by the cleaning robot using the method illustrated in FIG. 33 according to an embodiment.

Referring to FIGS. 33 to 36, a cleaning area cleaning method (1300) of the cleaning robot 100 will be described.

The cleaning robot 100 moves and cleans an inner portion of the cleaning area A1 (1310).

The cleaning robot 100 may clean the inner portion of the cleaning area A1 using various methods.

For example, the cleaning robot 100 may clean the cleaning area A1 while performing zigzag travel as illustrated in FIG. 34.

Specifically, the cleaning robot 100 may perform zigzag travel with the x-axis as the main axis.

In other words, the cleaning robot 100 may move in the x-axis direction (or −x-axis direction) from any concave corner included in the cleaning area A1, and, when the cleaning robot 100 encounters an obstacle O, the cleaning robot 100 may move in the y-axis direction (or −y-axis direction) along an outer edge of the obstacle O. Then, the cleaning robot 100 may move in the −x-axis direction (or x-axis direction), and, when the cleaning robot 100 encounters an obstacle O, the cleaning robot 100 may move in the y-axis direction (or −y-axis direction) along an outer edge of the obstacle O.

In another example, the cleaning robot 100 may clean the cleaning area A1 while moving in any direction as illustrated in FIG. 35.

Specifically, the cleaning robot 100 may move in any direction from a certain position within the cleaning area A1, and, when the cleaning robot 100 encounters an obstacle O, the cleaning robot 100 may move after rotating by a certain angle in any direction.

While cleaning the cleaning area, the cleaning robot 100 determines whether cleaning the cleaning area is finished (1320).

For example, when the cleaning robot 100 moves the cleaning area A1 in a zigzag line as illustrated in FIG. 34, the cleaning robot 100 may determine that cleaning the cleaning area A1 is finished after the cleaning robot 100 has moved all areas within the cleaning area A1.

For example, when the cleaning robot 100 moves in any direction as illustrated in FIG. 35, the cleaning robot 100 may determine that cleaning the cleaning area A1 is finished after a predetermined amount of time is passed.

When cleaning the cleaning area is determined as not finished (NO to 1320), the cleaning robot 100 continues to clean the cleaning area. Also, when cleaning the cleaning area is determined as finished (YES to 1320), the cleaning robot 100 saves a cleaned-finished area (1330).

Specifically, the cleaning robot 100 may separately save the cleaning area A1 in which cleaning is finished of the cleaning space A.

Then, the cleaning robot 100 moves to a position at which an entrance is detected, and then moves in the cleaning space A (1340).

For example, when cleaning the cleaning area A1 is finished, the cleaning robot 100 may move to the seventh point P7, which is a position at which an entrance of the first room R1 is detected, as illustrated in FIG. 36.

The cleaning robot 100 which has moved to the seventh point P7 may re-perform the outer edge following travel in which the cleaning robot 100 moves along the outer edge of the obstacle O.

As described above, the cleaning robot 100 may set the cleaning area A1, immediately clean the cleaning area A1, and then continuously move the cleaning space A.

Hereinafter, a method of setting an uncleaned area as a cleaning area after moving the entire cleaning space A and cleaning the set cleaning area will be described.

FIG. 37 illustrates a method of cleaning an uncleaned area by the cleaning robot according to an embodiment, and FIGS. 38 and 39 illustrate examples of a process of cleaning an uncleaned area by the cleaning robot using the method illustrated in FIG. 37 according to an embodiment.

The cleaning robot 100 determines whether the current position of the cleaning robot 100 is a position at which the cleaning robot 100 started the outer edge following travel (1410).

Specifically, the cleaning robot 100 may determine whether the current position is the same as the position at which the outer edge following travel is started, on the basis of position information included in a driving record.

When the current position of the cleaning robot 100 and the position at which the cleaning robot 100 started the outer edge following travel are the same, the cleaning robot 100 may determine that the cleaning robot 100 has moved all areas included in the cleaning space A.

Specifically, the cleaning robot 100 may determine that the cleaning robot 100 will move along all outer edges of the cleaning space A as illustrated in FIG. 38.

When the current position of the cleaning robot 100 is the same as the position at which the cleaning robot 100 started the outer edge following travel (YES to 1410), the cleaning robot 100 determines an uncleaned area (1420).

As described above, the cleaning robot 100 sets the cleaning areas A1 and A2 in real time while moving in the cleaning space A, an cleans the set cleaning areas A1 and A2 first.

Specifically, the cleaning robot 100 determines an entrance, generates a closed line CL that connects the entrance to an outer edge of the obstacle O forming the cleaning areas A1 and A2, and sets the cleaning areas A1 and A2 on the basis of the generated closed line CL. Also, the cleaning robot 100 cleans the cleaning areas A1 and A2 first before moving in other areas, and saves the cleaning-finished cleaning areas A1 and A2.

As a result, a cleaning area is not set in an area at which the cleaning robot 100 has initially started the outer edge following travel before the cleaning robot 100 moves the entire cleaning space A.

Consequently, after moving in the entire cleaning space A, the cleaning robot 100 may determine an area of the cleaning space A except the cleaning-finished areas as an uncleaned area.

For example, when the cleaning robot 100 has started the outer edge following travel from the living room R3 as illustrated in FIG. 38, the cleaning robot 100 sets the first room R1 and the second room R2 as the first cleaning area A1 and the second cleaning area A2 while moving along the outer edge of the obstacle O, and cleans the first cleaning area A1 and the second cleaning area A2.

Then, when the cleaning robot 100 continues to move the cleaning space A, the cleaning robot 100 may reach the position at which the cleaning robot 100 has initially started the outer edge following travel.

As a result, a map of the cleaning space A that consists of the first cleaning area A1 and the second cleaning area A2 which are cleaned and a closed line CL that corresponds to an outer edge of the living room R3 as illustrated in FIG. 38 is saved in the cleaning robot 100.

Also, the cleaning robot 100 may determine an inner portion within the closed line CL as an area in which cleaning is not finished.

After determining an uncleaned area, the cleaning robot 100 sets a cleaning area corresponding to the uncleaned area (1430).

Specifically, to set an uncleaned area as a cleaning area, the cleaning robot 100 performs linear modeling of a closed line CL corresponding to the uncleaned area, simplifies the closed line CL, and rotates and transforms the closed line CL as described above.

As a result, the uncleaned area R3 is set as the third cleaning area A3 as illustrated in FIG. 39.

After the cleaning area is set, the cleaning robot 100 cleans an inner portion within the set cleaning area (1440).

The cleaning robot 100 may clean the inner portion within the cleaning area A3 using various methods.

For example, the cleaning robot 100 may clean the cleaning area A3 while performing zigzag travel as illustrated in FIG. 39.

While cleaning the cleaning area, the cleaning robot 100 determines whether cleaning the cleaning area is finished (1450).

For example, when the cleaning robot 100 moves the cleaning area A3 in a zigzag line as illustrated in FIG. 39, the cleaning robot 100 may determine that cleaning the cleaning area A3 is finished after the cleaning robot 100 has moved all areas within the cleaning area A3.

When cleaning the cleaning area is determined as not finished (NO to 1450), the cleaning robot 100 continues to clean the cleaning area.

Also, when cleaning the cleaning area is determined as finished (YES to 1450), the cleaning robot 100 returns to the charging station (1460).

When an uncleaned area is cleaned after the cleaning robot 100 has moved the entire cleaning space A, the cleaning robot 100 may determine that all areas within the cleaning space A are cleaned.

Consequently, the cleaning robot 100 may return to the charging station for charging its battery.

As described above, the cleaning robot 100 sets an uncleaned area as a cleaning area after moving in the entire cleaning space A, and returns to the charging station after cleaning all cleaning areas.

The method in which the cleaning robot 100 moves along an outer edge of the cleaning space A using the obstacle sensor 140, sets a cleaning area on the basis of a driving record when an entrance is found while moving, and cleans the set cleaning area first has been described above.

However, the cleaning robot 100 is not limited to using the obstacle sensor 140 for finding an entrance and setting a cleaning area while moving.

Hereinafter, a method of determining whether the cleaning robot is abnormally moving, like repeatedly moving along the same path, and the cleaning robot deviating from abnormally moving when the abnormal movement is determined will be described.

FIG. 40 illustrates a method of determining whether the cleaning robot is repeatedly moving along the same path according to an embodiment, and FIGS. 41 and 42 illustrate an example of the cleaning robot repeatedly moving along the same path according to an embodiment.

Referring to FIGS. 40, 41, and 42, an abnormal movement deviating method (3000) of the cleaning robot 100 will be described.

While moving, the cleaning robot 100 determines whether the cleaning robot 100 is repeatedly moving along the same path (3010).

The cleaning robot 100 may repeatedly move along the same path due to various reasons. For example, when the cleaning robot 100 senses an obstacle O1 disposed at the middle of the cleaning space A, the cleaning robot 100 may repeatedly move along an outer edge of the obstacle O1.

Specifically, as illustrated in FIG. 41, the cleaning space A formed by an outer wall OW may be divided into the first room R1 and the second room R2 by an inner wall IN. When the cleaning space A is divided into the first room R1 and the second room R2 in this way, and the first room R1 and the second room R2 are connected by the first entrance E1, the cleaning robot 100 may find the first entrance E1 according to the cleaning operation (1000) (see FIG. 11) illustrated in FIG. 11 and clean the first room R1 first.

Then, the cleaning robot 100 may find a second obstacle O2 that is movable while moving along the outer wall OW, and move along an outer edge of the second obstacle O2. The cleaning robot 100 may find the first obstacle O1 which is fixed while moving along the outer edge of the second obstacle O2, and move along the outer edge of the first obstacle O1.

When the second obstacle O2 is removed as illustrated in FIG. 42 while the cleaning robot 100 moves along the outer edge of the first obstacle O1, the cleaning robot 100 moves along the outer edge of the first obstacle O1. In other words, the cleaning robot 100 is unable to deviate from the first obstacle O1.

As above, when the cleaning robot 100 moves along the outer edge of the first obstacle O1 which is isolated (not adjacent to another obstacle or a wall surface), the cleaning robot 100 may just move along the outer edge of the first obstacle O1 until energy stored in a power source (not illustrated) is used up, instead of cleaning the cleaning space A.

To deviate from the first obstacle O1 which is isolated, the cleaning robot 100 determines whether the cleaning robot 100 is repeatedly moving along the same path.

The cleaning robot 100 may acquire the current position of the cleaning robot 100 from the motion detector 130 and determine whether the cleaning robot 100 is repeatedly moving along the same path on the basis of the acquired current position information and position information from a driving record. As described above, the cleaning robot 100 saves driving records of the cleaning robot 100 while moving. Specifically, at every predetermined time intervals, the cleaning robot 100 may save position information that represents a position of the cleaning robot 100, movement information that represents a moving velocity, a moving direction, and the like of the cleaning robot 100, and outer edge information that represents a feature of an outer edge of an obstacle O along which the cleaning robot 100 follows.

Also, the cleaning robot 100 may compare the acquired current position information with the position information from the driving record, and determine whether the cleaning robot 100 is repeatedly moving along the same path according to the result of comparison. For example, the cleaning robot 100 may search for a driving record on the basis of the acquired current position information, may determine that the cleaning robot 100 is repeatedly moving along the same path when position information that is the same as the acquired current position information is found, and may determine the cleaning robot 100 is not repeatedly moving along the same path when position information that is the same as the acquired current position information is not found.

When the cleaning robot 100 is determined as not repeatedly moving along the same path (NO to 3010), the cleaning robot 100 continues to move.

Conversely, when the cleaning robot 100 is determined as repeatedly moving along the same path (YES to 3010), the cleaning robot 100 moves to a predetermined reference position (3020).

Specifically, the cleaning robot 100 may move to a position before the cleaning robot 100 starts repeatedly moving along the same path. For example, when the cleaning robot 100 repeatedly moves along the same path after cleaning the first room R1 as illustrated in FIG. 42, the cleaning robot 100 may move to one end P1 of the first entrance E1 of the first room R1.

Also, a reference position to which the cleaning robot 100 will move may be changed as the cleaning robot 100 moves. For example, a reference position before the cleaning robot 100 cleans the first room R1 may be different from a reference position after the cleaning robot 100 cleans the first room R1.

After moving to the reference position, the cleaning robot 100 moves again from the reference position (3030).

Specifically, the cleaning robot 100 may move from the reference position along an outer edge of an obstacle or a wall surface.

Also, the cleaning robot 100 may delete a driving record of repeated movement. For example, when the cleaning robot 100 repeatedly moves along the outer edge of the first obstacle O1 as illustrated in FIG. 42, the cleaning robot 100 may delete a driving record saved while moving along the outer edge of the first obstacle O1.

As described above, the cleaning robot 100 may determine whether the cleaning robot 100 is repeatedly moving along the same path, and move to a predetermined reference position when the cleaning robot 100 is determined as performing repeated movement. In this way, by moving to the predetermined reference position, the cleaning robot 100 may deviate from repeatedly moving along the same path.

Hereinafter, a method of the cleaning robot 100 deviating from repeated movement will be described in detail.

FIG. 43 illustrates an example of a method of the cleaning robot deviating from repeated movement according to an embodiment, and FIG. 44 illustrates an example of the cleaning robot moving using the method illustrated in FIG. 43.

Referring to FIGS. 43 and 44, an example of a method (3100) of the cleaning robot 100 deviating from repeated movement will be described.

The cleaning robot 100 determines whether the current position of the cleaning robot 100 is the same as a position previously moved by the cleaning robot 100 (3110).

Specifically, the cleaning robot 100 acquires current position information of the cleaning robot 100 through the motion detector 130, and searches through a driving record on the basis of the acquired current position information. When position information that is the same as the acquired current position information is found from the driving record, the cleaning robot 100 may determine that the current position information is the same as the position information from the driving record.

When the current position information is not the same as the position information from the driving record (NO to 3110), the cleaning robot 100 continues to perform the current movement.

Conversely, when the current position information is the same as the position information from the driving record (YES to 3110), the cleaning robot 100 determines whether an absolute value of a difference between the current moving angle (direction) and a previous moving angle (direction) is a predetermined angle or larger (3120).

The cleaning robot 100 passing through the same position again does not necessarily mean that the cleaning robot 100 is repeatedly moving along the same path. For example, when the cleaning robot 100 moves by crossing an already moved path, the cleaning robot 100 moves the same position again but does not repeatedly move along the same path.

Due to this reason, when the cleaning robot 100 passes through the same position again, the cleaning robot 100 calculates a difference between a current moving angle (represents a moving direction) and a previous moving angle (represents a moving direction), and compares an absolute value of the calculated difference with a predetermined angle. Here, the predetermined angle may be set as 360°, 720°, 1080°, and the like.

Specifically, the controller 110 of the cleaning robot 100 receives an accumulated moving angle from the motion detector 130. As described above, the cleaning robot 100 may save an instantaneous moving angle and an accumulated moving angle during movement by the motion detector 130. Here, the controller 110 may acquire a currently accumulated moving angle from the motion detector 130.

Also, the controller 110 of the cleaning robot 100 may acquire an accumulated moving angle during previous moving from a driving record saved in the memory 115. In other words, the controller 110 may acquire an accumulated moving angle of the cleaning robot 100 when the cleaning robot 100 moves a position same as the current position.

Then, the controller 110 calculates a difference between the accumulated moving angle during the current movement and the accumulated moving angle during the previous movement. When the cleaning robot 100 repeatedly moves along the same path, the difference between the currently accumulated moving angle and the previously accumulated moving angle may be ±360°, ±720°, ±1080°, and the like.

For example, when the cleaning robot 100 moves along the outer edge of the obstacle O1 that is isolated as illustrated in FIG. 42, the cleaning robot 100 may move one turn around the outer edge of the obstacle O1 and move to the same position as before. When the cleaning robot 100 moves one turn around the outer edge of the obstacle O1 in this way, the rotational displacement of the cleaning robot 100 is the same as that when the cleaning robot 100 makes one turn in place. In other words, when the cleaning robot 100 moves one turn around the outer edge of the obstacle O1, the accumulated moving angle of the cleaning robot 100 increases by 360° or decreases by 360°. Consequently, when the cleaning robot 100 moves one turn around the outer edge of the obstacle O1, a difference between accumulated moving angles before and after the movement is ±360°.

Also, when the cleaning robot 100 moves two turns around the outer edge of the obstacle O1, the difference between accumulated moving angles before and after the movement is ±720°, and when the cleaning robot 100 moves three turns around the outer edge of the obstacle O1, the difference between accumulated moving angles before and after the movement is ±1080°.

Consequently, when an absolute value of the difference between a current moving angle (direction) and a previous moving angle (direction) is 360° or larger, the cleaning robot 100 may determine that the cleaning robot 100 has made one turn or more around the outer edge of the obstacle O1 which is isolated. Also, when an absolute value of the difference between a current moving angle (direction) and a previous moving angle (direction) is 720° or larger, the cleaning robot 100 may determine that the cleaning robot 100 has made two turns or more around the outer edge of the obstacle O1 which is isolated. Also, when an absolute value of the difference between a current moving angle (direction) and a previous moving angle (direction) is 1080° or larger, the cleaning robot 100 may determine that the cleaning robot 100 has made three turns or more around the outer edge of the obstacle O1 which is isolated.

When the predetermined angle is set as 360°, the cleaning robot 100 may determine whether the cleaning robot 100 has made one turn around the outer edge of the obstacle O1 which is isolated. When the predetermined angle is set as 720°, the cleaning robot 100 may determine whether the cleaning robot 100 has made two turns around the outer edge of the obstacle O1 which is isolated. Also, when the predetermined angle is set as 10800, the cleaning robot 100 may determine whether the cleaning robot 100 has made three turns around the outer edge of the obstacle O1 which is isolated.

In other words, when the absolute value of the difference between a current moving angle (direction) and a previous moving angle (direction) is a predetermined angle (360°, 720°, 1080°, and the like) or larger, the cleaning robot 100 may determine that the cleaning robot 100 has repeatedly moved along the same path.

In addition, to more accurately determine whether the cleaning robot 100 repeatedly moves along the same path, the cleaning robot 100 may calculate a difference between a currently moving distance and a previously moved distance and compare the calculated difference with a predetermined distance.

Specifically, the controller 110 of the cleaning robot 100 may receive a moving distance from the motion detector 130, and acquire a previously moved distance from a driving record saved in the memory 115. Then, the controller 110 may calculate a difference between the currently moving distance and the previously moved distance, determine that the cleaning robot 100 has repeatedly moved along the same path when the calculated difference is a predetermined distance or smaller, and determine that the cleaning robot 100 has not repeatedly moved along the same path when the calculated difference is larger than the predetermined distance.

When the absolute value of the difference between the current moving angle (direction) and the previous moving angle (direction) is smaller than the predetermined angle (NO to 3120), the cleaning robot 100 continues to perform the current movement.

Conversely, when the absolute value of the difference between the current moving angle (direction) and the previous moving angle (direction) is the predetermined angle or larger (YES to 3120), the cleaning robot 100 moves toward an entrance of a cleaning area which is most recently cleaned (3130).

As described above, when the cleaning robot 100 passes through the same position again, and the absolute value of the difference between the current moving angle (direction) and the previous moving angle (direction) is the predetermined angle or larger, the cleaning robot 100 may be determined as repeatedly moving along the same path.

When the cleaning robot 100 is determined as repeatedly moving along the same path as above, the cleaning robot 100 moves to the predetermined reference position. Here, the reference position may be an entrance of a cleaning area which is most recently cleaned.

As described above, when the cleaning robot 100 finds an entrance, the cleaning robot 100 sets a cleaning area on the basis of the entrance and cleans the set cleaning area. Consequently, an entrance of the cleaning area which is cleaned becomes a start point for setting a new cleaning area. In other words, an entrance of a cleaning area that is most recently cleaned becomes a start point of movement before repeated movement is performed.

Consequently, the cleaning robot 100 may move to one end of an entrance of a cleaning area which is a start point of movement before repeated movement is performed.

For example, when the cleaning robot 100 cleans the first room R1 and then performs repeated movement, the cleaning robot 100 may move toward the end P1 of the first entrance E1, which is the entrance of the first room R1, as illustrated in FIG. 44.

When the cleaning robot 100 reaches the end P1 of the first entrance E1, the cleaning robot 100 may delete all driving records generated due to repeated movement. Specifically, the cleaning robot 100 may delete all driving records until reaching the end P1 of the first entrance E1 after cleaning the first room R1 is finished.

As described above, the cleaning robot 100 may determine whether the cleaning robot 100 is repeatedly moving along the same path on the basis of position information and moving direction information, and may move to an entrance of a cleaning area that is most recently cleaned when the cleaning robot 100 is determined as repeatedly moving along the same path. In this way, the cleaning robot 100 may deviate from repeated movement.

FIG. 45 illustrates another example of a method of the cleaning robot deviating from repeated movement according to an embodiment, and FIGS. 46 and 47 illustrate an example of the cleaning robot moving using the method illustrated in FIG. 45.

Referring to FIGS. 45, 46, and 47, another example of a method (3200) of the cleaning robot 100 deviating from repeated movement will be described.

The cleaning robot 100 determines whether the current position of the cleaning robot 100 is the same as a position previously moved by the cleaning robot 100 (3210).

Specifically, the cleaning robot 100 acquires current position information of the cleaning robot 100 through the motion detector 130, and searches through a driving record on the basis of the acquired current position information. When position information that is the same as the acquired current position information is found from the driving record, the cleaning robot 100 may determine that the current position thereof is the same as a previous position thereof.

When the current position information is not the same as the position information from the driving record (NO to 3210), the cleaning robot 100 continues to perform the current movement.

Conversely, when the current position information is the same as the position information from the driving record (YES to 3210), the cleaning robot 100 determines whether an absolute value of a difference between the current moving angle (direction) and a previous moving angle (direction) is a predetermined angle or larger (3220). Here, the predetermined angle may be set as 360°, 720°, 1080°, and the like.

Specifically, the controller 110 of the cleaning robot 100 receives an accumulated moving angle from the motion detector 130. As described above, the cleaning robot 100 may save an instantaneous moving angle and an accumulated moving angle during movement by the motion detector 130. Here, the controller 110 may acquire a currently accumulated moving angle from the motion detector 130.

Also, the controller 110 of the cleaning robot 100 may acquire an accumulated moving angle during previous movement from a driving record saved in the memory 115. In other words, the controller 110 may acquire an accumulated moving angle of the cleaning robot 100 when the cleaning robot 100 moves a position same as the current position.

Then, the controller 110 calculates a difference between the accumulated moving angle during the current movement and the accumulated moving angle during the previous movement. When the cleaning robot 100 repeatedly moves along the same path, the difference between the currently accumulated moving angle and the previously accumulated moving angle may be ±360°, ±720°, ±1080°, and the like.

When the absolute value of the difference between the current moving angle (direction) and the previous moving angle (direction) is 360° or larger, the cleaning robot 100 may determine that the cleaning robot 100 has made one turn or more around the outer edge of the obstacle O1 which is isolated. Also, when the absolute value of the difference between the current moving angle (direction) and the previous moving angle (direction) is 720° or larger, the cleaning robot 100 may determine that the cleaning robot 100 has made two turns or more around the outer edge of the obstacle O1 which is isolated. Also, when the absolute value of the difference between the current moving angle (direction) and the previous moving angle (direction) is 1080° or larger, the cleaning robot 100 may determine that the cleaning robot 100 has made three turns or more around the outer edge of the obstacle O1 which is isolated.

In other words, when the absolute value of the difference between a current moving angle (direction) and a previous moving angle (direction) is a predetermined angle (360°, 720°, 1080°, and the like) or larger, the cleaning robot 100 may determine that the cleaning robot 100 has repeatedly moved along the same path.

When the absolute value of the difference between the current moving angle (direction) and the previous moving angle (direction) is smaller than the predetermined angle (NO to 3220), the cleaning robot 100 continues to perform the current movement.

Conversely, when the absolute value of the difference between the current moving angle (direction) and the previous moving angle (direction) is the predetermined angle or larger (YES to 3220), the cleaning robot 100 determines whether a cleaning area which is cleaned is present (3230).

Specifically, the cleaning robot 100 may determine whether a cleaning area which is cleaned is present on the basis of a driving record, a cleaning record, and the like of the cleaning robot 100. As described above, when a cleaning area is set, the cleaning robot 100 may assigns an identification code to the set cleaning area, and, when cleaning the cleaning area is finished, save the identification code of the cleaning area as a cleaning record. Consequently, the cleaning robot 100 may acquire presence of a cleaning area which is cleaned, a position of the cleaning area which is cleaned, a position of an entrance of the cleaning area which is cleaned, and the like on the basis of the cleaning record.

When a cleaning area which is cleaned is present (YES to 3230), the cleaning robot 100 moves toward an entrance of a cleaning area which is most recently cleaned (3240).

When the cleaning robot 100 is determined as repeatedly moving along the same path, the cleaning robot 100 moves to a predetermined reference position. Here, the reference position may be an entrance of a cleaning area which is most recently cleaned. Consequently, the cleaning robot 100 may move to one end of the entrance of the cleaning area which is most recently cleaned.

Also, when the cleaning robot 100 reaches one end of the entrance of the cleaning area which is most recently cleaned, the cleaning robot 100 may delete all driving records generated due to repeated movement, and restart movement.

When a cleaning area which is cleaned is not present (NO to 3230), the cleaning robot 100 moves in a predetermined direction (3250).

When a cleaning area which is cleaned is not present, because an entrance of a cleaning area is not set, a reference position to which the cleaning robot 100 will move may be a start point at which the cleaning robot 100 has started movement. However, when the cleaning robot 100 restarts movement from the start point at which the cleaning robot 100 has started movement, the cleaning robot 100 may repeatedly move along the same path.

For example, as illustrated in FIG. 46, when an obstacle O that is initially sensed after the cleaning robot 100 has started movement is the obstacle O1 which is isolated, a cleaning area that is cleaned by the cleaning robot 100 is not present. Here, when the cleaning robot 100 restarts movement from the start point, the cleaning robot 100 repeatedly moves along the same path along the outer edge of the obstacle O1 which is isolated.

To prevent this, when the cleaning robot 100 is determined as repeatedly moving along the same path, the cleaning robot 100 may move in a predetermined direction.

For example, when the cleaning robot 100 is determined as repeatedly moving along the same path, the cleaning robot 100 may immediately rotate 45° in a direction opposite to that of the obstacle O1 and then linearly move as illustrated in FIG. 47. Also, when the cleaning robot 100 is determined as repeatedly moving along the same path, the cleaning robot 100 may delete all previous driving records.

As described above, when the cleaning robot 100 is repeatedly moving along the same path, and a previously-cleaned cleaning area is not present, the cleaning robot 100 may immediately move in a predetermined direction. In this way, the cleaning robot 100 may deviate from repeated movement.

FIG. 48 illustrates still another example of a method of the cleaning robot deviating from repeated movement according to an embodiment, and FIGS. 49 to 52 illustrate an example of the cleaning robot moving using the method illustrated in FIG. 48.

Referring to FIGS. 48 to 52, still another example of a method (3300) of the cleaning robot 100 deviating from repeated movement will be described.

The cleaning robot 100 determines whether the current position of the cleaning robot 100 is the same as a position previously moved by the cleaning robot 100 (3310).

Specifically, the cleaning robot 100 acquires current position information of the cleaning robot 100 through the motion detector 130, and searches through a driving record on the basis of the acquired current position information. When position information that is the same as the acquired current position information is found from the driving record, the cleaning robot 100 may determine that the current position thereof is the same as a previous position thereof.

When the current position information is not the same as the position information from the driving record (NO to 3310), the cleaning robot 100 continues to perform the current movement.

Conversely, when the current position information is the same as the position information from the driving record (YES to 3310), the cleaning robot 100 determines whether an absolute value of a difference between the current moving angle (direction) and a previous moving angle (direction) is a predetermined angle or larger (3320). Here, the predetermined angle may be set as 360°, 720°, 1080°, and the like.

Specifically, the controller 110 of the cleaning robot 100 receives an accumulated moving angle from the motion detector 130. As described above, the cleaning robot 100 may save an instantaneous moving angle and an accumulated moving angle during movement by the motion detector 130. Here, the controller 110 may acquire a currently accumulated moving angle from the motion detector 130.

Also, the controller 110 of the cleaning robot 100 may acquire an accumulated moving angle during previous moving from a driving record saved in the memory 115. In other words, the controller 110 may acquire an accumulated moving angle of the cleaning robot 100 when the cleaning robot 100 moves through a position that is the same as the current position.

Then, the controller 110 calculates a difference between the accumulated moving angle during the current movement and the accumulated moving angle during the previous movement. When the cleaning robot 100 repeatedly moves along the same path, the difference between the currently accumulated moving angle and the previously accumulated moving angle may be ±360°, ±720°, ±1080°, and the like.

When the absolute value of the difference between the current moving angle (direction) and the previous moving angle (direction) is 360° or larger, the cleaning robot 100 may determine that the cleaning robot 100 has made one turn or more around the outer edge of the obstacle O1 which is isolated. Also, when the absolute value of the difference between the current moving angle (direction) and the previous moving angle (direction) is 720° or larger, the cleaning robot 100 may determine that the cleaning robot 100 has made two turns or more around the outer edge of the obstacle O1 which is isolated. Also, when the absolute value of the difference between the current moving angle (direction) and the previous moving angle (direction) is 1080° or larger, the cleaning robot 100 may determine that the cleaning robot 100 has made three turns or more around the outer edge of the obstacle O1 which is isolated.

In other words, when the absolute value of the difference between a current moving angle (direction) and a previous moving angle (direction) is a predetermined angle (360°, 720°, 1080°, and the like) or larger, the cleaning robot 100 may determine that the cleaning robot 100 has repeatedly moved along the same path.

When the absolute value of the difference between the current moving angle (direction) and the previous moving angle (direction) is smaller than the predetermined angle (NO to 3320), the cleaning robot 100 continues to perform the current movement.

Conversely, when the absolute value of the difference between the current moving angle (direction) and the previous moving angle (direction) is the predetermined angle or larger (YES to 3320), the cleaning robot 100 determines whether a cleaning area which is cleaned is present (3330).

Specifically, the cleaning robot 100 may determine whether a cleaning area which is cleaned is present on the basis of a driving record, a cleaning record, and the like of the cleaning robot 100. As described above, when a cleaning area is set, the cleaning robot 100 may assigns an identification code to the set cleaning area, and, when cleaning the cleaning area is finished, save the identification code of the cleaning area as a cleaning record. Consequently, the cleaning robot 100 may acquire presence of a cleaning area which is cleaned, a position of the cleaning area which is cleaned, a position of an entrance of the cleaning area which is cleaned, and the like on the basis of the cleaning record.

When a cleaning area which is cleaned is not present (NO to 3330), the cleaning robot 100 moves in a predetermined direction (3340).

When a cleaning area which is cleaned is not present, because an entrance of a cleaning area is not set, a reference position to which the cleaning robot 100 will move may be a start point at which the cleaning robot 100 has started movement. However, when the cleaning robot 100 restarts movement from the start point at which the cleaning robot 100 has started movement, the cleaning robot 100 may repeatedly move along the same path.

To prevent this, when the cleaning robot 100 is determined as repeatedly moving along the same path, the cleaning robot 100 may move in a predetermined direction. Also, when the cleaning robot 100 is determined as repeatedly moving along the same path, the cleaning robot 100 may delete all previous driving records.

When a cleaning area which is cleaned is present (YES to 3330), the cleaning robot 100 may determine whether one end of an entrance of a cleaning area which is most recently cleaned is included in a repeatedly moved path (3350).

When a cleaning area which is cleaned is present, the cleaning robot 100 may set one end of an entrance of the cleaning area as a reference position, and move toward the reference position. However, when the reference position is included in a repeatedly moved path, the cleaning robot 100 continues to perform repeated movement even after moving to the reference position.

For example, as illustrated in FIG. 49, the cleaning robot 100 which has cleaned the first room R1 may move along the outer wall OW, a third obstacle O3 which is movable, and the first obstacle O1 which is fixed.

Here, when the cleaning robot 100 reaches a second position P2 that corresponds to a convex corner of the first obstacle O1 while moving along the outer edge of the first obstacle O1, the cleaning robot 100 may determine a portion between the second position P2 and the inner wall IN as the second entrance E2. Specifically, because the second position P2 corresponds to the convex corner, and the inner wall IN is located at the opposite side of the second position P2, the cleaning robot 100 may determine the portion between the second position P2 and the inner wall IN as the second entrance E2.

As illustrated in FIG. 50, the cleaning robot 100 may set a portion R2-2 of the second room R2 partitioned by the third obstacle O3 and the first obstacle O1 as a cleaning area, and clean the portion R2-2 of the second room R2. Then, the cleaning robot 100 may move along the outer edge of the first obstacle O1 again.

When the third obstacle O3 is removed while the cleaning robot 100 moves along the outer edge of the first obstacle O1, the cleaning robot 100 repeatedly moves along the outer edge of the first obstacle O1 as illustrated in FIG. 51.

By Steps 3310 and 3320 described above, the cleaning robot 100 may determine whether repeated movement along the same path is being performed and may move to the reference position.

However, one end P2 of the second entrance E2 that corresponds to the reference position is included in the outer edge of the first obstacle O1. In other words, the reference position is included in the repeatedly moved path. Consequently, the cleaning robot 100 repeatedly moves along the outer edge of the first obstacle O1 even after moving to the end P2 of the second entrance E2 which is the reference position.

To prevent this, the cleaning robot 100 may determine whether one end of an entrance of a cleaning area which is most recently cleaned is included in a repeatedly moved path.

The controller 110 of the cleaning robot 100 may determine whether one end of an entrance of a cleaning area which is most recently cleaned is included in a repeatedly moved path by using a driving record saved in the memory 115.

Specifically, when the cleaning robot 100 is determined as repeatedly moving along the same path, the cleaning robot 100 extracts the repeatedly moved path from a driving record. In other words, when the cleaning robot 100 moves a position that is the same as a previously moved position, the cleaning robot 100 determines a moving path along which the cleaning robot 100 has moved between a previous moving time point and the current moving time point.

Then, by comparing the repeatedly moved path with a position of one end of an entrance of a cleaning area, the cleaning robot 100 may determine whether one end of an entrance of a cleaning area which is most recently cleaned is included in the repeatedly moved path.

When one end of an entrance of a cleaning area which is most recently cleaned is not included in the repeatedly moved path (NO to 3350), the cleaning robot 100 moves toward the entrance of the cleaning area which is most recently cleaned (3360).

When one end of an entrance of a cleaning area which is most recently cleaned is not included in a repeatedly moved path, the cleaning robot 100 may determine that the cleaning robot 100 will deviate from repeated movement after the cleaning robot 100 moves to the end of the entrance of the cleaning area which is most recently cleaned. Consequently, to deviate from repeated movement, the cleaning robot 100 moves to the end of the entrance of the cleaning area which is most recently cleaned.

Also, when the cleaning robot 100 reaches the end of the entrance of the cleaning area which is most recently cleaned, the cleaning robot 100 may delete all driving records generated due to repeated movement, and may restart movement.

When one end of an entrance of a cleaning area which is most recently cleaned is included in the repeatedly moved path (YES to 3350), the cleaning robot 100 moves toward an entrance of a cleaning area which is second-recently cleaned.

When one end of an entrance of a cleaning area which is most recently cleaned is included in the repeatedly moved path, the cleaning robot 100 may determine that the cleaning robot 100 will continue to perform repeated movement after the cleaning robot 100 moves to the end of the entrance of the cleaning area which is most recently cleaned. Consequently, to deviate from repeated movement, the cleaning robot 100 moves to one end of an entrance of a cleaning area which is second-recently cleaned.

For example, as illustrated in FIG. 52, the cleaning robot 100 may clean the portion R2-2 of the second room after cleaning the first room R1, and repeatedly move along the outer edge of the first obstacle O1. Here, because the end P2 of the second entrance E2 of the portion R2-2 of the second room is included in the repeatedly moved path, the cleaning robot 100 may move to the end P1 of the first entrance E1 of the first room R1.

Also, when the cleaning robot 100 reaches one end of an entrance of a cleaning area which is second-recently cleaned, the cleaning robot 100 may delete all driving records generated due to repeated movement, and restart movement.

As described above, when the cleaning robot 100 is repeatedly moving along the same path, and one end of an entrance of a cleaning area which is most recently cleaned is included in a repeatedly moved path, the cleaning robot 100 may move to one end of an entrance of a cleaning area which is second-recently cleaned. In this way, the cleaning robot 100 may deviate from repeated movement.

Hereinafter, another example of the cleaning robot 100 finding an entrance and setting a cleaning area while moving will be described.

FIG. 53 illustrates a control configuration of the cleaning robot according to another embodiment.

Referring to FIG. 53, the cleaning robot 100 may include the user interface 120 configured to interact with a user, the motion detector 130 configured to detect information related to motion of the cleaning robot 100, the obstacle sensor 140 configured to sense an obstacle O in the cleaning space A, the driver 160 configured to move the cleaning robot 100, the cleaner 170 configured to clean the cleaning space, the controller 110 configured to collectively control an operation of the cleaning robot 100, and an image acquirer 191 configured to acquire an image of a surrounding of the cleaning robot 100.

The user interface 120, the motion detector 130, the obstacle sensor 140, the driver 160, the cleaner 170, and the controller 110 are the same as those in the configuration of the cleaning robot 100 according to the embodiment described with reference to FIG. 3.

However, the cleaning robot 100 according to another embodiment further includes the image acquirer 191 as illustrated in FIG. 53.

The image acquirer 191 may include an upper camera module 191*a* configured to acquire an image of a view above the cleaning robot 100, i.e., an image of a ceiling, and a front camera module 191*b* configured to acquire an image of a view in front of the cleaning robot 100.

The upper camera module 191*a* may include a three-dimensional camera provided at an upper surface of the cleaning robot 100 to acquire an image of a view above the cleaning robot 100, i.e., a three-dimensional image of a ceiling of the cleaning space, and a graphic processor configured to process an image acquired by the three-dimensional camera. The graphic processor may perform simple image processing such as changing a size or a resolution of an image acquired by the three-dimensional camera.

A three-dimensional image may include a two-dimensional image of an object to be captured and information on a distance to the object to be captured, and the three-dimensional camera may employ a stereo camera module, a depth sensor module, or the like.

The stereo camera module includes a pair of two-dimensional cameras, and uses a difference in images acquired by the pair of two-dimensional cameras to calculate distance information of a captured object. Also, the stereo camera module outputs any one of the images acquired by the pair of two-dimensional cameras and the distance information of the captured object.

The depth sensor module includes a two-dimensional camera configured to acquire an image of an object to be captured, and an infrared sensor configured to radiate infrared rays toward the object to be captured and detect a size of infrared rays reflected from the object to be captured to measure a distance to the object to be captured. Also, the depth sensor module outputs an image acquired by the two-dimensional camera and distance information acquired by the infrared sensor.

The front camera module 191*b* may include a three-dimensional camera provided at a front surface of the cleaning robot 100 to acquire a three-dimensional image of a view in front of the cleaning robot 100, and a graphic processor configured to process a three-dimensional image acquired by the three-dimensional camera.

FIG. 54 illustrates a method of cleaning a cleaning space by the cleaning robot according to another embodiment, and FIGS. 55 to 59 illustrate examples of cleaning a cleaning space by the cleaning robot using the method illustrated in FIG. 54 according to an embodiment.

Referring to FIGS. 54 to 59, a cleaning method (2000) of the cleaning robot 100 will be described.

The cleaning robot 100 moves in the cleaning space A (2010).

Specifically, the cleaning robot 100 may move in any direction from a certain position.

The certain position may be a position at which the charging station (not illustrated) for charging the battery of the cleaning robot 100 is disposed, or a position on the floor of the cleaning space A on which a user places the cleaning robot 100. Like this, a position from which the cleaning robot 100 starts moving is not limited.

Also, the cleaning robot 100 may move in any direction upon starting movement. For example, the cleaning robot 100 may move forward upon starting movement. However, embodiments are not limited thereto, and the cleaning robot 100 may move after changing its moving direction before starting movement.

However, after the cleaning robot 100 starts moving, the cleaning robot 100 preferably does not change its moving direction until an obstacle O is encountered.

While moving, the cleaning robot 100 detects an entrance using the front camera module 191*b* (2020).

The cleaning robot 100 may acquire an image of a view in front of the cleaning robot 100 by using the front camera module 191*b* every predetermined time intervals, extract image features from the front-view image, and determine whether the front-view image includes an image of an entrance on the basis of the extracted image features.

Specifically, the cleaning robot 100 acquires a front-view image by using the front camera module 191*b*. Here, when a three-dimensional camera module is employed as the front camera module 191*b* in the cleaning robot 100, the front-view image may include distance information as well as image information.

For example, as illustrated in FIG. 55, when cleaning robot 100 is placed in front of an entrance, the cleaning robot 100 may acquire an image of the entrance. Here, the image of the entrance acquired by the cleaning robot 100 is the same as a first image (Image 1) illustrated in FIG. 56.

The cleaning robot 100 that has acquired the first image (Image 1) may extract keypoints from the first image (Image 1). Specifically, the cleaning robot 100 may use Harris Corner algorithm, Shi-Tomasi algorithm, SIFT-DoG algorithm, Features from Accelerated Segment Test (FAST) algorithm, Adaptive and Generic corner detection based on the AST (AGAST) algorithm, and the like to extract keypoints from the first image (Image 1).

For example, the cleaning robot 100 may extract a plurality of keypoints, including a first keypoint KP1, a second keypoint KP2, a third keypoint KP3, and a fourth keypoint KP4, from the first image (Image 1) illustrated in FIG. 56.

Also, the cleaning robot 100 may calculate three-dimensional coordinates of the keypoints by using distance information corresponding to each of the keypoints, and may determine whether an object disposed in front of the cleaning robot 100 is an entrance on the basis of the calculated three-dimensional coordinates.

For example, the cleaning robot 100 may determine whether a shape formed by connecting the keypoints on the basis of the three-dimensional coordinates of the keypoints corresponds to a shape of an entrance. An entrance has a width of about 80 cm to 110 cm as described above and has a height of about 180 cm to 220 cm. The cleaning robot 100 may determine whether the shape formed by the keypoints corresponds to the shape of an entrance using machine learning algorithm The cleaning robot 100 which detected an entrance may pass and move through the entrance.

For example, as illustrated in FIG. 57, after detecting an entrance, the cleaning robot 100 which was in the living room R3 may pass through the detected entrance and move to the first room R1.

Then, the cleaning robot 100 sets a cleaning area using the upper camera module (2030).

The cleaning robot 100 that has passed through the entrance may acquire an image of a ceiling of a cleaning area using the upper camera module 191a, extract image features from the ceiling image, and set a cleaning area on the basis of the extracted image features.

Specifically, the cleaning robot 100 acquires a ceiling image using the upper camera module 191a. Here, when the three-dimensional camera module is employed as the upper camera module 191a in the cleaning robot 100, the ceiling image may include distance information as well as image information.

For example, as illustrated in FIG. 57, after the cleaning robot 100 enters the first room R1, the cleaning robot 100 may acquire a ceiling image of the first room R1. Here, the ceiling image acquired by the cleaning robot 100 is the same as a second image (Image 2) illustrated in FIG. 58.

The cleaning robot 100 which has acquired the second image (Image 2) may extract keypoints from the second image (Image 2).

For example, the cleaning robot 100 may extract a plurality of keypoints, including a first keypoint KP1, a second keypoint KP2, a third keypoint KP3, and a fourth keypoint KP4, from the second image (Image 2) illustrated in FIG. 58.

Also, the cleaning robot 100 may calculate three-dimensional coordinates of the keypoints using distance information corresponding to each of the keypoints, and may generate a map of the first room R1 on the basis of the calculated three-dimensional coordinates.

Then, the cleaning robot 100 may set the first cleaning area A1 corresponding to the first room R1 on the basis of the first room R1. Here, the cleaning robot 100 may set the first cleaning area A1 using the cleaning area setting method (1700) (see FIG. 28) described with reference to FIG. 28.

However, the cleaning robot 100 is not limited to using the upper camera module 191a for setting a cleaning area.

For example, the cleaning robot 100 may use the obstacle sensor 140 and move along an outer edge of an obstacle O. Also, while moving the outer edge of the obstacle O, the cleaning robot 100 may save a driving record including movement information, position information, and the like of the cleaning robot 100. While moving along the outer edge of the obstacle O, the cleaning robot 100 may determine whether the current position of the cleaning robot 100 is the same as a position of an entrance, and, when the current position is the same as the position of the entrance, the cleaning robot 100 may also set a cleaning area on the basis of the saved driving record.

The cleaning robot 100 that has set a cleaning area cleans the set cleaning area while moving in the cleaning area (2040).

The cleaning robot may clean a cleaning area according to the cleaning area cleaning method (1300) illustrated in FIG. 33.

For example, the cleaning robot 100 may perform zigzag travel as illustrated in FIG. 59 to clean the cleaning area, and may move to a position at which an entrance of the cleaning area is determined.

Then, the cleaning robot 100 determines whether all cleaning areas are cleaned (2050). In other words, the cleaning robot 100 determines whether all areas included in the cleaning space A are cleaned.

For example, when an entrance of an uncleaned area is not detected, the cleaning robot 100 may determine that all areas of the cleaning space A are cleaned.

When not all of the cleaning areas are cleaned (NO to 2050), the cleaning robot 100 repeats moving in the cleaning space A, determining an entrance, setting a cleaning area, and cleaning the cleaning area.

Also, when all of the cleaning areas are cleaned (YES to 2050), the cleaning robot 100 may end moving and return to the charging station.

For example, after the cleaning robot 100 has moved the entire cleaning space A, the cleaning robot 100 may set a cleaning area corresponding to an uncleaned area, clean the set cleaning area, and then return to the charging station.

As described above, the cleaning robot 100 may set a cleaning area by using the image acquirer 191 while moving, and clean the set cleaning area first.

FIG. 60 illustrates a control configuration of the cleaning robot according to still another embodiment.

Referring to FIG. 60, the cleaning robot 100 may include the user interface 120 configured to interact with a user, the motion detector 130 configured to detect information related to motion of the cleaning robot 100, the obstacle sensor 140 configured to sense an obstacle O in the cleaning space A, the driver 160 configured to move the cleaning robot 100, the cleaner 170 configured to clean the cleaning space, the controller 110 configured to collectively control an operation of the cleaning robot 100, and a radar sensor 193 configured to monitor a surrounding environment of the cleaning robot 100.

The user interface 120, the motion detector 130, the obstacle sensor 140, the driver 160, the cleaner 170, and the controller 110 are the same as those in the configuration of the cleaning robot 100 according to the embodiment described with reference to FIG. 3.

However, the cleaning robot 100 according to still another embodiment further includes the radar sensor 193 as illustrated in FIG. 60.

The radar sensor 193 may transmit radio waves toward the front of the cleaning robot 100, and detect/analyze reflected waves reflected from an object such as an obstacle O to detect a distance to the object, a moving speed of the object, and the like.

Specifically, the radar sensor 193 may calculate a distance to an object by using a TOF between time at which radio waves are transmitted and time at which reflected waves are received, and may calculate a moving speed of the object by using the Doppler effect by movement of the object.

Also, the radar sensor 193 may use a directional antenna to transmit radio waves in a fixed direction. Particularly, the radar sensor 193 may transmit radio waves in various directions at different time intervals by rotating the directional antenna.

When radio waves are transmitted to various directions by rotating the directional antenna in this way, the radar sensor 193 may calculate a direction in which an obstacle O, and the like is placed on the basis of a direction in which radio waves are transmitted.

FIG. 61 illustrates a method of cleaning a cleaning space by the cleaning robot according to still another embodiment.

Referring to FIG. 61, a cleaning method (2100) of the cleaning robot 100 will be described.

The cleaning robot 100 moves in the cleaning space A (2110).

Specifically, the cleaning robot 100 may move in any direction from a certain position.

The certain position may be a position at which the charging station (not illustrated) for charging the battery of the cleaning robot 100 is disposed, or a position on the floor of the cleaning space A on which a user places the cleaning robot 100. Like this, a position from which the cleaning robot 100 starts moving is not limited.

Also, the cleaning robot 100 may move in any direction upon starting movement. For example, the cleaning robot 100 may move forward upon starting movement. However, embodiments are not limited thereto, and the cleaning robot 100 may move after changing its moving direction before starting movement.

However, after the cleaning robot 100 starts moving, the cleaning robot 100 preferably does not change its moving direction until an obstacle O is encountered.

While moving, the cleaning robot 100 detects an entrance using the radar sensor 193 (2120).

To detect an entrance, the cleaning robot 100 may use the radar sensor 193 every predetermined time intervals to monitor the front of the cleaning robot 100, and may determine whether an empty space in a predetermined distance range is detected between obstacles O. Here, the predetermined distance range may be 80 cm to 110 cm which correspond to the width of an entrance.

Also, the cleaning robot 100 that has detected an entrance records position information of the entrance and moves toward the entrance.

Then, the cleaning robot 100 sets a cleaning area using the obstacle sensor (2130).

The cleaning robot 100 that has detected an entrance may use the obstacle sensor 140 and move along the outer edge of the obstacle O. Also, while moving along the outer edge of the obstacle O, the cleaning robot 100 may save a driving record including movement information, position information, and the like of the cleaning robot 100.

While moving along the outer edge of the obstacle O, the cleaning robot 100 may determine whether the current position of the cleaning robot 100 is the same as a position of an entrance, and, when the current position is the same as the position of the entrance, the cleaning robot 100 may also set a cleaning area on the basis of the saved driving record.

The cleaning robot 100 that has set a cleaning area cleans the set cleaning area while moving in the cleaning area (2140).

The cleaning robot may clean a cleaning area according to the cleaning area cleaning method (1300) illustrated in FIG. 33. For example, the cleaning robot 100 may clean the cleaning area while performing zigzag travel as illustrated in FIG. 34, or may clean the cleaning area while moving in any direction as illustrated in FIG. 35.

Then, the cleaning robot 100 determines whether all cleaning areas are cleaned (2150). In other words, the cleaning robot 100 determines whether all areas included in the cleaning space A are cleaned.

When an entrance of an uncleaned area is not detected, the cleaning robot 100 may determine that all areas of the cleaning space A are cleaned.

When not all of the cleaning areas are cleaned (NO to 2150), the cleaning robot 100 repeats moving in the cleaning space A, determining an entrance, setting a cleaning area, and cleaning the cleaning area.

When all of the cleaning areas are cleaned (YES to 2150), the cleaning robot 100 may end moving and return to the charging station.

For example, after the cleaning robot 100 has moved the entire cleaning space A, the cleaning robot 100 may set a cleaning area corresponding to an uncleaned area, clean the set cleaning area, and then return to the charging station.

As described above, the cleaning robot 100 may set a cleaning area by using the radar sensor 193 and the obstacle sensor 140 while moving, and clean the set cleaning area first.

FIG. 62 illustrates a control configuration of the cleaning robot according to yet another embodiment, and FIG. 63 illustrates a cleaning space in which a magnetic band is installed.

Referring to FIGS. 62 and 63, the cleaning robot 100 may include the user interface 120 configured to interact with a user, the motion detector 130 configured to detect information related to motion of the cleaning robot 100, the obstacle sensor 140 configured to sense an obstacle O in the cleaning space A, the driver 160 configured to move the cleaning robot 100, the cleaner 170 configured to clean the cleaning space, the controller 110 configured to collectively control an operation of the cleaning robot 100, and a magnetic field sensor 195 configured to sense a magnetic field on a floor of the cleaning space A.

The user interface 120, the motion detector 130, the obstacle sensor 140, the driver 160, the cleaner 170, and the controller 110 are the same as those in the configuration of the cleaning robot 100 according to the embodiment described with reference to FIG. 3.

However, the cleaning robot 100 according to yet another embodiment further includes the magnetic field sensor 195 as illustrated in FIG. 62.

The magnetic field sensor 195 may be installed at a bottom surface or a front surface of the cleaning robot 100, and may detect magnetic fields generated by magnetic bands M1 and M2 installed by a user in advance.

The user may install the magnetic bands M1 and M2 in advance at positions corresponding to entrances in the cleaning space A as illustrated in FIG. 63.

For example, the user may install a first magnetic band M1 at the first entrance connecting the living room R3 to the first room R1, and may install a second magnetic band M2 at the second entrance connecting the living room R3 to the second room R2.

Here, the first magnetic band M1 and the second magnetic band M2 may have the same shape, and may generate magnetic fields with the same intensity and polarity.

The magnetic field sensor 195 may sense the magnetic fields generated by the magnetic bands M1 and M2 installed by the user in advance as above, and may transmit an electrical signal corresponding to sensing the magnetic fields to the controller 110.

FIG. 64 illustrates a method of cleaning a cleaning space by the cleaning robot according to yet another embodiment, and FIGS. 65 to 67 illustrate a process of cleaning a cleaning space by the cleaning robot using the cleaning method illustrated in FIG. 64 according to yet another embodiment.

The cleaning robot 100 moves the cleaning space A, and saves a driving record while moving (2210).

The cleaning robot 100 may move in any direction from a certain position.

The certain position may be a position at which the charging station (not illustrated) for charging the battery of the cleaning robot 100 is disposed, or a position on the floor of the cleaning space A on which a user places the cleaning robot 100. Like this, a position from which the cleaning robot 100 starts moving is not limited.

Also, the cleaning robot 100 may move in any direction upon starting movement. For example, the cleaning robot 100 may move forward upon starting movement. However, embodiments are not limited thereto, and the cleaning robot 100 may move after changing its moving direction before starting movement. However, after the cleaning robot 100 starts moving, the cleaning robot 100 preferably does not change its moving direction until an obstacle O is encountered.

Also, the cleaning robot 100 may determine whether an obstacle O is sensed while moving. Specifically, the obstacle sensor 140 of the cleaning robot 100 transmits light toward the front and side of the cleaning robot 100 and detects reflected light that is received after being reflected from an obstacle O. The controller 110 of the cleaning robot 100 may determine a presence of an obstacle O according to whether reflected light is detected.

When an obstacle is sensed, the cleaning robot 100 may move along an outer edge of an obstacle O. Specifically, the cleaning robot 100 may perform outer edge following travel in which the cleaning robot 100 moves parallel to the outer edge of the obstacle O while a distance between the cleaning robot 100 and the obstacle O is maintained to be a predetermined obstacle-following distance.

Also, while performing the outer edge following travel, the cleaning robot 100 may save a driving record of the cleaning robot 100. Specifically, at every predetermined time intervals, the cleaning robot 100 may save position information that represents a position of the cleaning robot 100, and movement information that represents a moving velocity, a moving direction, and the like of the cleaning robot 100.

While moving, the cleaning robot 100 determines whether a magnetic field is sensed (2220). The cleaning robot 100 may use the magnetic field sensor 195 to sense magnetic fields generated by the magnetic bands M1 and M2.

For example, when the cleaning robot 100 passes through an entrance while performing the outer edge following travel as illustrated in FIG. 65, the cleaning robot 100 may sense a magnetic field generated by the first magnetic band M1 installed by the user in advance.

When a magnetic field is not sensed (NO to 2220), the cleaning robot 100 continues to move. When a magnetic field is sensed (YES to 2220), the cleaning robot 100 saves a position at which the magnetic field is sensed (2230).

When a magnetic field is sensed, the cleaning robot 100 may be determined as passing through an entrance. Consequently, the cleaning robot 100 saves a position at which the magnetic field is sensed to determine a position of the entrance.

Then, the cleaning robot 100 determines whether another magnetic field sensing position is present within a reference distance range from the current magnetic field sensing position (2240).

The cleaning robot 100 calculates a distance between a pre-stored magnetic field sensing position and a position of the cleaning robot 100 from which a magnetic field is currently sensed. Then, the cleaning robot 100 determines whether the calculated distance is within a pre-stored reference distance range.

As described above, an entrance may have a width of about 80 cm to 110 cm. Consequently, when a position from which a magnetic field was previously sensed is present within a reference distance from the position of the cleaning robot 100 from which a magnetic field is currently sensed, the cleaning robot 100 may determine that an entrance is present between the position from which a magnetic field is currently sensed and the position from which a magnetic field was previously sensed.

Here, the reference distance range may be a distance range that results from subtracting the width of the cleaning robot 100 from about 80 cm to 110 cm. For example, when the width of the cleaning robot 100 is 30 cm, the reference distance range may be 50 cm to 80 cm.

When another magnetic field sensing position is not present within a reference distance range from the current magnetic field sensing position (NO to 2240), the cleaning robot 100 continues to perform outer edge following travel.

For example, when the cleaning robot 100 is entering the first room R1 as illustrated in FIG. 65, the cleaning robot 100 may detect a magnetic field generated by the first magnetic band M1.

However, because another magnetic field sensing position is not present nearby, the cleaning robot 100 passes through the entrance, enters the first room R1, and continues to perform outer edge following travel.

When another magnetic field sensing position is present within a reference distance range from the current magnetic field sensing position (YES to 2240), the cleaning robot 100 moves to a previously-saved magnetic field sensing position (2250).

When another magnetic field sensing position is present within a reference distance range from the current magnetic field sensing position, the cleaning robot 100 may determine that the cleaning robot 100 has passed through the corresponding entrance two times.

That is, the cleaning robot 100 may determine initially passing through an entrance as entering an area connected to outside by the entrance, and determine secondly passing through the entrance as deviating from the corresponding area.

Also, the cleaning robot 100 may move through the entire inner portion of the corresponding area and determine that a driving record is saved.

Consequently, the cleaning robot 100 moves to a position from which a magnetic field is sensed to set a cleaning area that corresponds to the corresponding area.

For example, when the cleaning robot 100 is leaving the first room R1 as illustrated in FIG. 66, the cleaning robot 100 may detect a magnetic field generated by the first magnetic band M1.

Also, a magnetic field sensing position that is saved when the cleaning robot 100 entered the first room R1 is present within a reference distance range from a position at which a magnetic field is sensed by the cleaning robot 100.

Consequently, the cleaning robot 100 may be determined as having passed through the first entrance, connecting the living room R3 to the first room R1, two times, and the cleaning robot 100 moves to a position at which the cleaning robot 100 initially sensed a magnetic field generated by the first magnetic band M1.

After moving to the magnetic field sensing position, the cleaning robot 100 sets a cleaning area on the basis of a driving record (2260).

When the cleaning robot 100 moves to the magnetic field sensing position, a closed line is generated due to the moving path of the cleaning robot 100. For example, a closed line is generated by the moving path of the cleaning robot 100 as illustrated in FIG. 66.

The cleaning robot 100 may set the first cleaning area A1 on the basis of the closed line.

Specifically, the cleaning robot 100 may perform linear modeling of the closed line, simplify the linearly-modeled closed line, and rotate and transform the simplified closed line to set the first cleaning area A1.

After setting a cleaning area, the cleaning robot 100 cleans the set cleaning area, and saves the cleaning area as a cleaning-finished area (2270).

The cleaning robot may clean a cleaning area according to the cleaning area cleaning method (1300) illustrated in FIG. 33. For example, the cleaning robot 100 may clean the cleaning area while performing zigzag travel as illustrated in FIG. 34, or may clean the cleaning area while moving in any direction as illustrated in FIG. 35.

Then, when cleaning is finished, the cleaning robot 100 may save the cleaning area as a cleaning-finished area.

Then, the cleaning robot 100 determines whether all cleaning areas are cleaned (2280). In other words, the cleaning robot 100 determines whether all areas included in the cleaning space A are cleaned.

Specifically, when the cleaning robot 100 reaches a position from which the cleaning robot 100 started outer edge following travel, the cleaning robot 100 determines an uncleaned area, which is not cleaned, in the cleaning space A. Then, the cleaning robot 100 sets a cleaning area corresponding to the uncleaned area, and cleans an inner portion of the set cleaning area.

When cleaning the uncleaned area is finished, the cleaning robot 100 may determine that all cleaning areas are cleaned.

When it is determined that not all of the cleaning areas are cleaned (NO to 2280), the cleaning robot 100 continues to clean the cleaning areas.

Also, when it is determined that all of the cleaning areas are cleaned (YES to 2280), the cleaning robot 100 returns to the charging station and stops operation.

As described above, the cleaning robot 100 may detect an entrance by using a magnetic band installed at an entrance by a user in advance and a magnetic field sensor configured to sense a magnetic field of the magnetic band, and set a cleaning area on the basis of the detected entrance and a driving record. Also, the cleaning robot 100 may clean the set cleaning area first.

Although embodiments of the present disclosure have been illustrated and described above, the present disclosure is not limited to particular embodiments described above, and may be modified in various ways by one of ordinary skill in the art to which the present disclosure pertains without departing from the gist of the claims below. Such modifications cannot be separately understood from the present disclosure.

The invention claimed is:

1. A cleaning robot comprising:
a main body;
a driver configured to move the main body;
a cleaner configured to clean a cleaning space; and
a controller configured to:
identify a position of an entrance, which connects an area to another area, while the main body moves,
set a cleaning area among a plurality of areas included in the cleaning space on a basis of the identified position of the entrance, and
clean the cleaning area in response to setting the cleaning area.

2. The cleaning robot of claim 1, wherein the controller is further configured to set the cleaning area on a basis of the identified position of the entrance and a driving record of the main body.

3. The cleaning robot of claim 2, further comprising an obstacle sensor configured to detect an obstacle that interferes with movement of the main body,
wherein the controller controls the driver to enable the main body to move along an outer edge of the obstacle, and
the driving record of the main body includes information of positions moved by the main body and outer edge information of the obstacle.

4. The cleaning robot of claim 3, wherein, while moving along the outer edge of the obstacle, the controller is further configured to determine a position of the entrance on a basis of a current position of the main body and the driving record.

5. The cleaning robot of claim 4, wherein, when the current position of the main body is a first convex corner of the obstacle and a driving record of moving along a second convex corner of the obstacle is present within a predetermined distance from the current position, the controller is further configured to determine a portion between the first convex corner and the second convex corner as the position of the entrance.

6. The cleaning robot of claim 4, wherein, when the current position of the main body is a first convex corner of the obstacle and a driving record of moving along a first wall surface of the obstacle is present within a predetermined distance from the current position, the controller is further configured to determine a portion between the first convex corner and the first wall surface as the position of the entrance.

7. The cleaning robot of claim 4, wherein, when the current position of the main body is a first wall surface of the obstacle and a driving record of moving along a first convex corner of the obstacle is present within a predetermined distance from the current position, the controller is further configured to determine a portion between the first wall surface and the first convex corner as the position of the entrance.

8. The cleaning robot of claim 2, wherein the controller is further configured to:
generate a closed line by connecting information of the position of the entrance to information of positions moved by the main body, and
set an inside of the closed line as the cleaning area.

9. A method of controlling a cleaning robot that cleans a cleaning space, the method comprising:
moving the cleaning robot;
identifying a position of an entrance, which connects an area to another area, while a main body moves;
setting a cleaning area on a basis of the identified position of the entrance; and
in response to setting the cleaning area, cleaning the cleaning area.

10. The method of claim 9, wherein the setting of the cleaning area includes:

setting the cleaning area on a basis of the identified position of the entrance and a driving record of the cleaning robot.

11. The method of claim 10, wherein the moving of the cleaning robot includes moving the cleaning robot along an outer edge of an obstacle that interferes with movement of the cleaning robot, and the driving record of a main body includes information of positions moved by the main body and outer edge information of the obstacle.

12. The method of claim 11, wherein the identifying of the position of the entrance includes determining the position of the entrance on a basis of a current position of the cleaning robot and the driving record.

13. The method of claim 11, wherein the identifying of the position of the entrance includes, when a current position of the cleaning robot is a first convex corner of the obstacle and a driving record of moving along a second convex corner of the obstacle is present within a predetermined distance from the current position, determining a portion between the first convex corner and the second convex corner as the position of the entrance.

14. The method of claim 11, wherein the identifying of the position of the entrance includes, when a current position of the cleaning robot is a first convex corner of the obstacle and a driving record of moving along a first wall surface of the obstacle is present within a predetermined distance from the current position, determining a portion between the first convex corner and the first wall surface as the position of the entrance.

15. The method of claim 11, wherein the identifying of the position of the entrance includes, when a current position of the cleaning robot is a first wall surface of the obstacle and a driving record of moving along a first convex corner of the obstacle is present within a predetermined distance from the current position, determining a portion between the first wall surface and the first convex corner as the position of the entrance.

16. The method of claim 10, wherein the setting of the cleaning area includes setting the cleaning area on the basis of the position of the entrance and the driving record.

17. A cleaning robot comprising:
a main body;
a driver configured to move the main body;
a motion detector configured to acquire a driving record including position information and a moving angle of the main body while the main body moves;
a storage configured to save the driving record;
a cleaner configured to perform cleaning; and
a controller configured to:
  detect an entrance based on the driving record,
  set a cleaning area based on an area partitioned by the entrance, and
  clean the cleaning area.

18. The cleaning robot of claim 17, wherein, when the main body repeatedly moves along the same path, the controller controls the driver to enable the main body to move to a predetermined reference position.

19. The cleaning robot of claim 18, wherein, when the main body repeatedly moves along the same path, the controller controls the driver to enable the main body to move to the entrance.

20. The cleaning robot of claim 18, wherein, when the main body repeatedly moves along the same path, the controller controls the driver to enable the main body to move in a predetermined direction.

* * * * *